(12) United States Patent
Kimura et al.

(10) Patent No.: US 12,330,726 B2
(45) Date of Patent: Jun. 17, 2025

(54) VEHICLE CONTROL DEVICE

(71) Applicant: TOYOTA JIDOSHA KABUSHIKI KAISHA, Toyota (JP)

(72) Inventors: Kota Kimura, Anjo (JP); Takahiro Adachi, Chiryu (JP); Yu Sakai, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 18/082,347

(22) Filed: Dec. 15, 2022

(65) Prior Publication Data

US 2023/0286577 A1    Sep. 14, 2023

(30) Foreign Application Priority Data

Mar. 14, 2022    (JP) .................................. 2022-039303

(51) Int. Cl.
| | |
|---|---|
| *B62D 6/00* | (2006.01) |
| *B60W 10/20* | (2006.01) |
| *B60W 30/12* | (2020.01) |
| *B60W 30/18* | (2012.01) |

(52) U.S. Cl.
CPC ............. *B62D 6/008* (2013.01); *B60W 10/20* (2013.01); *B60W 30/12* (2013.01); *B60W 30/18163* (2013.01); *B60W 2540/20* (2013.01); *B60W 2554/4045* (2020.02)

(58) Field of Classification Search
CPC ...... B60W 10/20; B60W 30/09; B60W 30/12; B60W 30/18163; B60W 2540/20; B60W 2554/4045; B62D 6/008; G05D 1/0061; G05D 1/0088; G05D 1/021; G05D 1/0214; G05D 1/0221; G05D 1/0223
See application file for complete search history.

(56) References Cited

U.S. PATENT DOCUMENTS

2018/0346027 A1    12/2018  Fujii
2019/0367082 A1    12/2019  Sugamoto et al.

FOREIGN PATENT DOCUMENTS

| | | |
|---|---|---|
| DE | 102015015410 A1 * | 12/2016 |
| JP | 2004-331023 A | 11/2004 |
| JP | 2016-107750 A | 6/2016 |
| JP | 2018-203098 A | 12/2018 |

(Continued)

OTHER PUBLICATIONS

U.S. Appl. No. 18/087,330, filed Dec. 22, 2022.

*Primary Examiner* — Mark L. Greene
(74) *Attorney, Agent, or Firm* — Sughrue Mion, PLLC

(57) ABSTRACT

During execution of steering reaction force control, when a lane change of a host vehicle is made, a vehicle control device sets a steering reaction force given to a steering operation in the direction of the lane change of the host vehicle to a reaction force of a smaller value than a reaction force of a standard value. Further, when a vehicle approach condition that another vehicle traveling in a lane on a side to which the lane of the host vehicle is to be changed is approaching the host vehicle from behind is met at the time when a lane change of the host vehicle is made, the vehicle control device does not set the steering reaction force given to the steering operation in the direction of the lane change of the host vehicle to a reaction force of a value smaller than the standard value.

6 Claims, 21 Drawing Sheets

(56) References Cited

FOREIGN PATENT DOCUMENTS

| | | | |
|---|---|---|---|
| JP | 2019-209844 A | | 12/2019 |
| JP | 2020-132025 A | | 8/2020 |
| KR | 20120056158 A | * | 6/2012 |

* cited by examiner

FIG. 4
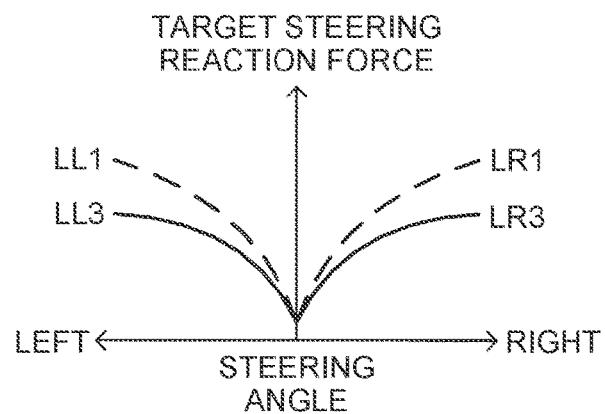
FIG. 5A
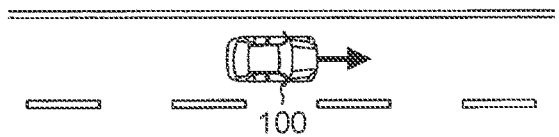
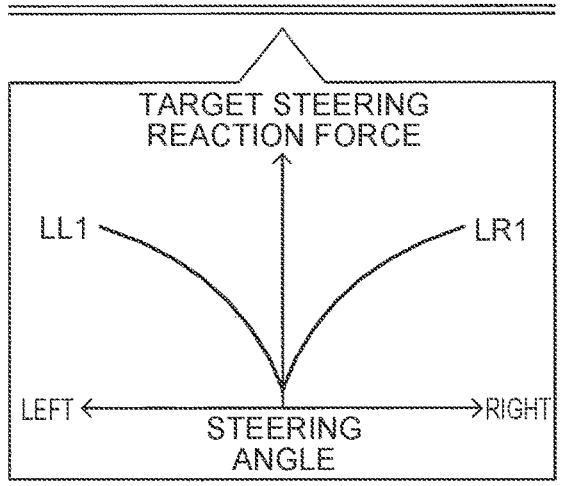
FIG. 5B
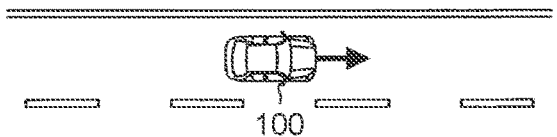
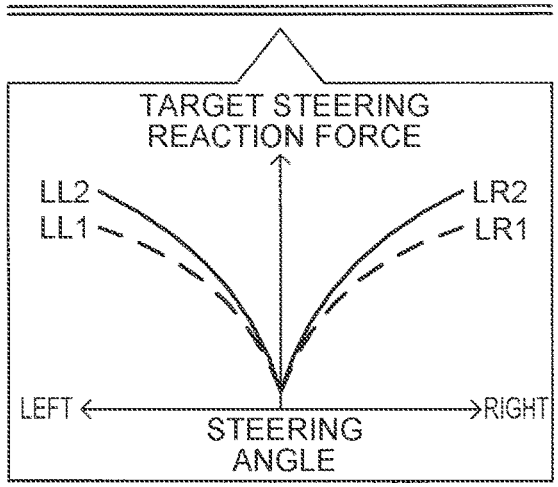

FIG. 6A
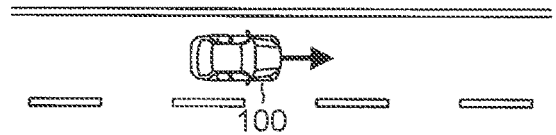
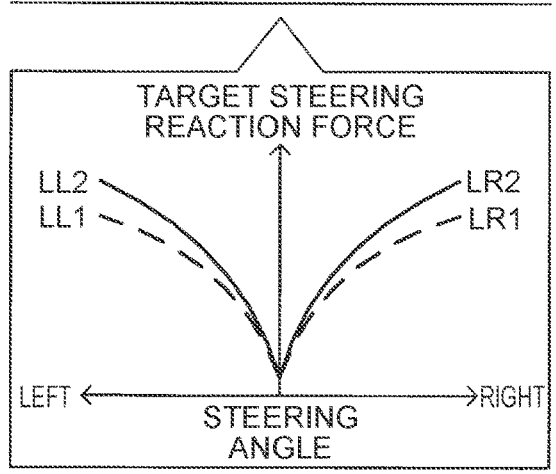
FIG. 6B
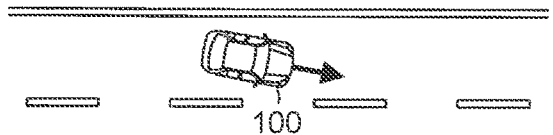
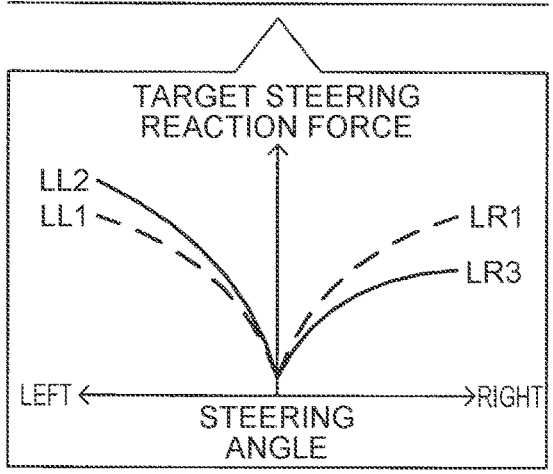
FIG. 6C
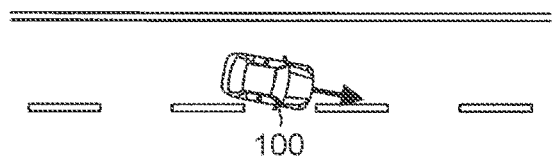
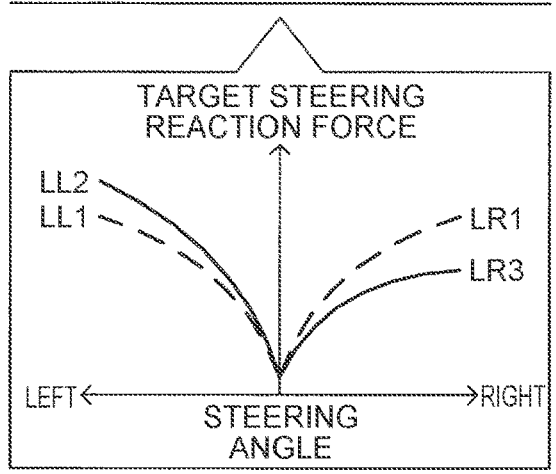
FIG. 6D
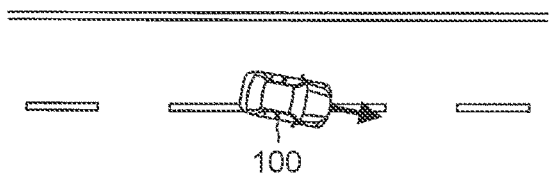
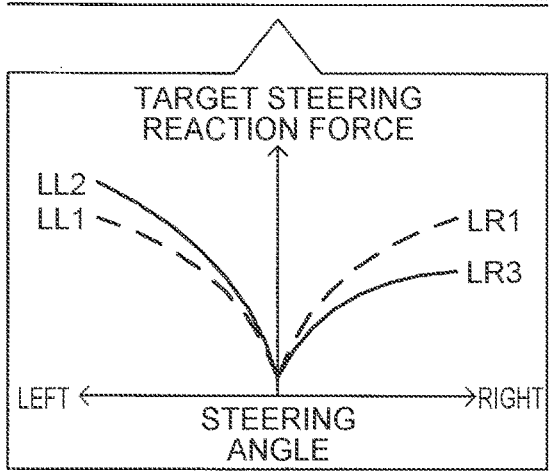

FIG. 7A1
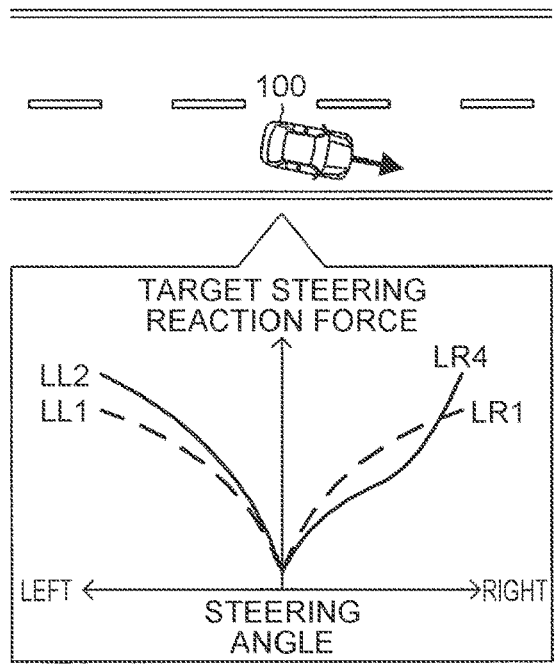
FIG. 7A2
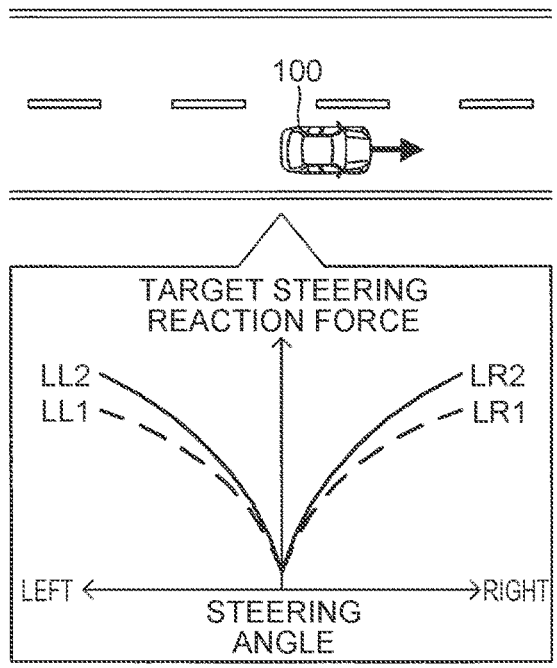
FIG. 7B1
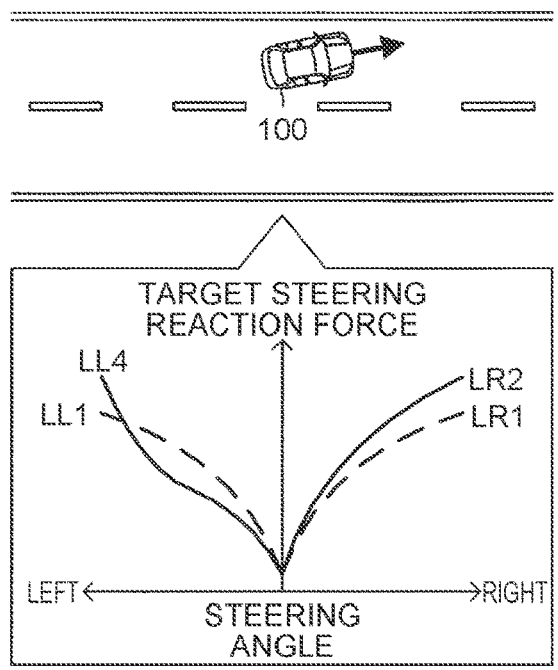
FIG. 7B2
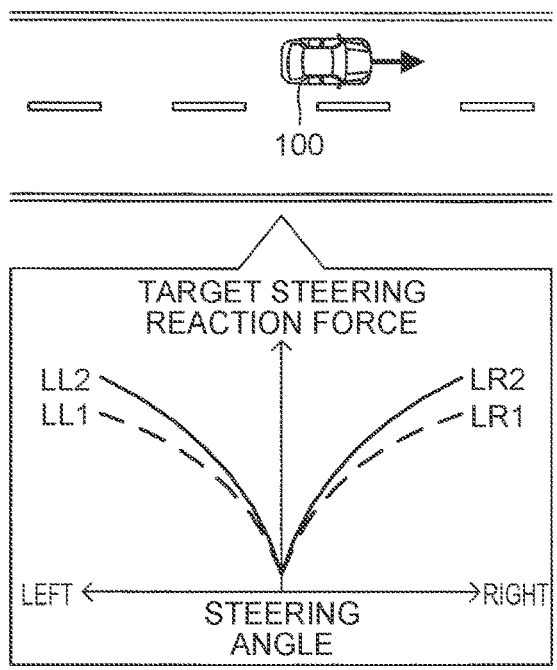

FIG. 8A
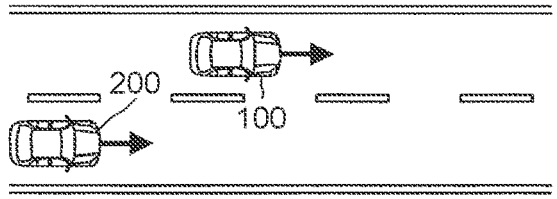
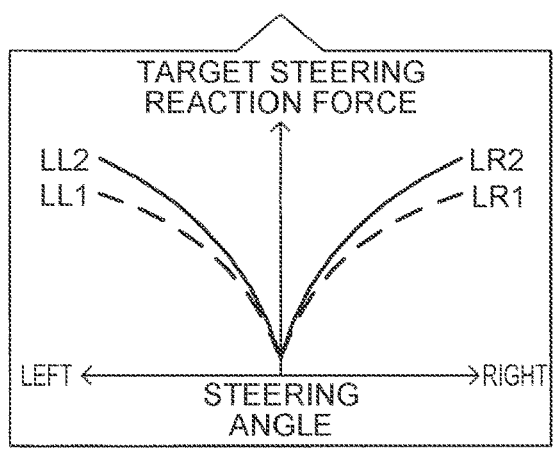
FIG. 8B
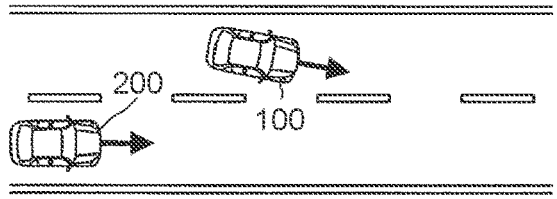
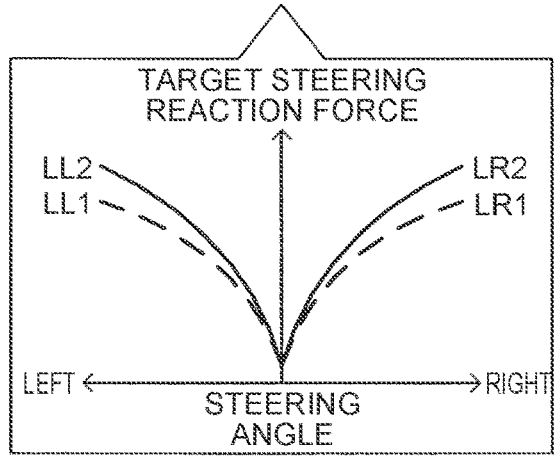
FIG. 8C
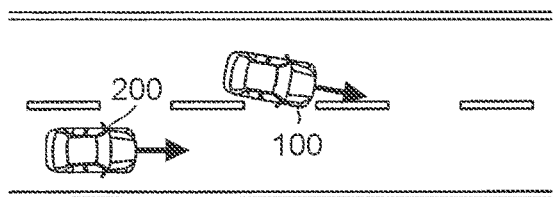
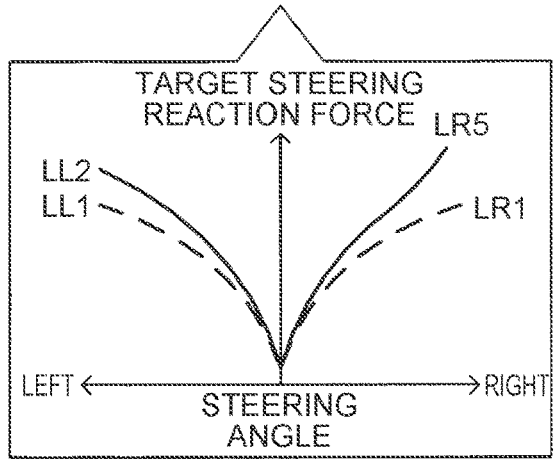
FIG. 8D
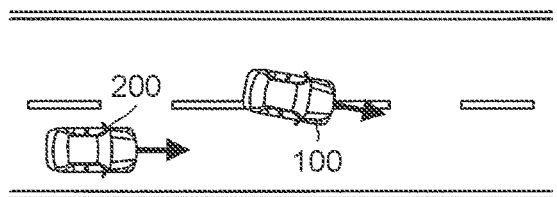
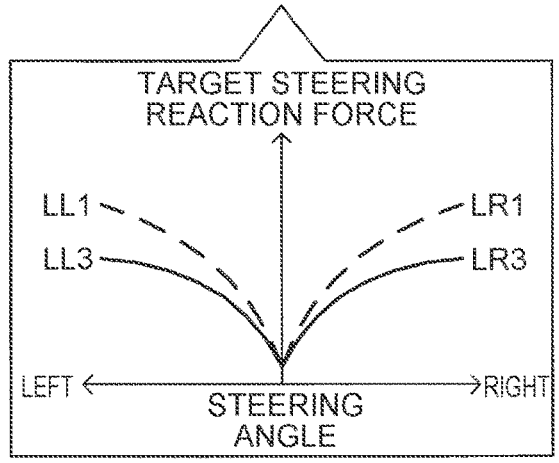

FIG. 9A1
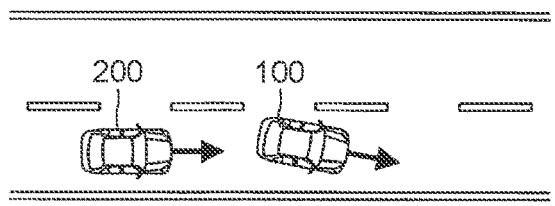
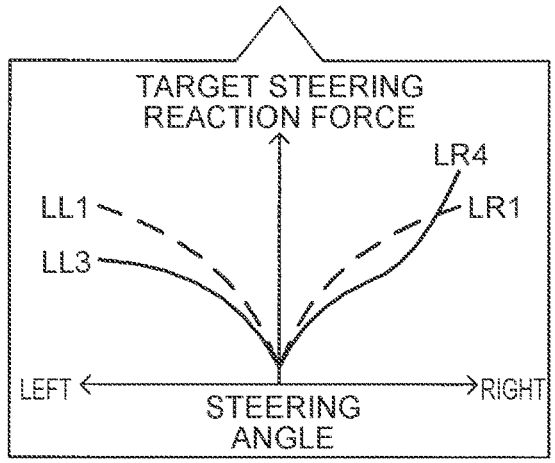
FIG. 9A2
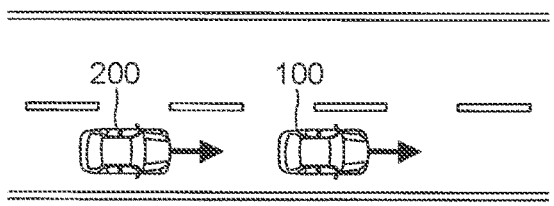
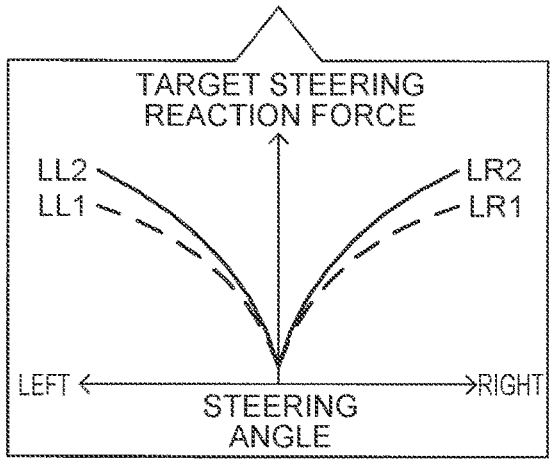
FIG. 9B1
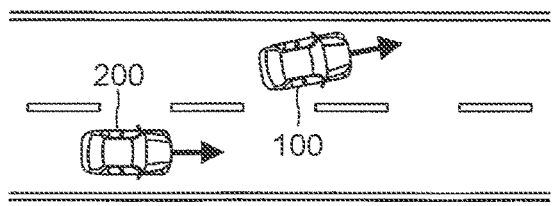
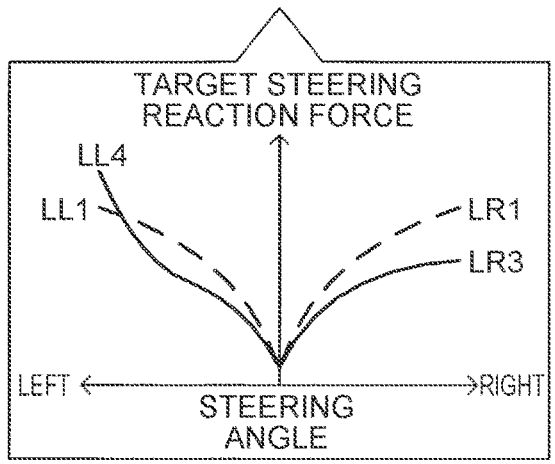
FIG. 9B2
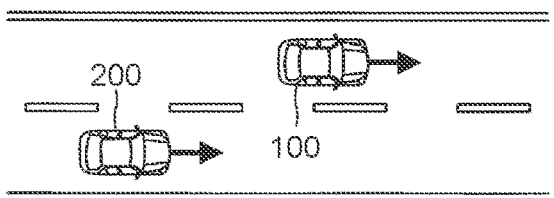
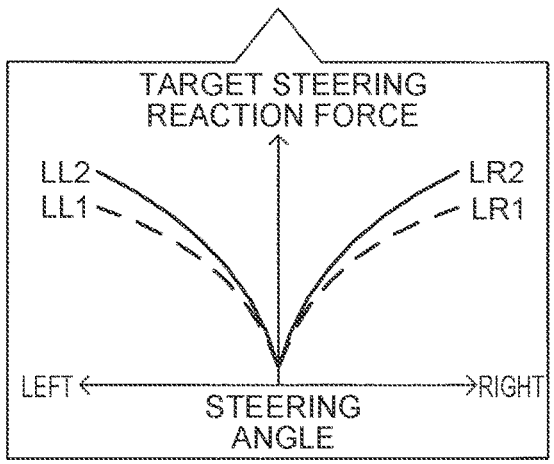

FIG. 10A
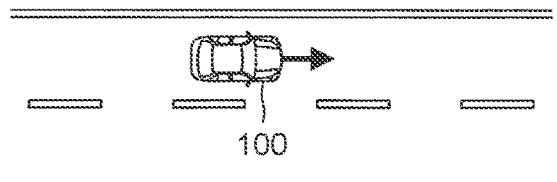
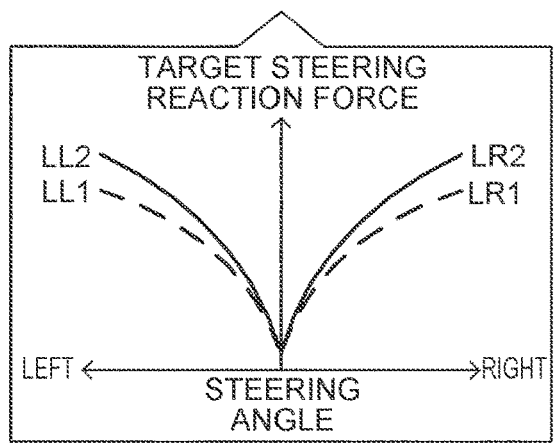
FIG. 10B
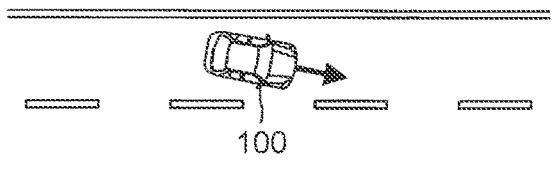
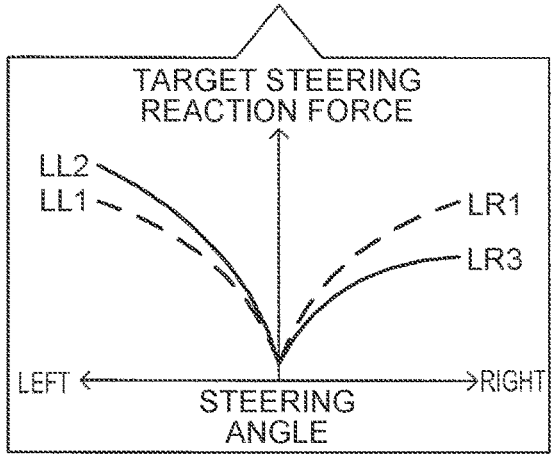
FIG. 10C
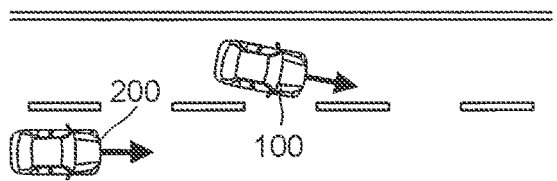
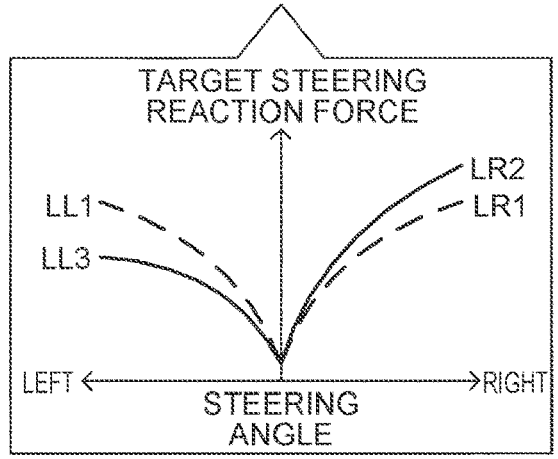
FIG. 10D
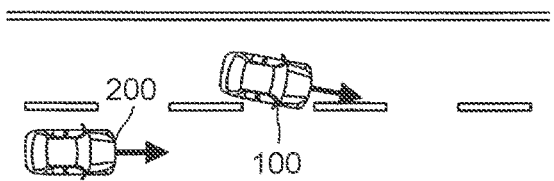
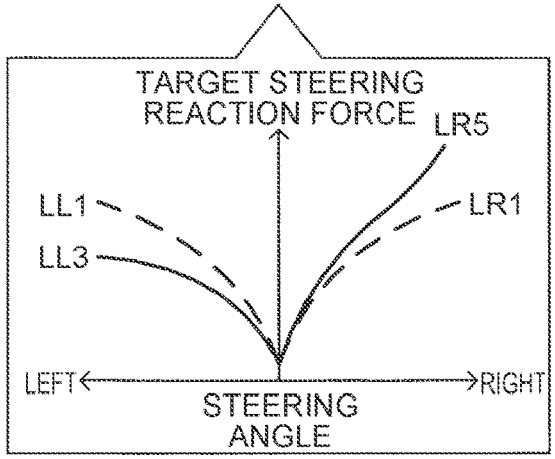

FIG. 12A1
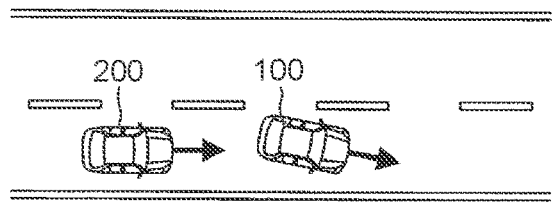
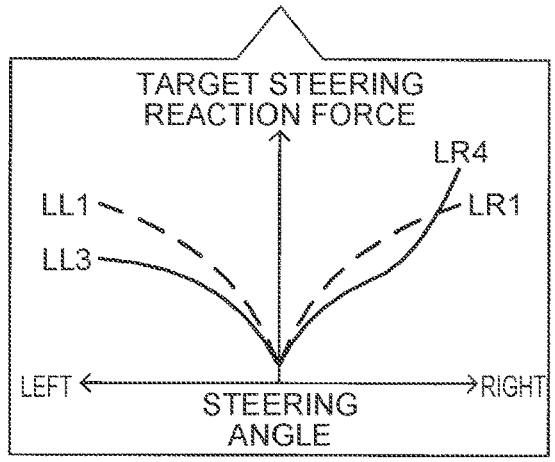
FIG. 12A2
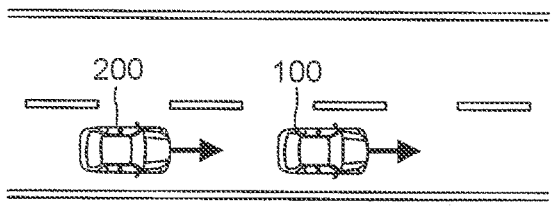
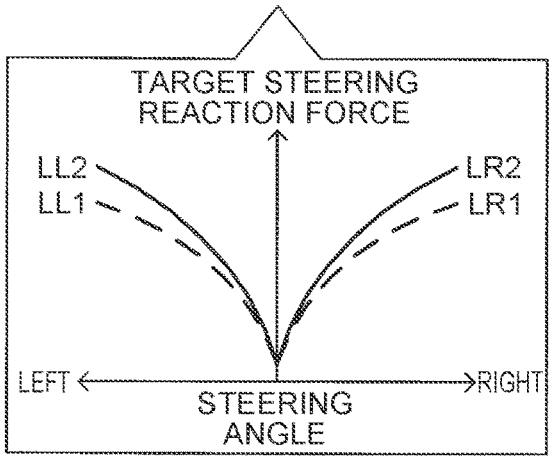
FIG. 12B1
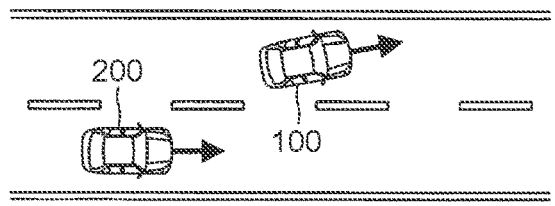
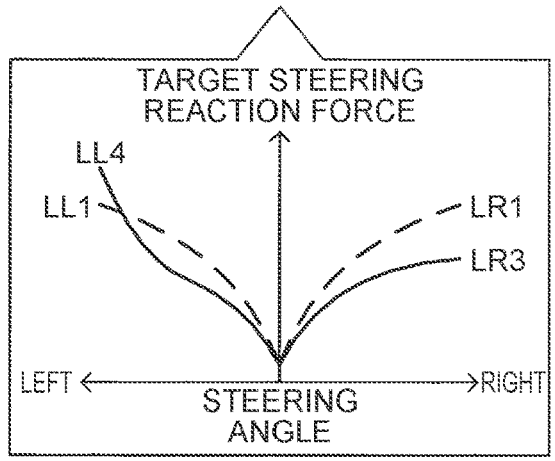
FIG. 12B2
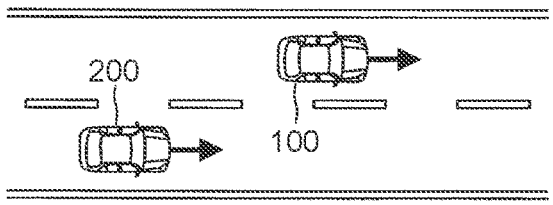
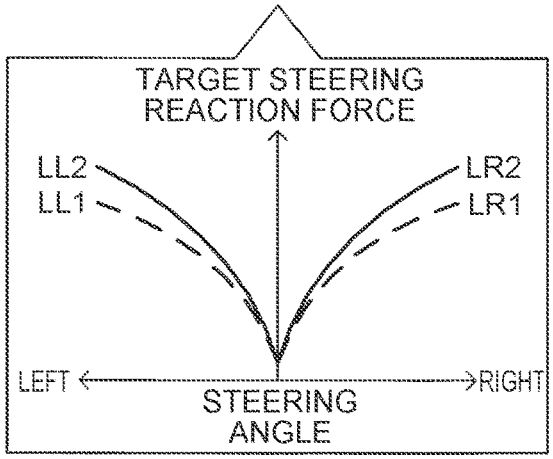

FIG. 13A
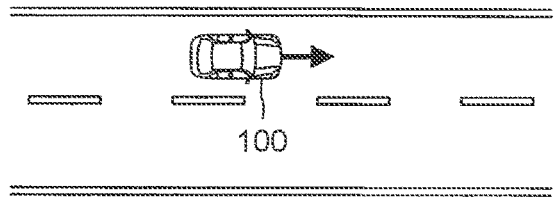
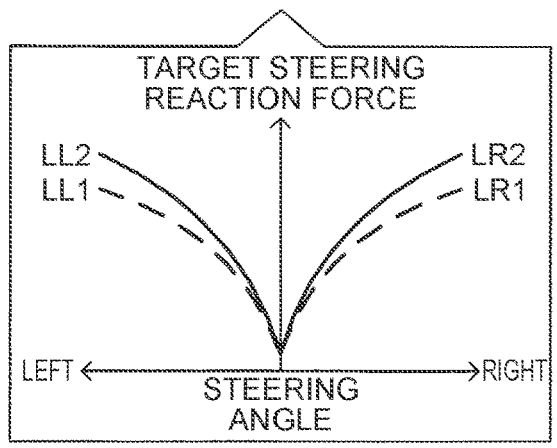
FIG. 13B
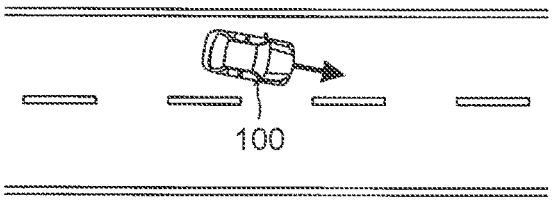
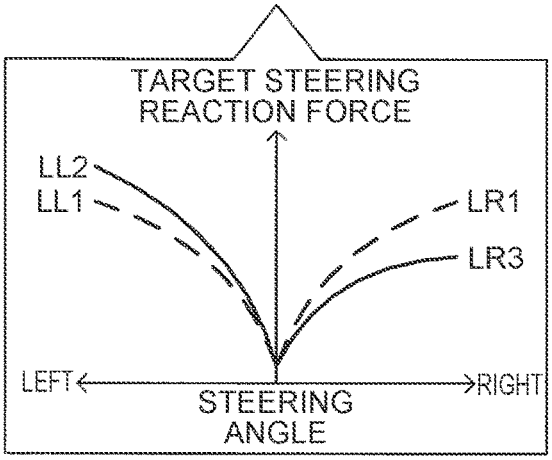
FIG. 13C
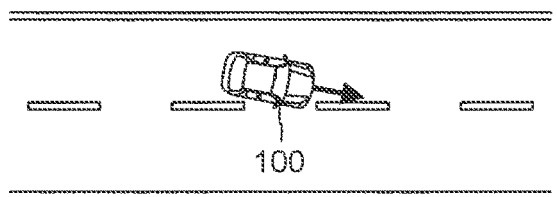
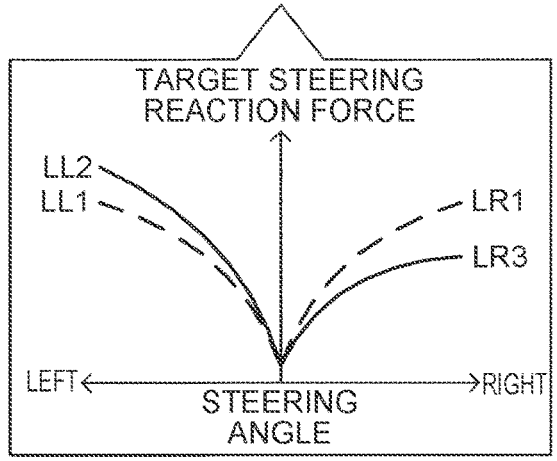
FIG. 13D
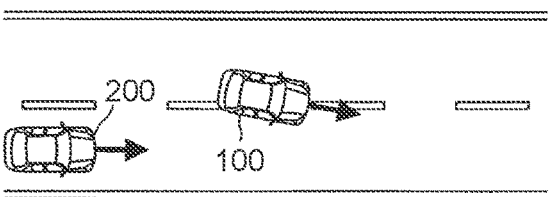
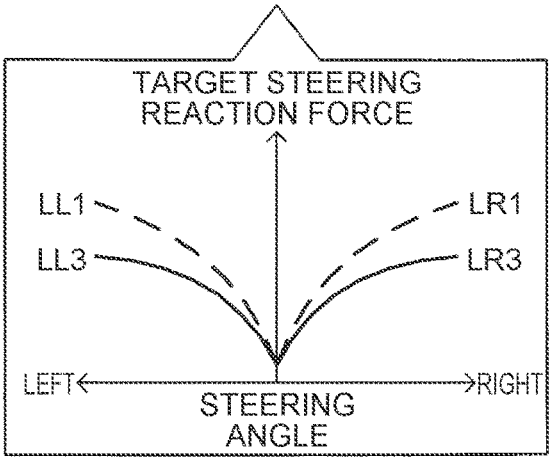

FIG. 14A1
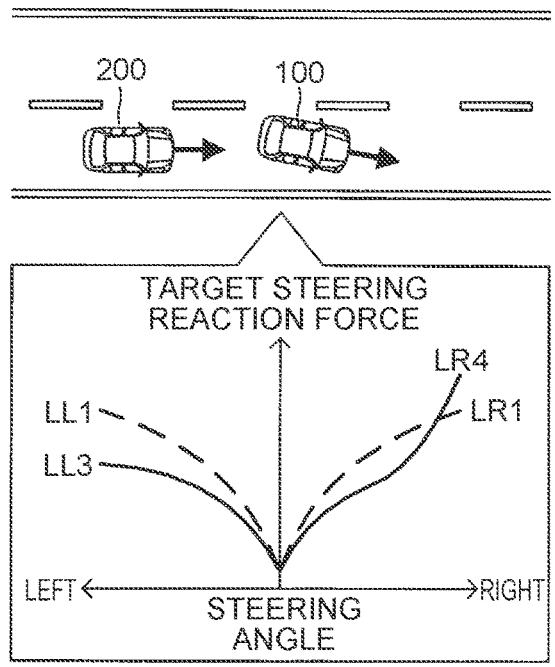
FIG. 14A2
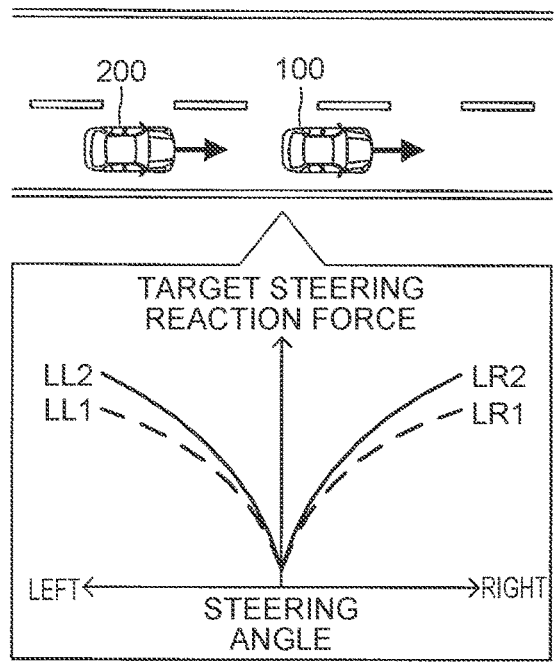
FIG. 14B1
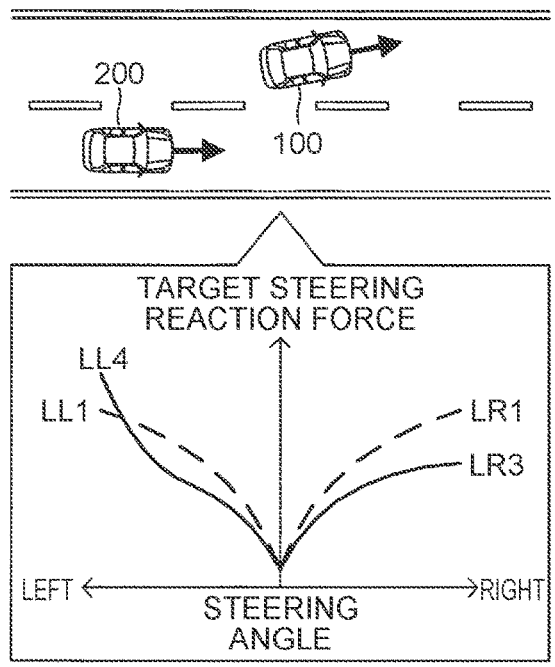
FIG. 14B2
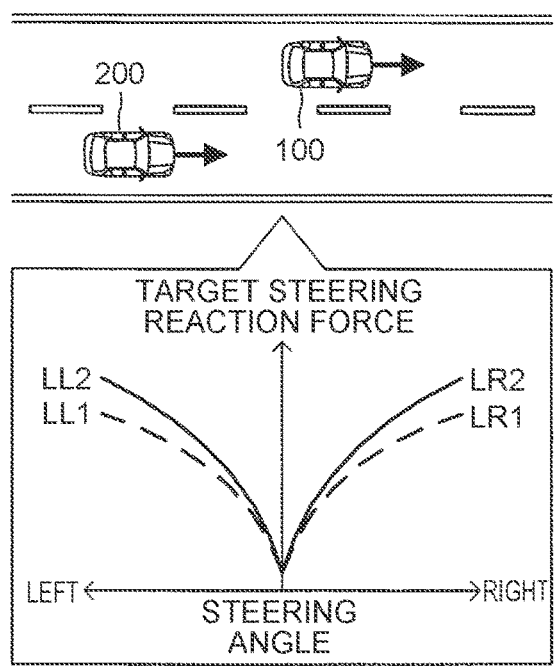

VEHICLE CONTROL DEVICE

CROSS-REFERENCE TO RELATED APPLICATION

This application claims priority to Japanese Patent Application No. 2022-039303 filed on Mar. 14, 2022, incorporated herein by reference in its entirety.

BACKGROUND

1. Technical Field

The present disclosure relates to a vehicle control device.

2. Description of Related Art

There is a range of an appropriate amount (an appropriate range) of steering wheel operation required for a driver to cause a vehicle to travel appropriately along a curved road. In this connection, there is a known vehicle control device that, when an amount of steering wheel operation performed by a driver increases and falls within the appropriate range while the vehicle is traveling along a curved road, increases a reaction force given to the steering wheel operation performed by the driver (steering reaction force) to thereby help the amount of steering wheel operation remain within the appropriate range (see Japanese Unexamined Patent Application Publication No. 2019-209844 (JP 2019-209844 A)).

SUMMARY

Not only in a situation where a host vehicle is traveling along a curved road but also in a situation where the host vehicle makes a lane change, it is desirable to facilitate a steering wheel operation performed by the driver to make a lane change of the host vehicle. However, when another vehicle traveling in an adjacent lane to which the lane of the host vehicle is to be changed is approaching the host vehicle from behind, facilitating the steering wheel operation for a lane change of the host vehicle is not favorable, as this increases the likelihood of the host vehicle coming into contact with that other vehicle.

An object of the present disclosure is to provide a vehicle control device that can facilitate a lane change of a host vehicle while reducing the likelihood of contact between the host vehicle and another vehicle.

A vehicle control device according to the present disclosure includes a reaction force generator that gives a steering reaction force to a steering operation performed by a driver on a host vehicle, and a controller that executes steering reaction force control of controlling a value of the steering reaction force. The controller is configured such that, during execution of the steering reaction force control, when a lane change of the host vehicle is not made, the controller gives a reaction force of a standard value to the steering operation as the steering reaction force, and when a lane change of the host vehicle is made, the controller sets the steering reaction force given to the steering operation in the direction of the lane change of the host vehicle to a reaction force of a smaller value than the reaction force of the standard value.

Further, in the vehicle control device according to the present disclosure, the controller is configured such that, during execution of the steering reaction force control, when a vehicle approach condition that another vehicle traveling in a lane on a side to which a lane of the host vehicle is to be changed is approaching the host vehicle from behind is met at the time when a lane change of the host vehicle is made, the controller does not set the steering reaction force given to the steering operation in the direction of the lane change of the host vehicle to a reaction force of a value smaller than the standard value.

According to this, when another vehicle is approaching the host vehicle from behind, the steering reaction force given to the steering operation in the direction of the lane change of the host vehicle is not set to be smaller. Therefore, the steering operation in the direction of the lane change of the host vehicle is not facilitated. Thus, the likelihood of contact between the host vehicle and another vehicle resulting from a lane change of the host vehicle can be reduced. On the other hand, when another vehicle is not approaching the host vehicle from behind, the steering reaction force given to the steering operation in the direction of the lane change of the host vehicle is set to be smaller. Therefore, the steering operation in the direction of the lane change of the host vehicle is facilitated. Thus, the present disclosure can facilitate a lane change of the host vehicle while reducing the likelihood of contact between the host vehicle and another vehicle.

In the vehicle control device according to the present disclosure, the controller may be configured such that, during execution of the steering reaction force control, when the vehicle approach condition is met at the point in time when a lane change of the host vehicle is started, or when the vehicle approach condition is met after a lane change of the host vehicle is started and before the host vehicle starts to enter an adjacent lane, the controller sets the steering reaction force given to the steering operation in the direction of the lane change of the host vehicle to a reaction force of a value larger than the standard value, and sets the steering reaction force given to the steering operation in the opposite direction from the direction of the lane change of the host vehicle to a reaction force of a value smaller than the standard value.

According to this, when another vehicle is approaching the host vehicle from behind, the steering reaction force given to the steering operation in the direction of the lane change of the host vehicle is set to be greater and the steering reaction force given to the steering operation in the opposite direction is set to be smaller. Therefore, the steering operation in the direction of the lane change of the host vehicle is made difficult, while the steering operation in the opposite direction is facilitated. This helps the host vehicle remain in the original lane or return to the original lane. The likelihood of contact between the host vehicle and another vehicle resulting from a lane change of the host vehicle can be reduced.

In the vehicle control device according to the present disclosure, the controller may be configured such that, during execution of the steering reaction force control, when the vehicle approach condition is met after a lane change of the host vehicle is started and the host vehicle starts to enter an adjacent lane and before entry of the host vehicle into the adjacent lane is completed, the controller sets the steering reaction force given to the steering operation in the direction of the lane change of the host vehicle to a reaction force of a value smaller than the standard value, and also sets the steering reaction force given to the steering operation in the opposite direction from the direction of the lane change of the host vehicle to a reaction force of a value smaller than the standard value.

When another vehicle approaches the host vehicle from behind after the host vehicle starts to enter an adjacent lane, it is preferable that whether to continue the lane change of the host vehicle or cancel the lane change of the host vehicle and return the host vehicle to the original lane be left to the judgment of the driver of the host vehicle. According to the present disclosure, when another vehicle approaches the host vehicle from behind after the host vehicle starts to enter an adjacent lane, both the steering reaction force given to the steering operation in the direction of the lane change of the host vehicle and the steering reaction force given to the steering operation in the opposite direction are set to be smaller. Therefore, the steering operation can be facilitated both when the lane change of the host vehicle is continued, and when the lane change of the host vehicle is canceled and the host vehicle is returned to the original lane, at the discretion of the driver of the host vehicle.

In the vehicle control device according to the present disclosure, the controller may be configured such that, during execution of the steering reaction force control, when a lane change of the host vehicle is started and entry of the host vehicle into an adjacent lane is completed, the controller sets an increase rate of the steering reaction force given to the steering operation in the direction of the lane change of the host vehicle relative to an amount of the steering operation to be higher than the increase rate before entry of the host vehicle into the adjacent lane is completed.

According to this, when entry of the host vehicle into an adjacent lane is completed, it becomes difficult to increase the amount of steering operation in the direction of the lane change of the host vehicle. Therefore, the steering operation for causing the host vehicle to travel along the adjacent lane is facilitated.

In the vehicle control device according to the present disclosure, the controller may be configured such that, during execution of the steering reaction force control, when, after a lane change of the host vehicle is started, the steering operation in the opposite direction from the direction of the lane change of the host vehicle is performed at some point during the lane change of the host vehicle and entry of the host vehicle into an original lane is completed, the controller sets an increase rate of the steering reaction force given to the steering operation in the opposite direction from the direction of the lane change of the host vehicle relative to an amount of the steering operation to be higher than the increase rate before entry of the host vehicle into the original lane is completed.

According to this, when entry of the host vehicle into the original lane is completed, it becomes difficult to increase the amount of steering operation in the opposite direction from the direction of the lane change of the host vehicle. Therefore, the steering operation for causing the host vehicle to travel along the original lane is facilitated.

In the vehicle control device according to the present disclosure, the controller may be configured such that, during execution of the steering reaction force control, when the vehicle approach condition that has been once met ceases to be met at the time when a lane change of the host vehicle is made, the controller sets the steering reaction force given to the steering operation in the direction of the lane change of the host vehicle to a reaction force of a smaller value than the reaction force of the standard value.

In the case where another vehicle has been approaching the host vehicle from behind but that other vehicle overtakes the host vehicle, for example, and there is no longer such another vehicle, the vehicle approach condition ceases to be met and a lane change of the host vehicle can be safely made. According to the present disclosure, when the vehicle approach condition that has been once met ceases to be met afterward, the steering reaction force given to the steering operation in the direction of the lane change of the host vehicle is set to be smaller. Therefore, when circumstances where a lane change of the host vehicle can be safely made arise, the steering operation for a lane change of the host vehicle can be facilitated.

Constituent elements of the present disclosure are not limited to those in an embodiment of the present disclosure to be described later with reference to the drawings. Other objects, other features, and accompanying advantages of the present disclosure will be easily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a graph showing yet another map used in the active steering reaction force control when a lane change of the host vehicle to the right adjacent same-direction lane or the left adjacent same-direction lane is made;

FIG. 5A is a view showing a situation where the host vehicle is traveling straight forward during execution of the normal steering reaction force control;

FIG. 5B is a view showing a situation where the host vehicle is traveling straight forward during execution of the active steering reaction force control;

FIG. 6A is a view showing a situation where the host vehicle is traveling straight forward during execution of the active steering reaction force control;

FIG. 6B is a view showing a situation where the host vehicle shown in FIG. 6A has started changing lanes during execution of the active steering reaction force control;

FIG. 6C is a view showing a situation where the host vehicle shown in FIG. 6B has moved farther forward and a right front wheel thereof has reached a position immediately before a white line during execution of the active steering reaction force control;

FIG. 6D is a view showing a situation where the host vehicle shown in FIG. 6C has moved farther forward and is traveling across the white line during execution of the active steering reaction force control;

FIG. 7A1 is a view showing a situation where the host vehicle shown in FIG. 6D has moved farther forward and the entire host vehicle has entered inside the right adjacent same-direction lane during execution of the active steering reaction force control;

FIG. 7A2 is a view showing a situation where the host vehicle shown in FIG. 7A1 has moved farther forward and the lane change thereof has been completed during execution of the active steering reaction force control;

FIG. 7B1 is a view showing a situation where the host vehicle has returned to the inside of its own lane during execution of the active steering reaction force control;

FIG. 7B2 is a view showing a situation where the host vehicle shown in FIG. 7B1 has moved farther forward and started traveling straight forward during execution of the active steering reaction force control;

FIG. 8A is a view showing a situation where the host vehicle is traveling straight forward and another vehicle traveling in the right adjacent same-direction lane is approaching the host vehicle from behind during execution of the active steering reaction force control;

FIG. 8B is a view showing a situation where the host vehicle shown in FIG. 8A has started changing lanes during execution of the active steering reaction force control;

FIG. 8C is a view showing a situation where the host vehicle shown in FIG. 8B has moved farther forward and the right front wheel thereof has reached the position immediately before the white line during execution of the active steering reaction force control;

FIG. 8D is a view showing a situation where the host vehicle shown in FIG. 8C has moved farther forward and is traveling across the white line during execution of the active steering reaction force control;

FIG. 9A1 is a view showing a situation where the host vehicle shown in FIG. 8D has moved farther forward and the entire host vehicle has entered inside the right adjacent same-direction lane during execution of the active steering reaction force control;

FIG. 9A2 is a view showing a situation where the host vehicle shown in FIG. 9A1 has moved farther forward and the lane change thereof has been completed during execution of the active steering reaction force control;

FIG. 9B1 is a view showing a situation where the host vehicle shown in FIG. 8D has returned to the inside of its own lane during execution of the active steering reaction force control;

FIG. 9B2 is a view showing a situation where the host vehicle shown in FIG. 9B1 has moved farther forward and started traveling straight forward during execution of the active steering reaction force control;

FIG. 10A is a view showing a situation where the host vehicle is traveling straight forward during execution of the active steering reaction force control;

FIG. 10B is a view showing a situation where the host vehicle shown in FIG. 10A has started changing lanes during execution of the active steering reaction force control;

FIG. 10C is a view showing a situation where the host vehicle shown in FIG. 10B has moved farther forward and the right front wheel thereof is yet to reach the position immediately before the white line during execution of the active steering reaction force control;

FIG. 10D is a view showing a situation where the host vehicle shown in FIG. 10C has moved farther forward and the right front wheel thereof has reached the position immediately before the white line during execution of the active steering reaction force control;

FIG. 12A1 is a view showing a situation where the host vehicle shown in FIG. 11 has moved farther forward and the entire host vehicle has entered inside the right adjacent same-direction lane during execution of the active steering reaction force control;

FIG. 12A2 is a view showing a situation where the host vehicle shown in FIG. 12A1 has moved farther forward and the lane change thereof has been completed during execution of the active steering reaction force control;

FIG. 12B1 is a view showing a situation where the host vehicle shown in FIG. 11 has returned to the inside of its own lane during execution of the active steering reaction force control;

FIG. 12B2 is a view showing a situation where the host vehicle shown in FIG. 12B1 has moved farther forward and started traveling straight forward during execution of the active steering reaction force control;

FIG. 13A is a view showing a situation where the host vehicle is traveling straight forward during execution of the active steering reaction force control;

FIG. 13B is a view showing a situation where the host vehicle shown in FIG. 13A has started changing lanes during execution of the active steering reaction force control;

FIG. 13C is a view showing a situation where the host vehicle shown in FIG. 13B has moved farther forward and the right front wheel thereof has reached the position immediately before the white line during execution of the active steering reaction force control;

FIG. 13D is a view showing a situation where the host vehicle shown in FIG. 13C has moved farther forward and is traveling across the white line during execution of the active steering reaction force control;

FIG. 14A1 is a view showing a situation where the host vehicle shown in FIG. 13D has moved farther forward and the entire host vehicle has entered inside the right adjacent same-direction lane during execution of the active steering reaction force control;

FIG. 14A2 is a view showing a situation where the host vehicle shown in FIG. 14A1 has moved farther forward and the lane change thereof has been completed during execution of the active steering reaction force control;

FIG. 14B1 is a view showing a situation where the host vehicle shown in FIG. 13D has returned to the inside of its own lane during execution of the active steering reaction force control;

FIG. 14B2 is a view showing a situation where the host vehicle shown in FIG. 14B1 has moved farther forward and started traveling straight forward during execution of the active steering reaction force control;

DETAILED DESCRIPTION OF EMBODIMENTS

Figure 1:
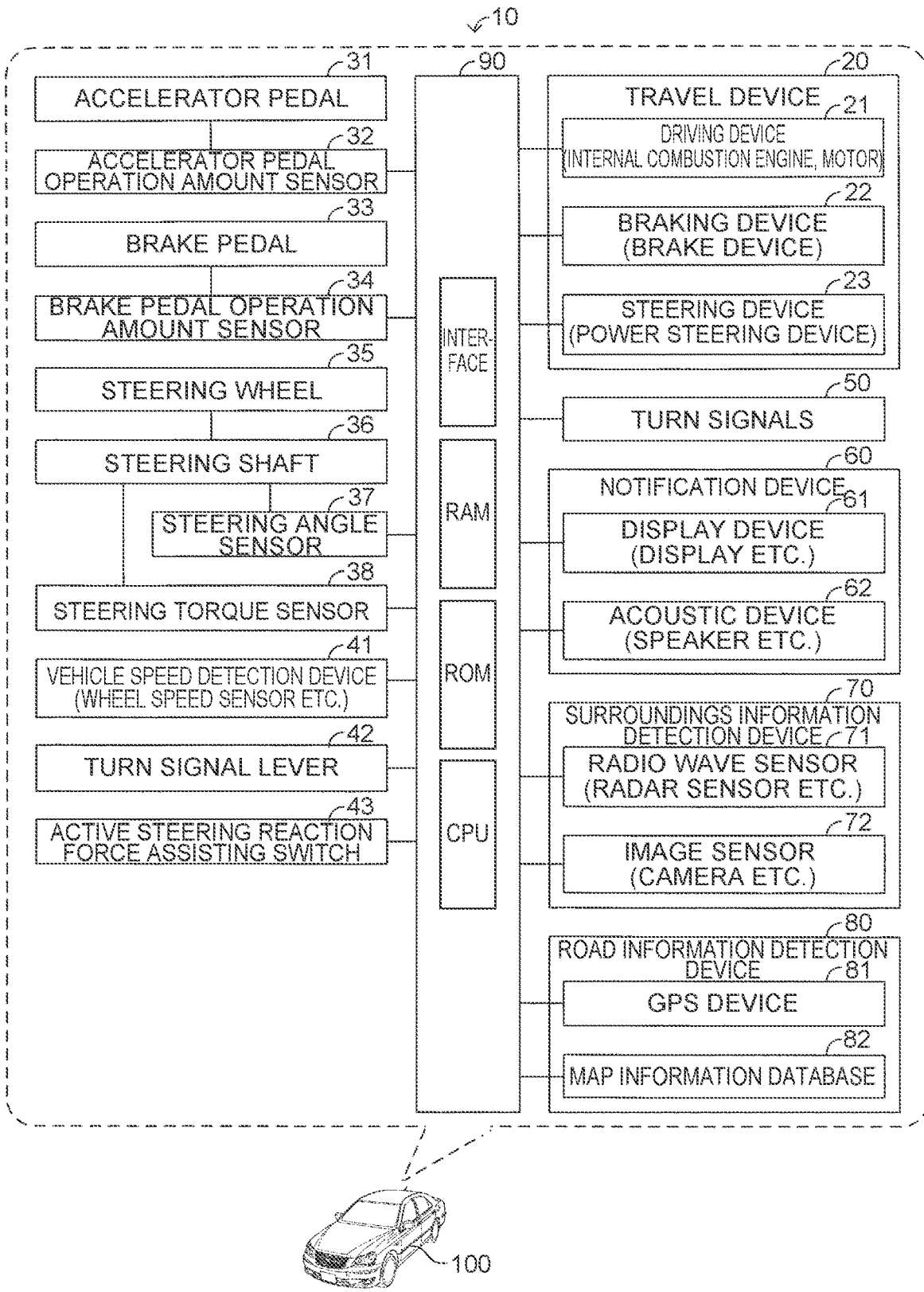
FIG. 1 is a diagram showing a vehicle control device according to an embodiment of the present disclosure and a vehicle (host vehicle) equipped with this vehicle control device.

A vehicle control device according to an embodiment of the present disclosure will be described below with reference to the drawings. As shown in FIG. 1, a vehicle control device 10 according to the embodiment of the present disclosure is installed in a host vehicle 100. In the following description, a driver of the host vehicle 100 will be referred to simply as a "driver."

ECU

The vehicle control device 10 includes an ECU 90. "ECU" stands for "electronic control unit." The ECU 90 includes a microcomputer as a main part. The microcomputer includes a CPU, an ROM, an RAM, a non-volatile memory, an interface, etc. The CPU realizes various functions by executing instructions, programs, or routines stored in the ROM.

Travel Device

The host vehicle 100 is equipped with a travel device 20. The travel device 20 includes a driving device 21, a braking device 22, and a steering device 23.

Driving Device

The driving device 21 is a device that outputs a driving torque (driving force) applied to the host vehicle 100 to cause the host vehicle 100 to travel, and is, for example, an internal combustion engine or a motor. The driving device 21 is electrically connected to the ECU 90. The ECU 90 can control the driving torque output from the driving device 21 by controlling the operation of the driving device 21.

Braking Device

The braking device 22 is a device that outputs a braking torque (braking force) applied to the host vehicle 100 to brake the host vehicle 100, and is, for example, a brake device. The braking device 22 is electrically connected to the ECU 90. The ECU 90 can control the braking torque output from the braking device 22 by controlling the operation of the braking device 22.

Steering Device

The steering device 23 is a device that outputs a steering torque (steering force) applied to the host vehicle 100 to steer the host vehicle 100, and is, for example, a power steering device. The steering device 23 is electrically connected to the ECU 90. The ECU 90 can control a steering torque and a steering reaction force, to be described alter, output from the steering device 23 by controlling the operation of the steering device 23.

Sensors

The host vehicle 100 is further equipped with an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle speed detection device 41, a turn signal lever 42, an active steering reaction force assisting switch 43, turn signals 50, a notification device 60, a surroundings information detection device 70, and a road information detection device 80.

Accelerator Pedal Operation Amount Sensor

The accelerator pedal operation amount sensor 32 is a sensor that detects an operation amount of the accelerator pedal 31, and is electrically connected to the ECU 90. The accelerator pedal operation amount sensor 32 transmits information on a detected operation amount of the accelerator pedal 31 to the ECU 90. Based on this information, the ECU 90 acquires the operation amount of the accelerator pedal 31 as an accelerator pedal operation amount AP. The ECU 90 acquires a required driving torque (required driving force) based on the accelerator pedal operation amount AP and a travel speed of the host vehicle 100, and controls the operation of the driving device 21 such that a driving torque corresponding to that required driving torque is given from the driving device 21 to the host vehicle 100 (particularly driving wheels of the host vehicle 100).

Brake Pedal Operation Amount Sensor

The brake pedal operation amount sensor 34 is a sensor that detects an operation amount of the brake pedal 33, and is electrically connected to the ECU 90. The brake pedal operation amount sensor 34 transmits information on a detected operation amount of the brake pedal 33 to the ECU 90. Based on this information, the ECU 90 acquires the operation amount of the brake pedal 33 as a brake pedal operation amount BP. The ECU 90 acquires a required braking torque (required braking force) based on the brake pedal operation amount BP, and controls the operation of the braking device 22 such that a braking torque corresponding to that required braking torque is given from the braking device 22 to the host vehicle 100 (particularly wheels of the host vehicle 100).

Steering Angle Sensor

The steering angle sensor 37 is a sensor that detects a rotation angle of the steering shaft 36 relative to a neutral position, and is electrically connected to the ECU 90. The steering angle sensor 37 transmits information on a detected rotation angle of the steering shaft 36 to the ECU 90. Based on this information, the ECU 90 acquires the rotation angle of the steering shaft 36 as a steering angle θ.

Steering Torque Sensor

The steering torque sensor 38 is a sensor that detects a torque that the driver has input into the steering shaft 36 through the steering wheel 35, and is electrically connected to the ECU 90. The steering torque sensor 38 transmits information on a detected torque to the ECU 90. Based on this information, the ECU 90 acquires the torque that the driver has input into the steering shaft 36 through the steering wheel 35 as a driver-input torque.

The ECU 90 acquires a required steering torque based on the steering angle θ, the driver-input torque, and the travel speed of the host vehicle 100, and controls the operation of the steering device 23 such that a steering torque corresponding to that required steering torque is given from the steering device 23 to the host vehicle 100 (particularly turning wheels of the host vehicle 100), and such that a reaction force corresponding to a target steering reaction force RFtgt that is set as will be described later is given to the steering wheel 35 (a steering wheel operation of by the driver). In this example, therefore, the steering device 23 includes a reaction force generator that gives a steering reaction force to a steering wheel operation (steering operation) performed on the host vehicle 100 by the driver.

Vehicle Speed Detection Device

The vehicle speed detection device 41 is a device that detects the travel speed of the host vehicle 100, and is, for example, a wheel speed sensor. The vehicle speed detection device 41 is electrically connected to the ECU 90. The vehicle speed detection device 41 transmits information on a detected travel speed of the host vehicle 100 to the ECU 90. Based on this information, the ECU 90 acquires the travel speed of the host vehicle 100 as a host vehicle speed V100.

Turn Signal Lever

The turn signal lever 42 is a lever that is operated by the driver to activate the turn signals 50, and is electrically connected to the ECU 90. When the turn signal lever 42 is operated from a neutral position to a right-turn position, the ECU 90 activates (flashes) the turn signals 50 provided at a right front-side corner part and a right rear-side corner part of the host vehicle 100. On the other hand, when the turn signal lever 42 is operated from the neutral position to a left-turn position, the ECU 90 activates (flashes) the turn signals 50 provided at a left front-side corner part and a left rear-side corner part of the host vehicle 100.

Active Steering Reaction Force Assisting Switch

The active steering reaction force assisting switch 43 is a switch that is operated by the driver to request execution of active steering reaction force control to be described later, and is electrically connected to the ECU 90. When the active steering reaction force assisting switch 43 is operated and set to an on-position, the ECU 90 determines that execution of the active steering reaction force control has been requested.

Notification Device

The notification device 60 is a device that makes various notifications to the driver, and includes a display device 61 and an acoustic device 62 in this example. The display device 61 is, for example, a display that displays various images. The acoustic device 62 is, for example, a speaker that outputs various voices.

Display Device

The display device 61 is electrically connected to the ECU 90. The ECU 90 can display various images on the display device 61.

Acoustic Device

The acoustic device 62 is electrically connected to the ECU 90. The ECU 90 can output various voices from the acoustic device 62.

Surroundings Information Detection Device

The surroundings information detection device 70 is a device that detects information on the surroundings of the host vehicle 100, and includes a radio wave sensor 71 and an image sensor 72 in this example. The radio wave sensor 71 is, for example, a radar sensor (millimeter-wave radar etc.). The image sensor 72 is, for example, a camera. The surroundings information detection device 70 may include a sound wave sensor, such as an ultrasonic sensor (clearance sonar), or an optical sensor, such as a laser radar (LiDAR).

Radio Wave Sensor

The radio wave sensor 71 is electrically connected to the ECU 90. The radio wave sensor 71 transmits radio waves and receives radio waves reflected by an object (reflected waves). The radio wave sensor 71 transmits information (detection result) on transmitted radio waves and received radio waves (reflected radio waves) to the ECU 90. In other words, the radio wave sensor 71 detects an object present around the host vehicle 100 and transmits information (detected result) on the detected object to the ECU 90. Based on this information (radio wave information), the ECU 90 acquires information on an object present around the host vehicle 100 as surroundings detection information IS. In this example, objects are vehicles, motorcycles, bicycles, persons, etc.

Image Sensor

The image sensor 72 is also electrically connected to the ECU 90. The image sensor 72 captures images of the surroundings of the host vehicle 100 and transmits information on the captured images to the ECU 90. Based on this information (camera image information), the ECU 90 acquires information about the surroundings of the host vehicle 100 as the surroundings detection information IS.

Road Information Detection Device

The road information detection device 80 includes a GPS device 81 and a map information database 82.

GPS Device

The GPS device 81 is a device that receives so-called GPS signals, and is electrically connected to the ECU 90. The ECU 90 acquires GPS signals through the GPS device 81. Based on the acquired GPS signals, the ECU 90 can acquire a current position P100 of the host vehicle 100.

Map Information Database

The map information database 82 is a database that stores map information including information about roads etc., and is electrically connected to the ECU 90. The ECU 90 acquires information about a road on which the host vehicle 100 is currently traveling and other pieces of information from the current position P100 of the host vehicle 100 as road information IR.

Overview of Operation of Vehicle Control Device

Next, an overview of the operation of the vehicle control device 10 will be described. The vehicle control device 10 executes steering reaction force control of controlling a reaction force (steering reaction force) given to the steering wheel 35 or to an operation thereof (a steering wheel operation, a steering operation) performed by the driver.

When a force that rotates the steering wheel 35 clockwise (rightward) is applied to the steering wheel 35 by the driver, the steering reaction force is a force that is applied to the steering wheel 35 as a force that rotates the steering wheel 35 counterclockwise (leftward), and when a force that rotates the steering wheel 35 counterclockwise (leftward) is applied to the steering wheel 35 by the driver, the steering reaction force is a force that is applied to the steering wheel 35 as a force that rotates the steering wheel 35 clockwise (rightward).

When execution of the active steering reaction force control is not requested, the vehicle control device 10 executes normal steering reaction force control as the steering reaction force control, and when execution of the active steering reaction force control is requested, the vehicle control device 10 executes the active steering reaction force control as the steering reaction force control.

Map

The vehicle control device 10 stores the various maps or look-up tables shown in FIG. 2A to FIG. 2F and FIG. 3A to FIG. 3F as maps or look-up tables that are used during execution of the steering reaction force control to acquire (set) a target value of the steering reaction force (target steering reaction force RFtgt) using the steering angle θ as a parameter.

FIG. 2A

Figure 2A:
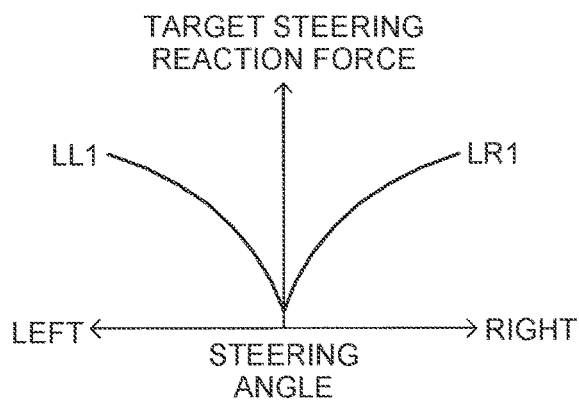
FIG. 2A is a graph showing a map used in normal steering reaction force control.

The map shown in FIG. 2A (normal assistance map) is a map used during execution of the normal steering reaction force control. According to this normal assistance map, a target steering reaction force RFtgt corresponding to the steering angle θ is acquired according to the characteristics specified by a line LR1 or a line LL1.

In the maps shown in FIG. 2A and the other drawings, the axis of abscissa represents the steering angle θ and the axis of ordinate represents the target steering reaction force RFtgt. When the steering angle θ is a value on the right side of the axis of ordinate, this steering angle θ is a steering angle at the time when the steering wheel 35 is being rotated rightward (clockwise) from the neutral position. When the steering angle θ is a value on the left side of the axis of ordinate, this steering angle θ is a steering angle at the time when the steering wheel 35 is being rotated leftward (counterclockwise) from the neutral position. When the steering angle θ is a value at the point of intersection between the axis of ordinate and the axis of abscissa, this steering angle θ is a steering angle θ at the time when the steering wheel 35 is at the neutral position, and is zero in this example.

In the maps shown in FIG. 2A and the other drawings, a line on the right side of the axis of ordinate shows a relationship between the steering angle θ and the target steering reaction force RFtgt when the steering wheel 35 is rotated rightward, and a line on the left side of the axis of ordinate shows a relationship between the steering angle θ and the target steering reaction force RFtgt when the steering wheel 35 is rotated leftward.

Thus, in the map shown in FIG. 2A, the line LR1 is a line (normal steering reaction force line) specifying the relationship between the steering angle θ and the target steering reaction force RFtgt when a rightward steering wheel operation is performed, and the target steering reaction force RFtgt acquired from the normal steering reaction force line LR1 becomes greater as the steering angle θ increases.

In the map shown in FIG. 2A, the line LL1 is a line (normal steering reaction force line) specifying the relationship between the steering angle θ and the target steering reaction force RFtgt when a leftward steering wheel operation is performed, and the target steering reaction force RFtgt acquired from the normal steering reaction force line LL1 becomes greater as the steering angle θ increases.

In this example, the normal steering reaction force line LR1 and the normal steering reaction force line LL1 are in a line-symmetrical relationship with respect to the axis of ordinate, but these lines do not have to be in such a relationship.

FIG. 2B

Figure 2B:
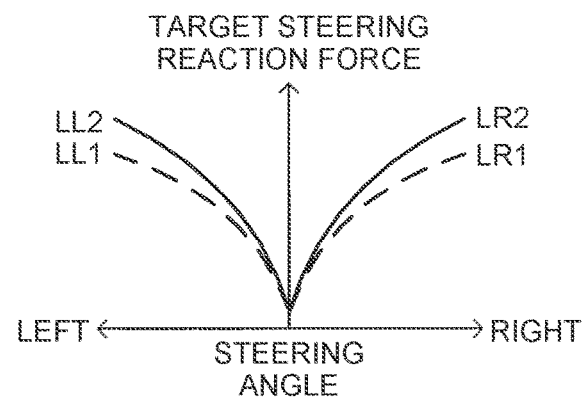
FIG. 2B is a graph showing a map used in active steering reaction force control when the host vehicle is traveling straight forward.

The map shown in FIG. 2B is a map used during execution of the active steering reaction force control. According to this map, a target steering reaction force RFtgt corresponding to the steering angle θ is acquired according to the characteristics specified by a line LR2 and a line LL2.

In the map shown in FIG. 2B, the line LR2 is a line specifying the relationship between the steering angle θ and the target steering reaction force RFtgt when a rightward steering wheel operation is performed. The target steering reaction force RFtgt acquired from the line LR2 becomes greater as the steering angle θ increases. When this target steering reaction force RFtgt is compared with the target steering reaction force RFtgt acquired from the normal steering reaction force line LR1 at the same steering angle θ, the former is greater than the latter.

In the map shown in FIG. 2B, the line LL2 is a line specifying the relationship between the steering angle θ and the target steering reaction force RFtgt when a leftward steering wheel operation is performed. The target steering reaction force RFtgt acquired from the line LL2 becomes greater as the steering angle θ increases. When this target steering reaction force RFtgt is compared with the target steering reaction force RFtgt acquired from the normal steering reaction force line LL1 at the same steering angle θ, the former is greater than the latter.

In this example, the line LR2 and the line LL2 are in a line-symmetrical relationship with respect to the axis of ordinate, but these lines do not have to be in such a relationship.

FIG. 2C

Figure 2C:
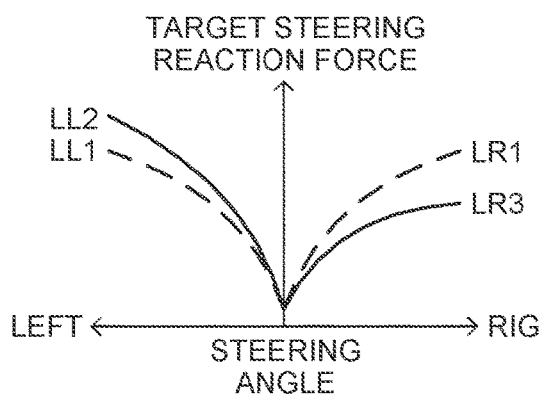
FIG. 2C is a graph showing a map used in the active steering reaction force control when a lane change of the host vehicle to a right adjacent same-direction lane is made.

The map shown in FIG. 2C is also a map used during execution of the active steering reaction force control. According to this map, a target steering reaction force RFtgt corresponding to the steering angle θ is acquired according to the characteristics specified by a line LR3 and the line LL2.

In the map shown in FIG. 2C, the line LR3 is a line specifying the relationship between the steering angle θ and the target steering reaction force RFtgt when a rightward steering wheel operation is performed. The target steering reaction force RFtgt acquired from the line LR3 becomes greater as the steering angle θ increases. When this target steering reaction force RFtgt is compared with the target steering reaction force RFtgt acquired from the normal steering reaction force line LR1 at the same steering angle θ, the former is smaller than the latter.

In the map shown in FIG. 2C, the line LL2 is the same as the line LL2 shown in FIG. 2B.

FIG. 2D

Figure 2D:
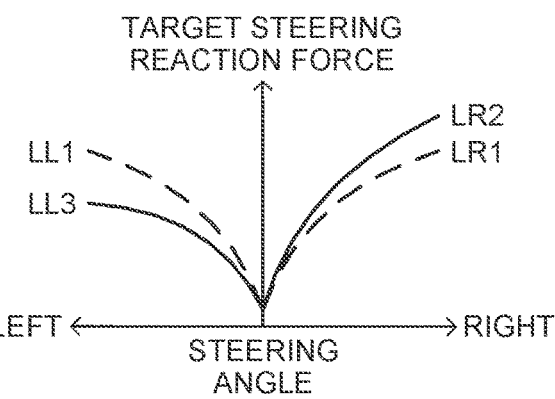
FIG. 2D is a graph showing a map used in the active steering reaction force control when a lane change of the host vehicle to a left adjacent same-direction lane is made.

The map shown in FIG. 2D is also a map used during execution of the active steering reaction force control. According to this map, a target steering reaction force RFtgt corresponding to the steering angle θ is acquired according to the characteristics specified by the line LR2 and a line LL3.

In the map shown in FIG. 2D, the line LL3 is a line specifying the relationship between the steering angle θ and the target steering reaction force RFtgt when a leftward steering wheel operation is performed. The target steering reaction force RFtgt acquired from the line LL3 becomes greater as the steering angle θ increases. When this target steering reaction force RFtgt is compared with the target steering reaction force RFtgt acquired from the normal steering reaction force line LL1 at the same steering angle θ, the former is smaller than the latter.

In the map shown in FIG. 2D, the line LR2 is the same as the line LR2 shown in FIG. 2B.

In this example, the line LR3 shown in FIG. 2C and the line LL3 shown in FIG. 2D are in a line-symmetrical relationship with respect to the axis of ordinate, but these lines do not have to be in such a relationship.

FIG. 2E

Figure 2E:
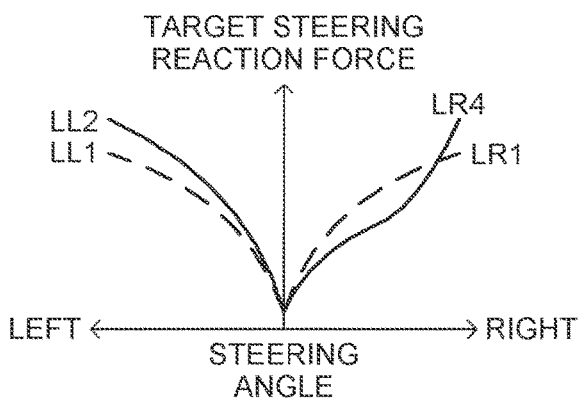
FIG. 2E is a graph showing another map used in the active steering reaction force control when a lane change of the host vehicle to the right adjacent same-direction lane is made.

The map shown in FIG. 2E is also a map used during execution of the active steering reaction force control. According to this map, a target steering reaction force RFtgt corresponding to the steering angle θ is acquired according to the characteristics specified by a line LR4 and the line LL2.

In the map shown in FIG. 2E, the line LR4 is a line specifying the relationship between the steering angle θ and the target steering reaction force RFtgt when a rightward steering wheel operation is performed. The target steering reaction force RFtgt acquired from the line LR4 becomes greater as the steering angle θ increases. When this target steering reaction force RFtgt is compared with the target steering reaction force RFtgt acquired from the normal steering reaction force line LR1 at the same steering angle θ, in a range of the steering angle θ from zero to a certain value, the former is smaller than the latter, and in a range of the steering angle θ equal to or larger than the certain value, the former is greater than the latter. Moreover, an increase rate of the target steering reaction force RFtgt acquired from the line LR4 relative to an increase in the steering angle θ is higher when the steering angle θ is equal to or larger than the certain value than when the steering angle θ is smaller than the certain value.

In the map shown in FIG. 2E, the line LL2 is the same as the line LL2 shown in FIG. 2B.

FIG. 2F

Figure 2F:
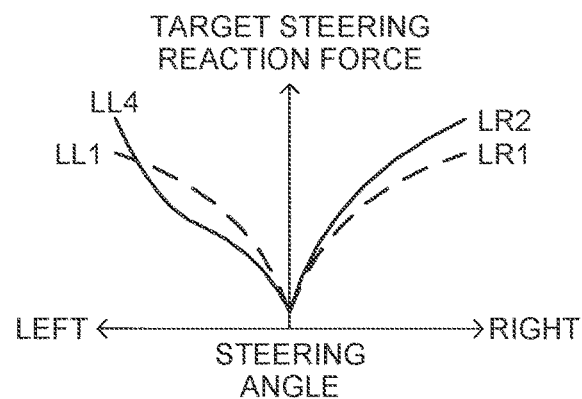
FIG. 2F is a graph showing another map used in the active steering reaction force control when a lane change of the host vehicle to the left adjacent same-direction lane is made.

The map shown in FIG. 2F is also a map used during execution of the active steering reaction force control. According to this map, a target steering reaction force RFtgt corresponding to the steering angle θ is acquired according to the characteristics specified by the line LR2 and a line LL4.

In the map shown in FIG. 2F, the line LL4 is a line specifying the relationship between the steering angle θ and the target steering reaction force RFtgt when a leftward steering wheel operation is performed. The target steering reaction force RFtgt acquired from the line LL4 becomes greater as the steering angle θ increases. When this target steering reaction force RFtgt is compared with the target steering reaction force RFtgt acquired from the normal steering reaction force line LL1 at the same steering angle 0, in a range of the steering angle θ from zero to a certain value, the former is smaller than the latter, and in a range of the steering angle θ equal to or larger than the certain value, the former is greater than the latter. Moreover, an increase rate of the target steering reaction force RFtgt acquired from the line LL4 relative to an increase in the steering angle θ is higher when the steering angle θ is equal to or larger than the certain value than when the steering angle θ is smaller than the certain value.

In the map shown in FIG. 2F, the line LR2 is the same as the line LR2 shown in FIG. 2B.

In this example, the line LR4 shown in FIG. 2E and the line LL4 shown in FIG. 2F are in a line-symmetrical relationship with respect to the axis of ordinate, but these lines do not have to be in such a relationship.

FIG. 3A

Figure 3A:
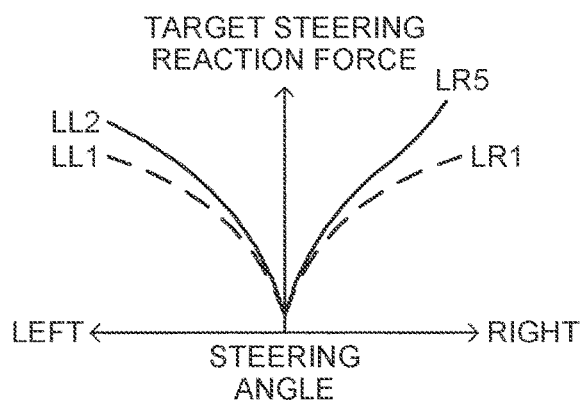
FIG. 3A is a graph showing yet another map used in the active steering reaction force control when a lane change of the host vehicle to the right adjacent same-direction lane is made.

The map shown in FIG. 3A is also a map used during execution of the active steering reaction force control. According to this map, a target steering reaction force RFtgt corresponding to the steering angle θ is acquired according to the characteristics specified by a line LR5 and the line LL2.

In the map shown in FIG. 3A, the line LR5 is a line specifying the relationship between the steering angle θ and the target steering reaction force RFtgt when a rightward steering wheel operation is performed. The target steering reaction force RFtgt acquired from the line LR5 becomes greater as the steering angle θ increases. When this target steering reaction force RFtgt is compared with the target steering reaction force RFtgt acquired from the normal steering reaction force line LR1 at the same steering angle θ, the former is greater than the latter. Moreover, an increase rate of the target steering reaction force RFtgt acquired from the line LR5 relative to an increase in the steering angle θ is higher when the steering angle θ is equal to or larger than the certain value than when the steering angle θ is smaller than the certain value.

Further, at least when the steering angle θ is equal to or larger than the certain value, the target steering reaction force RFtgt acquired from the line LR5 is greater than the target steering reaction force RFtgt acquired from the line LR2 and has a higher increase rate relative to an increase in the steering angle θ than that target steering reaction force RFtgt.

In the map shown in FIG. 3A, the line LL2 is the same as the line LL2 shown in FIG. 2B.

FIG. 3B

Figure 3B:
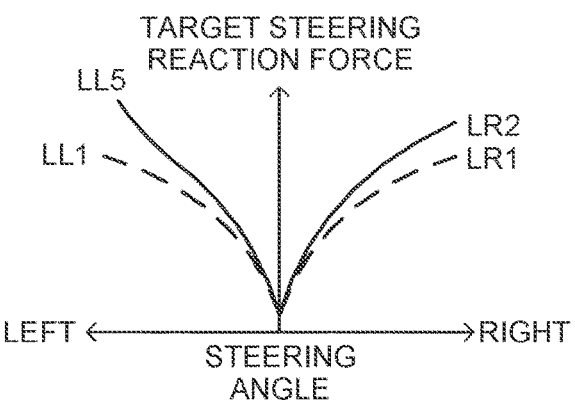
FIG. 3B is a graph showing yet another map used in the active steering reaction force control when a lane change of the host vehicle to the left adjacent same-direction lane is made.

The map shown in FIG. 3B is also a map used during execution of the active steering reaction force control. According to this map, a target steering reaction force RFtgt corresponding to the steering angle θ is acquired according to the characteristics specified by the line LR2 and a line LL5.

In the map shown in FIG. 3B, the line LL5 is a line specifying the relationship between the steering angle θ and the target steering reaction force RFtgt when a leftward steering wheel operation is performed. The target steering reaction force RFtgt acquired from the line LL5 becomes greater as the steering angle θ increases. When this target steering reaction force RFtgt is compared with the target steering reaction force RFtgt acquired from the normal steering reaction force line LL1 at the same steering angle θ, the former is greater than the latter. Moreover, an increase rate of the target steering reaction force RFtgt acquired from the line LL5 relative to an increase in the steering angle θ is higher when the steering angle θ is equal to or larger than the certain value than when the steering angle θ is smaller than the certain value.

Further, at least when the steering angle θ is equal to or larger than the certain value, the target steering reaction force RFtgt acquired from the line LL5 is greater than the target steering reaction force RFtgt acquired from the line LL2 and has a higher increase rate relative to an increase in the steering angle θ than that target steering reaction force RFtgt.

In the map shown in FIG. 3B, the line LR2 is the same as the line LR2 shown in FIG. 2B.

In this example, the line LR5 shown in FIG. 3A and the line LL5 shown in FIG. 3B are in a line-symmetrical relationship with respect to the axis of ordinate, but these lines do not have to be in such a relationship.

FIG. 3C

Figure 3C:
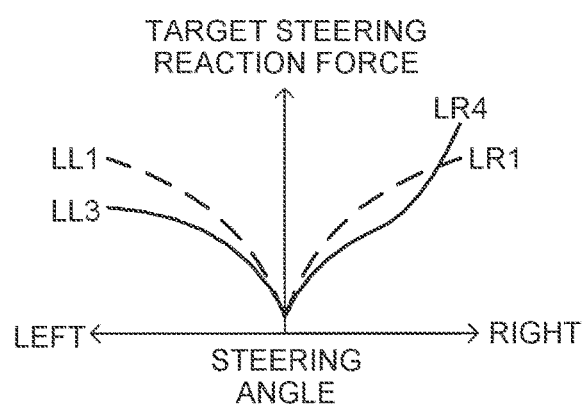
FIG. 3C is a graph showing yet another map used in the active steering reaction force control when a lane change of the host vehicle to the right adjacent same-direction lane is made.

The map shown in FIG. 3C is also a map used during execution of the active steering reaction force control. According to this map, a target steering reaction force RFtgt corresponding to the steering angle θ is acquired according to the characteristics specified by the line LR4 and the line LL3. The line LR4 is the same as the line LR4 shown in FIG. 2E, and the line LL3 is the same as the line LL3 shown in FIG. 2D.

FIG. 3D

Figure 3D:
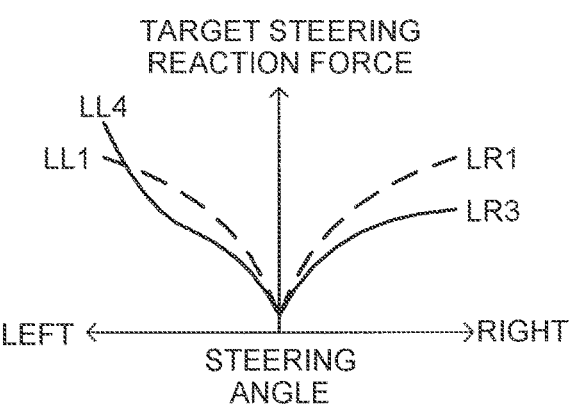
FIG. 3D is a graph showing yet another map used in the active steering reaction force control when a lane change of the host vehicle to the left adjacent same-direction lane is made.

The map shown in FIG. 3D is also a map used during execution of the active steering reaction force control. According to this map, a target steering reaction force RFtgt corresponding to the steering angle θ is acquired according to the characteristics specified by the line LR3 and the line LL4. The line LL4 is the same as the line LL4 shown in FIG. 2F, and the line LR3 is the same as the line LR3 shown in FIG. 2C.

FIG. 3E

Figure 3E:
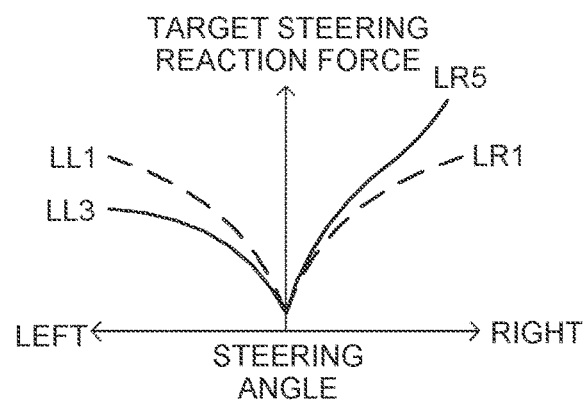
FIG. 3E is a graph showing yet another map used in the active steering reaction force control when a lane change of the host vehicle to the right adjacent same-direction lane is made.

The map shown in FIG. 3E is also a map used during execution of the active steering reaction force control. According to this map, a target steering reaction force RFtgt corresponding to the steering angle θ is acquired according to the characteristics specified by the line LR5 and the line LL3. In the map shown in FIG. 3E, the line LR5 is the same as the line LR5 shown in FIG. 3A, and the line LL3 is the same as the line LL3 shown in FIG. 2D.

FIG. 3F

Figure 3F:
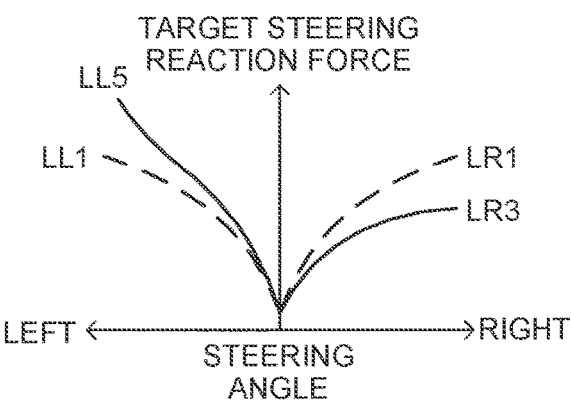
FIG. 3F is a graph showing yet another map used in the active steering reaction force control when a lane change of the host vehicle to the left adjacent same-direction lane is made.

The map shown in FIG. 3F is also a map used during execution of the active steering reaction force control. According to this map, a target steering reaction force RFtgt corresponding to the steering angle θ is acquired according to the characteristics specified by the line LR3 and the line LL5. In the map shown in FIG. 3F, the line LL5 is the same as the line LL5 shown in FIG. 3B, and the line LR3 is the same as the line LR3 shown in FIG. 2C.

FIG. 4

The map shown in FIG. 4 is also a map used during execution of the active steering reaction force control. According to this map, a target steering reaction force RFtgt corresponding to the steering angle θ is acquired according to the characteristics specified by the line LR3 and the line LL3. In the map shown in FIG. 4, the line LR3 is the same as the line LR3 shown in FIG. 2C, and the line LL3 is the same as the line LL3 shown in FIG. 2D.

Normal Steering Reaction Force Control

As described earlier, when execution of the active steering reaction force control is not requested, the vehicle control device 10 executes the normal steering reaction force control as the steering reaction force control.

The normal steering reaction force control is control of setting the target steering reaction force RFtgt based on the steering angle θ (an amount of steering operation) and giving a steering reaction force (normal steering reaction force) corresponding to that target steering reaction force RFtgt to the steering wheel 35 (steering wheel operation). In this example, the normal steering reaction force control is control of setting the target steering reaction force RFtgt using the normal assistance map shown in FIG. 2A and giving a steering reaction force (normal steering reaction force) corresponding to that target steering reaction force RFtgt to the steering wheel 35.

FIG. 5A

Therefore, during execution of the normal steering reaction force control, as shown in FIG. 5A, the vehicle control device 10 acquires (sets) the target steering reaction force RFtgt by applying the steering angle θ to the normal assistance map shown in FIG. 2A, and controls the operation of the steering device 23 such that a steering reaction force (normal steering reaction force) corresponding to that target steering reaction force RFtgt is given from the steering device 23 to the steering wheel 35.

According to this, as the steering angle θ becomes larger, a greater steering reaction force (normal steering reaction force) is given to the steering wheel 35.

The vehicle control device 10 may be configured to, instead of acquiring (setting) the target steering reaction force RFtgt using the maps shown in FIG. 2A and the other drawings, acquire (set) the target steering reaction force RFtgt by arithmetic operation using an arithmetic expression specifying the relationship between the steering angle θ and the target steering reaction force RFtgt. In this case, the vehicle control device 10 acquires (sets) the target steering reaction force RFtgt by arithmetic operation by applying the steering angle θ to the arithmetic expression.

Active Steering Reaction Force Control

On the other hand, during execution of the active steering reaction force control, the vehicle control device 10 executes the active steering reaction force control as the steering reaction force control. In this case, when a lane-change start condition is not met, the vehicle control device 10 executes active straight-forward steering reaction force control as the active steering reaction force control, and when the lane-change start condition is met, the vehicle control device 10 executes active lane-change steering reaction force control as the active steering reaction force control.

The lane-change start condition is met when the driver starts a steering wheel operation for changing the lane of the host vehicle 100 (lane-change steering wheel operation), and ceases to be met when, after the lane-change start condition is met, the lane change of the host vehicle 100 is completed or the lane change of the host vehicle 100 is canceled.

The vehicle control device 10 may be configured to determine that the driver has started a lane-change steering wheel operation, i.e., that the lane-change start condition is met, when the turn signals 50 are activated and there is an adjacent same-direction lane in the turning direction of the host vehicle 100 indicated by the turn signals 50, and to determine that the lane-change start condition is not met when this is not the case. In this example, however, the vehicle control device 10 determines that the driver has started a lane-change steering wheel operation, i.e., that the lane-change start condition is met, when the turn signals 50 are activated and there is an adjacent same-direction lane in the turning direction of the host vehicle 100 indicated by the turn signals 50 and the steering wheel 35 is rotated in the turning direction of the host vehicle 100 indicated by the turn signals 50, and determines that the lane-change start condition is not met when this is not the case.

Here, in this example, an adjacent same-direction lane is a lane which is adjacent to an own lane (the lane in which the host vehicle 100 is traveling) and in which the travel direction of vehicles is the same as the travel direction of the host vehicle 100 in the own lane. Examples of adjacent same-direction lanes include: in a situation where the host vehicle 100 is traveling in a climbing lane, a travel lane adjacent to that climbing lane (own lane); a right-turn-only lane and a left-turn-only lane diverging from the own lane; in a situation where the host vehicle 100 is traveling in a main lane of an expressway, a branch road heading from the main lane (own lane) toward an exit of the expressway; and in a situation where the host vehicle 100 is traveling in a merging road (own lane) toward a main lane of an expressway, that main lane of the expressway with which the merging road merges.

In the following description, the right adjacent same-direction lane is an adjacent same-direction lane that is provided adjacently to the right of the own lane, and the left adjacent same-direction lane is an adjacent same-direction lane that is provided adjacently to the left of the own lane.

Whether there is an adjacent same-direction lane in the turning direction of the host vehicle 100 indicated by the turn signals 50 is determined based on the surroundings detection information IS and/or the road information IR.

On the other hand, when, after the lane-change start condition is met and then the entire host vehicle 100 enters the adjacent same-direction lane, the steering angle θ decreases to a relatively small value within a predetermined range and this state continues for a predetermined period, the vehicle control device 10 determines that the lane change of the host vehicle 100 has been completed.

When, at the point in time when a predetermined time has elapsed since the lane-change start condition has been met, the lane change of the host vehicle 100 is not completed and the host vehicle 100 is traveling in the own lane and a state where the steering angle θ is a relatively small value within the predetermined range continues for a predetermined period, the vehicle control device 10 determines that the lane change of the host vehicle 100 has been canceled.

Active Straight-Forward Steering Reaction Force Control

The active straight-forward steering reaction force control is control of setting the target steering reaction force RFtgt based on the steering angle θ and giving a steering reaction force (normal steering reaction force) corresponding to that target steering reaction force RFtgt to the steering wheel 35. In this example, the active straight-forward steering reaction force control is control of setting the target steering reaction force RFtgt using the map shown in FIG. 2B and giving a steering reaction force (normal steering reaction force) corresponding to that target steering reaction force RFtgt to the steering wheel 35.

FIG. 5B

Therefore, during execution of the active straight-forward steering reaction force control, when the host vehicle 100 is traveling straight forward as shown in FIG. 5B, the vehicle control device 10 acquires (sets) the target steering reaction force RFtgt by applying the steering angle θ to the map shown in FIG. 2B, and controls the operation of the steering device 23 such that a steering reaction force (active straight-forward steering reaction force) corresponding to that target steering reaction force RFtgt is given from the steering device 23 to the steering wheel 35.

According to this, as the steering angle θ becomes larger, a greater steering reaction force (active straight-forward steering reaction force) is given to the steering wheel 35. When the steering reaction force given by the active straight-forward steering reaction force control (an active straight-forward steering reaction force) is compared with the steering reaction force given by the normal steering reaction force control (a normal steering reaction force; a reaction force of a standard value) at the same steering angle θ, the former is greater than the latter.

Thus, the vehicle control device 10 is configured to set the steering reaction force to be greater when the active steering reaction force control is executed and the lane-change start condition is not met than when the active steering reaction force control is not executed (i.e., when the normal steering reaction force control is executed).

According to this, it is made difficult for the driver to increase the amount of steering wheel operation compared with when the normal steering reaction force control is executed, which helps the driver keep the amount of steering wheel operation at near zero and maintain the rotation position of the steering wheel 35 for causing the host vehicle 100 to travel straight forward.

Active Lane-Change Steering Reaction Force Control

The active lane-change steering reaction force control is control of setting a target value of a steering reaction force (target steering reaction force RFtgt) based on the steering angle θ and giving a steering reaction force (active lane-change steering reaction force) corresponding to that target steering reaction force RFtgt to the steering wheel 35. In this example, the active lane-change steering reaction force control is control of giving a steering reaction force (active lane-change steering reaction force) corresponding to a target steering reaction force RFtgt that is set as follows to the steering wheel 35 according to whether a vehicle approach condition is met or not.

The vehicle approach condition is met when another vehicle traveling in an adjacent same-direction lane to which the lane of the host vehicle 100 is to be changed is approaching the host vehicle 100 from behind and the distance between that other vehicle and the host vehicle 100 is a distance within a predetermined distance, and is not met when this is not the case.

Or in the case where a road on which the host vehicle 100 is traveling is a road provided with three lanes (so-called three-lane road), the vehicle approach condition is met when another vehicle traveling in the right adjacent same-direction lane or the left adjacent same-direction lane to which the lane of the host vehicle 100 is to be changed is approaching the host vehicle 100 from behind and the distance between that other vehicle and the host vehicle 100 is a distance within the predetermined distance, and is not met when this is not the case.

Further, the vehicle approach condition is met when a relative speed between the host vehicle 100 and another vehicle traveling in an adjacent same-direction lane to which the driver is going to change the lane of the host vehicle 100 reaches a speed equal to or higher than a predetermined speed as that other vehicle traveling on a front side of the host vehicle 100 decelerates, for example, and the distance between that other vehicle and the host vehicle 100 reaches a distance within the predetermined distance, and is not met when this is not the case.

Whether the vehicle approach condition is met or not is determined based on the surroundings detection information IS.

Examples of situations where the driver changes the lane of the host vehicle 100 include, other than situations to be described below, a situation where the driver causes the host vehicle 100 to enter a main lane of an expressway from a gently curved road leading to the main lane of the expressway, and a situation where the driver causes the host vehicle 100 to enter a right-turn-only lane from the own lane, and the vehicle control device 10 is also applicable to such situations.

Scene 1

First, the operation of the vehicle control device 10 in a situation where the vehicle approach condition is not met while a lane change of the host vehicle 100 to an adjacent same-direction lane is made will be described.

FIG. 6A

During execution of the active steering reaction force control, when the host vehicle 100 is traveling straight forward as shown in FIG. 6A and the lane-change start condition is not met, as described earlier, the vehicle control device 10 sets the target steering reaction force RFtgt using the map shown in FIG. 2B and controls the operation of the steering device 23 such that a steering reaction force corresponding to that target steering reaction force RFtgt is given to the steering wheel 35.

FIG. 6B

Thereafter, when a lane change of the host vehicle 100 to the right adjacent same-direction lane is started as shown in FIG. 6B and the vehicle approach condition is not met at the time when the lane-change start condition is met, the vehicle control device 10 switches the map used for setting the target steering reaction force RFtgt from the map shown in FIG. 2B to the map shown in FIG. 2C to set the target steering reaction force RFtgt, and controls the operation of the steering device 23 such that a steering reaction force corresponding to that target steering reaction force RFtgt is given to the steering wheel 35.

According to this, a steering reaction force specified by the line LR3 is given to the rightward steering wheel operation, and when this steering reaction force is compared with the normal steering reaction force at the same steering angle θ, the former is smaller than the latter. On the other hand, a steering reaction force specified by the line LL2 is given to the leftward steering wheel operation, and when this steering reaction force is compared with the normal steering reaction force at the same steering angle θ, the former is greater than the latter.

In the case where a lane change of the host vehicle 100 to the left adjacent same-direction lane is started, the vehicle control device 10 switches the map used for setting the target steering reaction force RFtgt from the map shown in FIG. 2B to the map shown in FIG. 2D to set the target steering reaction force RFtgt, and controls the operation of the steering device 23 such that a steering reaction force corresponding to that target steering reaction force RFtgt is given to the steering wheel 35.

According to this, a steering reaction force specified by the line LL3 is given to the leftward steering wheel operation, and when this steering reaction force is compared with the normal steering reaction force at the same steering angle θ, the former is smaller than the latter. On the other hand, a steering reaction force specified by the line LR2 is given to the rightward steering wheel operation, and when this steering reaction force is compared with the normal steering reaction force at the same steering angle θ, the former is greater than the latter.

Thus, the vehicle control device 10 is configured such that, when the lane-change start condition is met during execution of the active steering reaction force control, the vehicle control device 10 sets the steering reaction force given to the steering wheel operation in the direction of the lane change of the host vehicle 100 to be smaller and sets the steering reaction force given to the steering wheel operation in the opposite direction to be greater than when the lane-change start condition is not met.

According to this, it is made easier for the driver to perform the lane-change steering wheel operation.

In this example, when the map used for setting the target steering reaction force RFtgt is switched from one map (first map) to another map (second map), the target steering reaction force RFtgt set for the same steering angle θ may change continuously from the target steering reaction force RFtgt set from the first map to the target steering reaction force RFtgt set from the second map, instead of switching stepwise from the former to the latter.

FIG. 6C, FIG. 6D, and FIG. 7A1

Thereafter, the front wheel of the host vehicle 100 reaches a position immediately before a white line (a white line separating the own lane and the right adjacent same-direction lane) (a position at a predetermined distance from the white line toward the host vehicle 100) as shown in FIG. 6C, and then the host vehicle 100 moves across the white line as shown in FIG. 6D. Thereafter, the entire host vehicle 100 enters the right adjacent same-direction lane as shown in FIG. 7A1. After the lane-change start condition is met and before the entire host vehicle 100 thus enters the right adjacent same-direction lane, unless the vehicle approach condition is met, the vehicle control device 10 sets the target steering reaction force RFtgt using the map shown in FIG. 2C, and controls the operation of the steering device 23 such that a steering reaction force corresponding to that target steering reaction force RFtgt is given to the steering wheel 35.

In the case where a lane change of the host vehicle 100 to the left adjacent same-direction lane is made, after the lane-change start condition is met and before the entire host vehicle 100 enters the left adjacent same-direction lane, the vehicle control device 10 sets the target steering reaction force RFtgt using the map shown in FIG. 2D, and controls the operation of the steering device 23 such that a steering reaction force corresponding to that target steering reaction force RFtgt is given to the steering wheel 35.

The white line separating the own lane and the right adjacent same-direction lane and the white line separating the own lane and the left adjacent same-direction lane are detected based on the surroundings detection information IS.

When the entire host vehicle 100 enters the right adjacent same-direction lane as shown in FIG. 7A1, the vehicle control device 10 switches the map used for setting the target steering reaction force RFtgt from the map shown in FIG. 2C to the map shown in FIG. 2E to set the target steering reaction force RFtgt, and controls the operation of the steering device 23 such that a steering reaction force corresponding to that target steering reaction force RFtgt is given to the steering wheel 35.

According to this, a steering reaction force specified by the line LR4 is given to the rightward steering wheel operation, and this steering reaction force has a higher increase rate relative to an increase in the steering angle θ when the steering angle θ is equal to or larger than a certain value than when the steering angle θ is smaller than the certain value.

In the case where circumstances corresponding to those shown in FIG. 7A1 arise while a lane change of the host vehicle 100 to the left adjacent same-direction lane is made, the vehicle control device 10 switches the map used for setting the target steering reaction force RFtgt from the map shown in FIG. 2D to the map shown in FIG. 2F to set the target steering reaction force RFtgt, and controls the operation of the steering device 23 such that a steering reaction force corresponding to that target steering reaction force RFtgt is given to the steering wheel 35.

According to this, a steering reaction force specified by the line LL4 is given to the leftward steering wheel operation, and this steering reaction force has a higher increase rate relative to an increase in the steering angle θ when the steering angle θ is equal to or larger than a certain value than when the steering angle θ is smaller than the certain value.

Thus, the vehicle control device 10 is configured such that, when, after the lane-change start condition is met, the entire host vehicle 100 enters an adjacent same-direction lane to which the lane of the host vehicle 100 is to be changed, the vehicle control device 10 gives a steering reaction force to the steering wheel operation in the direction of the lane change of the host vehicle 100 by setting a target steering reaction force RFtgt so as to have a higher increase rate relative to an increase in the steering angle θ when the steering angle θ is equal to or larger than a certain value than when the steering angle θ is smaller than the certain value.

According to this, it is made easier for the driver to perform the steering wheel operation of reducing the steering angle θ (i.e., the operation of returning the steering wheel 35 to the neutral position).

FIG. 7A2

Thereafter, when the lane change of the host vehicle 100 to the right adjacent same-direction lane is completed as shown in FIG. 7A2, the vehicle control device 10 switches the map used for setting the target steering reaction force RFtgt from the map shown in FIG. 2E to the map shown in FIG. 2B to set the target steering reaction force RFtgt, and controls the operation of the steering device 23 such that a steering reaction force corresponding to that target steering reaction force RFtgt is given to the steering wheel 35.

In the case where a lane change of the host vehicle 100 to the left adjacent same-direction lane is made, when the lane change of the host vehicle 100 to the left adjacent same-direction lane is completed, the vehicle control device 10 switches the map used for setting the target steering reaction force RFtgt from the map shown in FIG. 2F to the map shown in FIG. 2B to set the target steering reaction force RFtgt, and controls the operation of the steering device 23 such that a steering reaction force corresponding to that target steering reaction force RFtgt is given to the steering wheel 35 (steering wheel operation).

FIG. 7B1

On the other hand, when, after the lane change of the host vehicle 100 to the right adjacent same-direction lane is started, the steering wheel operation is switched and the host vehicle 100 is returned to the original lane (own lane) as shown in FIG. 7B1, the vehicle control device 10 switches the map used for setting the target steering reaction force RFtgt to the map shown in FIG. 2F to set the target steering reaction force RFtgt, and controls the operation of the steering device 23 such that a steering reaction force corresponding to that target steering reaction force RFtgt is given to the steering wheel 35.

According to this, a steering reaction force specified by the line LL4 is given to the leftward steering wheel operation, and this steering reaction force has a higher increase rate relative to an increase in the steering angle θ when the steering angle θ is equal to or larger than a certain value than when the steering angle θ is smaller than the certain value.

In the case where circumstances corresponding to those shown in FIG. 7B1 arise while a lane change of the host vehicle 100 to the left adjacent same-direction lane is made, the vehicle control device 10 switches the map used for setting the target steering reaction force RFtgt to the map shown in FIG. 2E to set the target steering reaction force RFtgt, and controls the operation of the steering device 23 such that a steering reaction force corresponding to that target steering reaction force RFtgt is given to the steering wheel 35.

According to this, a steering reaction force specified by the line LR4 is given to the rightward steering wheel operation, and this steering reaction force has a higher increase rate relative to an increase in the steering angle θ when the steering angle θ is equal to or larger than a certain value than when the steering angle θ is smaller than the certain value.

Thus, the vehicle control device 10 is configured such that, during execution of the active steering reaction force control, when the steering wheel operation is switched and the host vehicle 100 is returned to the original lane (own lane), the vehicle control device 10 gives a steering reaction force to the steering wheel operation in the opposite direction from the direction of the lane change of the host vehicle 100 (the steering wheel operation in the direction of returning the host vehicle 100 to the original lane) by setting a target steering reaction force RFtgt so as to have a higher increase rate relative to an increase in the steering angle θ when the steering angle θ is equal to or larger than a certain value than when the steering angle θ is smaller than the certain value.

According to this, it is made easier for the driver to perform the steering wheel operation of reducing the steering angle θ (i.e., the operation of returning the steering wheel 35 to the neutral position).

FIG. 7B2

Thereafter, when the host vehicle 100 returns to the own lane as shown in FIG. 7B2 and the vehicle control device 10 determines that the lane change of the host vehicle 100 to the right adjacent same-direction lane has been canceled, the vehicle control device 10 switches the map used for setting the target steering reaction force RFtgt from the map shown in FIG. 2F to the map shown in FIG. 2B to set the target steering reaction force RFtgt, and controls the operation of the steering device 23 such that a steering reaction force corresponding to that target steering reaction force RFtgt is given to the steering wheel 35.

In the case where a lane change of the host vehicle 100 to the left adjacent same-direction lane is made, when the host vehicle 100 has returned to the own lane and the vehicle control device 10 determines that that the lane change of the host vehicle 100 to the left adjacent same-direction lane has been canceled, the vehicle control device 10 switches the map used for setting the target steering reaction force RFtgt from the map shown in FIG. 2E to the map shown in FIG. 2B to set the target steering reaction force RFtgt, and controls the operation of the steering device 23 such that a steering reaction force corresponding to that target steering reaction force RFtgt is given to the steering wheel 35.

The above is the operation of the vehicle control device 10 in a situation where the vehicle approach condition is not met while a lane change of the host vehicle 100 to an adjacent same-direction lane is made.

Scene 2

Next, the operation of the vehicle control device 10 in a situation where the vehicle approach condition is met at the point in time when the lane-change start condition is met will be described.

FIG. 8A

During execution of the active steering reaction force control, when the host vehicle 100 is traveling straight forward as shown in FIG. 8A and the lane-change start condition is not met, as described earlier, the vehicle control device 10 sets the target steering reaction force RFtgt using the map shown in FIG. 2B, and controls the operation of the steering device 23 such that a steering reaction force corresponding to that target steering reaction force RFtgt is given to the steering wheel 35.

In the example shown in FIG. 8A, another vehicle 200 traveling in the right adjacent same-direction lane is approaching the host vehicle 100 from behind.

FIG. 8B

Thereafter, a lane change of the host vehicle 100 to the right adjacent same-direction lane is started as shown in FIG. 8B, and when the vehicle approach condition is met at the time when the lane-change start condition is met, the vehicle control device 10 sets the target steering reaction force RFtgt by continuously using the map shown in FIG.

2B, and controls the operation of the steering device 23 such that a steering reaction force corresponding to that target steering reaction force RFtgt is given to the steering wheel 35.

According to this, a steering reaction force specified by the line LR2 is given to the rightward steering wheel operation, and when this steering reaction force is compared with the normal steering reaction force at the same steering angle θ, the former is greater than the latter.

Also when the vehicle approach condition is met at the time when a lane change of the host vehicle 100 to the left adjacent same-direction lane is started, the vehicle control device 10 sets the target steering reaction force RFtgt by continuously using the map shown in FIG. 2B, and controls the operation of the steering device 23 such that a steering reaction force corresponding to that target steering reaction force RFtgt is given to the steering wheel 35.

According to this, a steering reaction force specified by the line LL2 is given to the leftward steering wheel operation, and when this steering reaction force is compared with the normal steering reaction force at the same steering angle θ, the former is greater than the latter.

Thus, the vehicle control device 10 is configured such that, during execution of the active steering reaction force control, when the lane-change start condition is met and the vehicle approach condition is met at that time, the vehicle control device 10 sets the steering reaction force given to the steering wheel operation in the direction of the lane change of the host vehicle 100 to be greater than when the vehicle approach condition is not met.

According to this, it is made difficult for the driver to operate the steering wheel 35 in the direction of the lane change of the host vehicle 100, which can reduce the likelihood of contact between the host vehicle 100 and the other vehicle 200.

FIG. 8C

When the lane-change steering wheel operation is continued thereafter and the front wheel of the host vehicle 100 reaches the position immediately before the white line (the position at the predetermined distance from the white line toward the host vehicle 100) as shown in FIG. 8C, and the vehicle approach condition is still met at that time, the vehicle control device 10 switches the map used for setting the target steering reaction force RFtgt from the map shown in FIG. 2B to the map shown in FIG. 3A to set the target steering reaction force RFtgt, and controls the operation of the steering device 23 such that a steering reaction force corresponding to that target steering reaction force RFtgt is given to the steering wheel 35.

According to this, a steering reaction force specified by the line LR5 is given to the rightward steering wheel operation. When the steering angle θ is equal to or larger than a certain value, this steering reaction force is greater than the steering reaction force given according to the line LR2 and has a higher increase rate relative to an increase in the steering angle θ than that steering reaction force.

In the case where circumstances corresponding to those shown in FIG. 8C arise while a lane change of the host vehicle 100 to the left adjacent same-direction lane is made, the vehicle control device 10 switches the map used for setting the target steering reaction force RFtgt from the map shown in FIG. 2B to the map shown in FIG. 3B to set the target steering reaction force RFtgt, and controls the operation of the steering device 23 such that a steering reaction force corresponding to that target steering reaction force RFtgt is given to the steering wheel 35.

According to this, a steering reaction force specified by the line LL5 is given to the leftward steering wheel operation. When the steering angle θ is equal to or larger than a certain value, this steering reaction force is greater than the steering reaction force given according to the line LL2 and has a higher increase rate relative to an increase in the steering angle θ than that steering reaction force.

Thus, the vehicle control device 10 is configured such that, during execution of the active steering reaction force control, when the front wheel of the host vehicle 100 reaches the position immediately before the white line (the position at the predetermined distance from the white line toward the host vehicle 100) as a result of the lane-change steering wheel operation in a state where the vehicle approach condition is met, the vehicle control device 10 sets the steering reaction force given to the steering wheel operation in the direction of the lane change of the host vehicle 100 to be even greater.

According to this, it is made more difficult for the driver to operate the steering wheel 35 in the direction of the lane change of the host vehicle 100, which can reduce the likelihood of contact between the host vehicle 100 and the other vehicle 200.

FIG. 8D

When the lane-change steering wheel operation is continued thereafter and the host vehicle 100 moves across the white line as shown in FIG. 8D, and the vehicle approach condition is still met at that time, the vehicle control device 10 switches the map used for setting the target steering reaction force RFtgt from the map shown in FIG. 3A to the map shown in FIG. 4 to set the target steering reaction force RFtgt, and controls the operation of the steering device 23 such that a steering reaction force corresponding to that target steering reaction force RFtgt is given to the steering wheel 35.

According to this, a steering reaction force specified by the line LR3 is given to the rightward steering wheel operation, while a steering reaction force specified by the line LL3 is given to the leftward steering wheel operation. When these steering reaction forces are compared with the normal steering reaction forces at the same steering angle θ, the former are smaller than the latter.

In the case where circumstances corresponding to those shown in FIG. 8D arise while a lane change of the host vehicle 100 to the left adjacent same-direction lane is made, the vehicle control device 10 switches the map used for setting the target steering reaction force RFtgt from the map shown in FIG. 3B to the map shown in FIG. 4 to set the target steering reaction force RFtgt, and controls the operation of the steering device 23 such that a steering reaction force corresponding to that target steering reaction force RFtgt is given to the steering wheel 35.

According to this, a steering reaction force specified by the line LR3 is given to the rightward steering wheel operation, while a steering reaction force specified by the line LL3 is given to the leftward steering wheel operation. When these steering reaction forces are compared with the normal steering reaction forces at the same steering angle θ, the former are smaller than the latter.

Thus, the vehicle control device 10 is configured such that, during execution of the active steering reaction force control, when the host vehicle 100 starts to move across the white line as a result of the lane-change steering wheel operation in a state where the vehicle approach condition is met, the vehicle control device 10 sets the steering reaction forces given to the steering wheel operations in the direction of the lane change of the host vehicle 100 and in the opposite direction to be smaller.

According to this, it is made easier for the driver to perform the steering wheel operation both when continuing the lane-change steering wheel operation to continue the lane change of the host vehicle 100, and when switching the steering wheel operation and returning the host vehicle 100 to the original lane (own lane) to avoid contact between the host vehicle 100 and another vehicle 200, at the discretion of the driver.

FIG. 9A1

When the lane-change steering wheel operation is continued thereafter and the entire host vehicle 100 enters the right adjacent same-direction lane as shown in FIG. 9A1, the vehicle control device 10 switches the map used for setting the target steering reaction force RFtgt from the map shown in FIG. 4 to the map shown in FIG. 3C to set the target steering reaction force RFtgt, and controls the operation of the steering device 23 such that a steering reaction force corresponding to that target steering reaction force RFtgt is given to the steering wheel 35.

According to this, a steering reaction force specified by the line LR4 is given to the rightward steering wheel operation, and this steering reaction force has a higher increase rate relative to an increase in the steering angle θ when the steering angle θ is equal to or larger than a certain value than when the steering angle θ is smaller than the certain value.

In the case where circumstances corresponding to those shown in FIG. 9A1 arise while a lane change of the host vehicle 100 to the left adjacent same-direction lane is made, the vehicle control device 10 switches the map used for setting the target steering reaction force RFtgt from the map shown in FIG. 4 to the map shown in FIG. 3D to set the target steering reaction force RFtgt, and controls the operation of the steering device 23 such that a steering reaction force corresponding to that target steering reaction force RFtgt is given to the steering wheel 35.

According to this, a steering reaction force specified by the line LL4 is given to the leftward steering wheel operation, and this steering reaction force has a higher increase rate relative to an increase in the steering angle θ when the steering angle θ is equal to or larger than a certain value than when the steering angle θ is smaller than the certain value.

Thus, the vehicle control device 10 is configured such that, in a situation where the vehicle approach condition is met at the time when a lane change of the host vehicle 100 to an adjacent same-direction lane is started during execution of the active steering reaction force control, when the lane-change steering wheel operation is continued and the entire host vehicle 100 enters the adjacent same-direction lane, the vehicle control device 10 gives a steering reaction force to the lane-change steering wheel operation by setting the target steering reaction force RFtgt so as to have a higher increase rate relative to an increase in the steering angle θ when the steering angle θ is equal to or larger than a certain value than when the steering angle θ is smaller than the certain value.

According to this, it is made easier for the driver to perform the steering wheel operation of reducing the steering angle θ (i.e., the operation of returning the steering wheel 35 to the neutral position).

FIG. 9A2

Thereafter, when the lane change of the host vehicle 100 to the right adjacent same-direction lane is completed as shown in FIG. 9A2, the vehicle control device 10 switches the map used for setting the target steering reaction force RFtgt from the map shown in FIG. 3C to the map shown in FIG. 2B to set the target steering reaction force RFtgt, and controls the operation of the steering device 23 such that a steering reaction force corresponding to that target steering reaction force RFtgt is given to the steering wheel 35.

In the case where circumstances corresponding to those shown in FIG. 9B2 arise while a lane change of the host vehicle 100 to the left adjacent same-direction lane is made, the vehicle control device 10 switches the map used for setting the target steering reaction force RFtgt from the map shown in FIG. 3D to the map shown in FIG. 2B to set the target steering reaction force RFtgt, and controls the operation of the steering device 23 such that a steering reaction force corresponding to that target steering reaction force RFtgt is given to the steering wheel 35.

FIG. 9B1

On the other hand, when the steering wheel operation is switched after the circumstances shown in FIG. 8D arise, and the host vehicle 100 is returned to the original lane (own lane) as shown in FIG. 9B1, the vehicle control device 10 switches the map used for setting the target steering reaction force RFtgt from the map shown in FIG. 4 to the map shown in FIG. 3D to set the target steering reaction force RFtgt, and controls the operation of the steering device 23 such that a steering reaction force corresponding to that target steering reaction force RFtgt is given to the steering wheel 35.

According to this, a steering reaction force specified by the line LL4 is given to the leftward steering wheel operation, and this steering reaction force has a higher increase rate relative to an increase in the steering angle θ when the steering angle θ is equal to or larger than a certain value than when the steering angle θ is smaller than the certain value.

In the case where circumstances corresponding to those shown in FIG. 9B1 arise while a lane change of the host vehicle 100 to the left adjacent same-direction lane is made, the vehicle control device 10 switches the map used for setting the target steering reaction force RFtgt from the map shown in FIG. 4 to the map shown in FIG. 3C to set the target steering reaction force RFtgt, and controls the operation of the steering device 23 such that a steering reaction force corresponding to that target steering reaction force RFtgt is given to the steering wheel 35.

According to this, a steering reaction force specified by the line LR4 is given to the rightward steering wheel operation, and this steering reaction force has a higher increase rate relative to an increase in the steering angle θ when the steering angle θ is equal to or larger than a certain value than when the steering angle θ is smaller than the certain value.

Thus, the vehicle control device 10 is configured such that, during execution of the active steering reaction force control, when a state where the host vehicle 100 moves across the white line while the vehicle approach condition is met arises and thereafter the steering wheel operation is switched and the host vehicle 100 is returned to the original lane (own lane), the vehicle control device 10 gives a steering reaction force to the steering wheel operation in the opposite direction from the direction of the lane change of the host vehicle 100 (the steering wheel operation in the direction of returning the host vehicle 100 to the original lane) by setting the target steering reaction force RFtgt so as to have a higher increase rate relative to an increase in the steering angle θ when the steering angle θ is equal to or larger than a certain value than when the steering angle θ is smaller than the certain value.

According to this, it is made easier for the driver to perform the steering wheel operation of reducing the steering angle θ (i.e., the operation of returning the steering wheel 35 to the neutral position).

FIG. 9B2

Thereafter, when the host vehicle 100 returns to the own lane as shown in FIG. 9B2 and the vehicle control device 10 determines that the lane change of the host vehicle 100 to the right adjacent same-direction lane has been canceled, the vehicle control device 10 switches the map used for setting the target steering reaction force RFtgt from the map shown in FIG. 3D to the map shown in FIG. 2B to set the target steering reaction force RFtgt, and controls the operation of the steering device 23 such that a steering reaction force corresponding to that target steering reaction force RFtgt is given to the steering wheel 35.

In the case where circumstances corresponding to those shown in FIG. 9B2 arise while a lane change of the host vehicle 100 to the left adjacent same-direction lane is made, the vehicle control device 10 switches the map used for setting the target steering reaction force RFtgt from the map shown in FIG. 3C to the map shown in FIG. 2B to set the target steering reaction force RFtgt, and controls the operation of the steering device 23 such that a steering reaction force corresponding to that target steering reaction force RFtgt is given to the steering wheel 35.

When, after the circumstances shown in FIG. 8C arise, the steering wheel operation is switched and the host vehicle 100 is returned to the original lane (own lane), the vehicle control device 10 switches the map used for setting the target steering reaction force RFtgt from the map shown in FIG. 3A to a map combining the line LR5 in the map shown in FIG. 3A and the line LL4 in the map shown in FIG. 3D to set the target steering reaction force RFtgt, and controls the operation of the steering device 23 such that a steering reaction force corresponding to that target steering reaction force RFtgt is given to the steering wheel 35.

According to this, a steering reaction force specified by the line LL4 is given to the leftward steering wheel operation, and this steering reaction force has a higher increase rate relative to an increase in the steering angle θ when the steering angle θ is equal to or larger than a certain value than when the steering angle θ is smaller than the certain value.

The above is the operation of the vehicle control device 10 in a situation where the vehicle approach condition is met at the point in time when the lane-change start condition is met.

When, after a lane change of the host vehicle 100 to the right adjacent same-direction lane is started, the vehicle approach condition that has been once met ceases to be met as another vehicle 200 overtakes the host vehicle 100, for example, the vehicle control device 10 switches the map used for setting the target steering reaction force RFtgt to the map shown in FIG. 2C to set the target steering reaction force RFtgt, and controls the operation of the steering device 23 such that a steering reaction force corresponding to that target steering reaction force RFtgt is given to the steering wheel 35.

When, after a lane change of the host vehicle 100 to the left adjacent same-direction lane is started, the vehicle approach condition that has been once met ceases to be met as another vehicle 200 overtakes the host vehicle 100, for example, the vehicle control device 10 switches the map used for setting the target steering reaction force RFtgt to the map shown in FIG. 2D to set the target steering reaction force RFtgt, and controls the operation of the steering device 23 such that a steering reaction force corresponding to that target steering reaction force RFtgt is given to the steering wheel 35.

Scene 3

Next, the operation of the vehicle control device 10 in a situation where the vehicle approach condition that has not been met at the point in time when the lane-change start condition has been met is met before the front wheel of the host vehicle 100 reaches the position immediately before the white line (the position at the predetermined distance from the white line toward the host vehicle 100) will be described.

FIG. 10A

During execution of the active steering reaction force control, when the host vehicle 100 is traveling straight forward as shown in FIG. 8A and the lane-change start condition is not met, as described earlier, the vehicle control device 10 sets the target steering reaction force RFtgt using the map shown in FIG. 2B and controls the operation of the steering device 23 such that a steering reaction force corresponding to that target steering reaction force RFtgt is given to the steering wheel 35.

FIG. 10B

Thereafter, when a lane change of the host vehicle 100 to the right adjacent same-direction lane is started as shown in FIG. 10B and the vehicle approach condition is not met at the time when the lane-change start condition is met, the vehicle control device 10 switches the map used for setting the target steering reaction force RFtgt from the map shown in FIG. 2B to the map shown in FIG. 2C to set the target steering reaction force RFtgt, and controls the operation of the steering device 23 such that a steering reaction force corresponding to that target steering reaction force RFtgt is given to the steering wheel 35.

In the case where a lane change of the host vehicle 100 to the left adjacent same-direction lane is started, the vehicle control device 10 switches the map used for setting the target steering reaction force RFtgt from the map shown in FIG. 2B to the map shown in FIG. 2D to set the target steering reaction force RFtgt, and controls the operation of the steering device 23 such that a steering reaction force corresponding to that target steering reaction force RFtgt is given to the steering wheel 35.

FIG. 10C

Thereafter, when the vehicle approach condition is met before the front wheel of the host vehicle 100 reaches the position immediately before the white line (the position at the predetermined distance from the white line toward the host vehicle 100) as shown in FIG. 10C, the vehicle control device 10 switches the map used for setting the target steering reaction force RFtgt from the map shown in FIG. 2C to the map shown in FIG. 2D to set the target steering reaction force RFtgt, and controls the operation of the steering device 23 such that a steering reaction force corresponding to that target steering reaction force RFtgt is given to the steering wheel 35.

According to this, a steering reaction force specified by the line LR2 is given to the rightward steering wheel operation, and when this steering reaction force is compared with the normal steering reaction force at the same steering angle θ, the former is greater than the latter. On the other hand, a steering reaction force specified by the line LL3 is given to the leftward steering wheel operation, and when this steering reaction force is compared with the normal steering reaction force at the same steering angle θ, the former is smaller than the latter.

In the case where circumstances corresponding to those shown in FIG. 10C arise while a lane change of the host vehicle 100 to the left adjacent same-direction lane is made, the vehicle control device 10 switches the map used for setting the target steering reaction force RFtgt from the map shown in FIG. 2D to the map shown in FIG. 2C to set the target steering reaction force RFtgt, and controls the operation of the steering device 23 such that a steering reaction force corresponding to that target steering reaction force RFtgt is given to the steering wheel 35.

According to this, a steering reaction force specified by the line LL2 is given to the leftward steering wheel operation, and when this steering reaction force is compared with the normal steering reaction force at the same steering angle $\theta$, the former is greater than the latter. On the other hand, a steering reaction force specified by the line LR3 is given to the rightward steering wheel operation, and when this steering reaction force is compared with the normal steering reaction force at the same steering angle $\theta$, the former is smaller than the latter.

Thus, the vehicle control device 10 is configured such that, during execution of the active steering reaction force control, when the vehicle approach condition is met before the front wheel of the host vehicle 100 reaches the position immediately before the white line (the position at the predetermined distance from the white line toward the host vehicle 100) while a lane change of the host vehicle 100 to an adjacent same-direction lane is made, the vehicle control device 10 sets the steering reaction force given to the lane-change steering wheel operation to be greater and sets the steering reaction force given to the steering wheel operation for returning the host vehicle 100 to the original lane (own lane) to be smaller.

According to this, it is made easier for the driver to perform the steering wheel operation of returning the host vehicle 100 to the original lane (own lane).

FIG. 10D

When the lane-change steering wheel operation is continued thereafter and the front wheel of the host vehicle 100 reaches the position immediately before the white line (the position at the predetermined distance from the white line toward the host vehicle 100) as shown in FIG. 10D, and the vehicle approach condition is still met at that time, the vehicle control device 10 switches the map used for setting the target steering reaction force RFtgt from the map shown in FIG. 2D to the map shown in FIG. 3E to set the target steering reaction force RFtgt, and controls the operation of the steering device 23 such that a steering reaction force corresponding to that target steering reaction force RFtgt is given to the steering wheel 35.

According to this, a steering reaction force specified by the line LR5 is given to the rightward steering wheel operation. When the steering angle $\theta$ is equal to or larger than a certain value, this steering reaction force is greater than the steering reaction force given according to the line LR2 and has a higher increase rate relative to an increase in the steering angle $\theta$ than that steering reaction force.

In the case where circumstances corresponding to those shown in FIG. 10D arise while a lane change of the host vehicle 100 to the left adjacent same-direction lane is made, the vehicle control device 10 switches the map used for setting the target steering reaction force RFtgt from the map shown in FIG. 2C to the map shown in FIG. 3F to set the target steering reaction force RFtgt, and controls the operation of the steering device 23 such that a steering reaction force corresponding to that target steering reaction force RFtgt is given to the steering wheel 35.

According to this, a steering reaction force specified by the line LL5 is given to the leftward steering wheel operation. When the steering angle $\theta$ is equal to or larger than a certain value, this steering reaction force is greater than the steering reaction force given according to the line LL2 and has a higher increase rate relative to an increase in the steering angle $\theta$ than that steering reaction force.

Thus, the vehicle control device 10 is configured such that, during execution of the active steering reaction force control, when the vehicle approach condition is met and thereafter the front wheel of the host vehicle 100 reaches the position immediately before the white line (the position at the predetermined distance from the white line toward the host vehicle 100) as a result of the lane-change steering wheel operation, the vehicle control device 10 sets the steering reaction force given to the steering wheel operation in the direction of the lane change of the host vehicle 100 to be even greater.

According to this, it is made even more difficult for the driver to perform the lane-change steering wheel operation, which can reduce the likelihood of contact between the host vehicle 100 and the other vehicle 200.

FIG. 11

Figure 11:
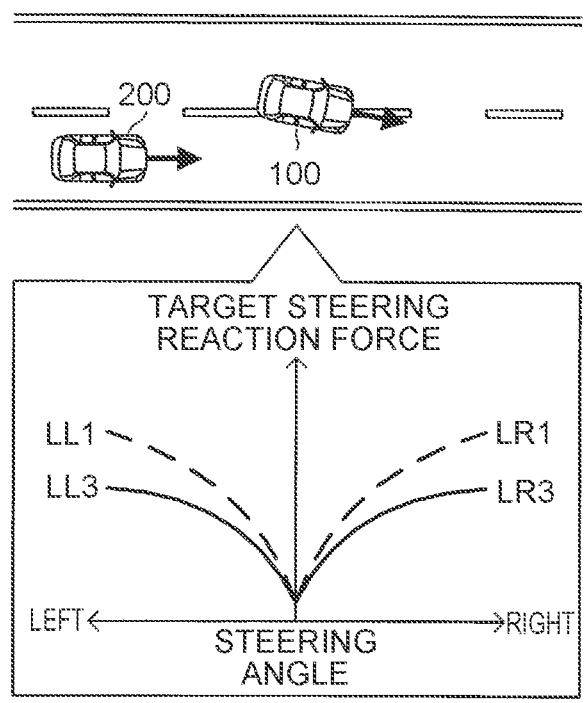
FIG. 11 is a view showing a situation where the host vehicle shown in FIG. 10D has moved farther forward and is traveling across the white line during execution of the active steering reaction force control.

When the lane-change steering wheel operation is continued thereafter and the host vehicle 100 starts to move across the white line as shown in FIG. 11, and the vehicle approach condition is still met at that time, the vehicle control device 10 switches the map used for setting the target steering reaction force RFtgt from the map shown in FIG. 3E to the map shown in FIG. 4 to set the target steering reaction force RFtgt, and controls the operation of the steering device 23 such that a steering reaction force corresponding to that target steering reaction force RFtgt is given to the steering wheel 35.

According to this, a steering reaction force specified by the line LR3 is given to the rightward steering wheel operation, while a steering reaction force specified by the line LL3 is given to the leftward steering wheel operation. When these steering reaction forces are compared with the normal steering reaction forces at the same steering angle $\theta$, the former are smaller than the latter.

In the case where circumstances corresponding to those shown in FIG. 11 arise while a lane change of the host vehicle 100 to the left adjacent same-direction lane is made, the vehicle control device 10 switches the map used for setting the target steering reaction force RFtgt from the map shown in FIG. 3F to the map shown in FIG. 4 to set the target steering reaction force RFtgt, and controls the operation of the steering device 23 such that a steering reaction force corresponding to that target steering reaction force RFtgt is given to the steering wheel 35.

According to this, a steering reaction force specified by the line LR3 is given to the rightward steering wheel operation, while a steering reaction force specified by the line LL3 is given to the leftward steering wheel operation. When these steering reaction forces are compared with the normal steering reaction forces at the same steering angle $\theta$, the former are smaller than the latter.

Thus, the vehicle control device 10 is configured such that, during execution of the active steering reaction force control, when the vehicle approach condition is met and thereafter the host vehicle 100 starts to move across the white line as a result of the lane-change steering wheel operation, the vehicle control device 10 sets the steering reaction forces given to the steering wheel operations in the direction of the lane change of the host vehicle 100 and in the opposite direction to be smaller.

According to this, it is made easier for the driver to perform the steering wheel operation both when continuing the lane-change steering wheel operation to continue the lane change of the host vehicle 100, and when switching the steering wheel operation and returning the host vehicle 100 to the original lane (own lane) to avoid contact between the host vehicle 100 and another vehicle 200, at the discretion of the driver.

FIG. 12A1

When the lane-change steering wheel operation is continued thereafter and the entire host vehicle 100 enters the right adjacent same-direction lane as shown in FIG. 12A1, the vehicle control device 10 controls the operation of the steering device 23 in the same manner as when the circumstances shown in FIG. 9A1 described earlier arise.

In the case where circumstances corresponding to those shown in FIG. 12A1 arise while a lane change of the host vehicle 100 to the left adjacent same-direction lane is made, the vehicle control device 10 controls the operation of the steering device 23 in the same manner as when circumstances corresponding to those shown in FIG. 9A1 described earlier arise.

Thus, the vehicle control device 10 is configured such that, in a situation where, during execution of the active steering reaction force control, a lane change of the host vehicle 100 to an adjacent same-direction lane is started and thereafter the vehicle approach condition is met before the front wheel of the host vehicle 100 reaches the position immediately before the white line (the position at the predetermined distance from the white line toward the host vehicle 100), when the lane-change steering wheel operation is continued and the entire host vehicle 100 enters the adjacent same-direction lane, the vehicle control device 10 gives a steering reaction force to the lane-change steering wheel operation by setting the target steering reaction force RFtgt so as to have a higher increase rate relative to an increase in the steering angle θ when the steering angle θ is equal to or larger than a certain value than when the steering angle θ is smaller than the certain value.

According to this, it is made easier for the driver to perform the steering wheel operation of reducing the steering angle θ (i.e., the operation of returning the steering wheel 35 to the neutral position).

FIG. 12A2

Thereafter, when the lane change of the host vehicle 100 to the right adjacent same-direction lane is completed as shown in FIG. 12A2, the vehicle control device 10 controls the operation of the steering device 23 in the same manner as when the circumstances shown in FIG. 9A2 described earlier arise.

In the case where circumstances corresponding to those shown in FIG. 12A2 arise while a lane change of the host vehicle 100 to the left adjacent same-direction lane is made, the vehicle control device 10 controls the operation of the steering device 23 in the same manner as when circumstances corresponding to those shown in FIG. 9A2 described earlier arise.

FIG. 12B1

On the other hand, when, after the circumstances shown in FIG. 11 arise, the steering wheel operation is switched and the host vehicle 100 is returned to the original lane (own lane) as shown in FIG. 12B1, the vehicle control device 10 controls the operation of the steering device 23 in the same manner as when the circumstances shown in FIG. 9B1 described earlier arise.

In the case where circumstances corresponding to those shown in FIG. 12B1 arise while a lane change of the host vehicle 100 to the left adjacent same-direction lane is made, the vehicle control device 10 controls the operation of the steering device 23 in the same manner as when circumstances corresponding to those shown in FIG. 9B1 described earlier arise.

Thus, the vehicle control device 10 is configured such that, during execution of the active steering reaction force control, when a state where the host vehicle 100 moves across the white line while the vehicle approach condition is met arises and thereafter the steering wheel operation is switched and the host vehicle 100 is returned to the original lane (own lane), the vehicle control device 10 gives a steering reaction force to the steering wheel operation in the opposite direction from the direction of the lane change of the host vehicle 100 (the steering wheel operation in the direction of returning the host vehicle 100 to the original lane) by setting the target steering reaction force RFtgt so as to have a higher increase rate relative to an increase in the steering angle θ when the steering angle θ is equal to or larger than a certain value than when the steering angle θ is smaller than the certain value.

FIG. 12B2

Thereafter, when the host vehicle 100 returns to the own lane as shown in FIG. 12B2 and the vehicle control device 10 determines that the lane change of the host vehicle 100 to the right adjacent same-direction lane has been canceled, the vehicle control device 10 controls the operation of the steering device 23 in the same manner as when the circumstances shown in FIG. 9B2 described earlier arise.

In the case where circumstances corresponding to those shown in FIG. 12B2 arise while a lane change of the host vehicle 100 to the left adjacent same-direction lane is made, the vehicle control device 10 controls the operation of the steering device 23 in the same manner as when circumstances corresponding to those shown in FIG. 9B2 described earlier arise.

The above is the operation of the vehicle control device 10 in a situation where the vehicle approach condition that has not been met at the point in time when the lane-change start condition has been met is met before the front wheel of the host vehicle 100 reaches the position immediately before the white line (the position at the predetermined distance from the white line toward the host vehicle 100).

Scene 4

Next, the operation of the vehicle control device 10 in a situation where the vehicle approach condition that has not been met at the point in time when the lane-change start condition has been met is met while the host vehicle 100 is moving across the white line will be described.

FIG. 13A

During execution of the active steering reaction force control, when the host vehicle 100 is traveling straight forward as shown in FIG. 13A and the lane-change start condition is not met, as described earlier, the vehicle control device 10 sets the target steering reaction force RFtgt using the map shown in FIG. 2B and controls the operation of the steering device 23 such that a steering reaction force corresponding to that target steering reaction force RFtgt is given to the steering wheel 35.

FIG. 13B

Thereafter, when a lane change of the host vehicle 100 to the right adjacent same-direction lane is started as shown in FIG. 13B and the vehicle approach condition is not met at the time when the lane-change start condition is met, the vehicle control device 10 switches the map used for setting the target steering reaction force RFtgt from the map shown in FIG. 2B to the map shown in FIG. 2C to set the target steering reaction force RFtgt, and controls the operation of the steering device 23 such that a steering reaction force corresponding to that target steering reaction force RFtgt is given to the steering wheel 35.

According to this, a steering reaction force specified by the line LR3 is given to the rightward steering wheel operation, and when this steering reaction force is compared with the normal steering reaction force at the same steering angle $\theta$, the former is smaller than the latter. On the other hand, a steering reaction force specified by the line LL2 is given to the leftward steering wheel operation, and when this steering reaction force is compared with the normal steering reaction force at the same steering angle $\theta$, the former is greater than the latter.

In the case where a lane change of the host vehicle 100 to the left adjacent same-direction lane is started, the vehicle control device 10 switches the map used for setting the target steering reaction force RFtgt from the map shown in FIG. 2B to the map shown in FIG. 2D to set the target steering reaction force RFtgt, and controls the operation of the steering device 23 such that a steering reaction force corresponding to that target steering reaction force RFtgt is given to the steering wheel 35.

According to this, a steering reaction force specified by the line LL3 is given to the leftward steering wheel operation, and when this steering reaction force is compared with the normal steering reaction force at the same steering angle $\theta$, the former is smaller than the latter. On the other hand, a steering reaction force specified by the line LR2 is given to the rightward steering wheel operation, and when this steering reaction force is compared with the normal steering reaction force at the same steering angle $\theta$, the former is greater than the latter.

Thus, the vehicle control device 10 is configured such that, when the lane-change start condition is met during execution of the active steering reaction force control, the vehicle control device 10 sets the steering reaction force given to the steering wheel operation in the direction of the lane change of the host vehicle 100 to be smaller and sets the steering reaction force given to the steering wheel operation in the opposite direction to be greater than when the lane-change start condition is not met.

According to this, it is made easier for the driver to perform the lane-change steering wheel operation.

FIG. 13C and FIG. 13D

Thereafter, the front wheel of the host vehicle 100 reaches the position immediately before the white line (the position at the predetermined distance from the white line toward the host vehicle 100) as shown in FIG. 13C, and then the host vehicle 100 moves across the white line as shown in FIG. 13D. After the lane-change start condition is met and before the host vehicle 100 thus starts to move across the white line, unless the vehicle approach condition is met, the vehicle control device 10 sets the target steering reaction force RFtgt using the map shown in FIG. 2C and controls the operation of the steering device 23 such that a steering reaction force corresponding to that target steering reaction force RFtgt is given to the steering wheel 35.

In the case where a lane change of the host vehicle 100 to the left adjacent same-direction lane is made, after the lane-change start condition is met and before the host vehicle 100 starts to move across the white line, the vehicle control device 10 sets the target steering reaction force RFtgt using the map shown in FIG. 2D, and controls the operation of the steering device 23 such that a steering reaction force corresponding to that target steering reaction force RFtgt is given to the steering wheel 35.

FIG. 13D

Thereafter, when the host vehicle 100 starts to move across the white line as shown in FIG. 13D and the vehicle approach condition is met at that time, the vehicle control device 10 switches the map used for setting the target steering reaction force RFtgt from the map shown in FIG. 2C to the map shown in FIG. 4 to set the target steering reaction force RFtgt, and controls the operation of the steering device 23 such that a steering reaction force corresponding to that target steering reaction force RFtgt is given to the steering wheel 35.

According to this, a steering reaction force specified by the line LR3 is given to the rightward steering wheel operation, while a steering reaction force specified by the line LL3 is given to the leftward steering wheel operation. When these steering reaction forces are compared with the normal steering reaction forces at the same steering angle $\theta$, the former are smaller than the latter.

In the case where circumstances corresponding to those shown in FIG. 13D arise while a lane change of the host vehicle 100 to the left adjacent same-direction lane is made, the vehicle control device 10 switches the map used for setting the target steering reaction force RFtgt from the map shown in FIG. 2D to the map shown in FIG. 4 to set the target steering reaction force RFtgt, and controls the operation of the steering device 23 such that a steering reaction force corresponding to that target steering reaction force RFtgt is given to the steering wheel 35.

According to this, a steering reaction force specified by the line LR3 is given to the rightward steering wheel operation, and a steering reaction force specified by the line LL3 is given to the leftward steering wheel operation. When these steering reaction forces are compared with the normal steering reaction forces at the same steering angle $\theta$, the former are smaller than the latter.

Thus, the vehicle control device 10 is configured such that, during execution of the active steering reaction force control, when a lane change of the host vehicle 100 to an adjacent same-direction lane is started and the vehicle approach condition is met at the time when the host vehicle 100 starts to move across the white line, the vehicle control device 10 sets the steering reaction forces given to steering wheel operations in the direction of the lane change of the host vehicle 100 and in the opposite direction to be smaller.

According to this, it is made easier for the driver to perform the steering wheel operation both when continuing the lane-change steering wheel operation to continue the lane change of the host vehicle 100, and when switching the steering wheel operation and returning the host vehicle 100 to the original lane (own lane) to avoid contact between the host vehicle 100 and another vehicle 200, at the discretion of the driver.

FIG. 14A1

When the lane-change steering wheel operation is continued thereafter and the entire host vehicle 100 enters the right adjacent same-direction lane as shown in FIG. 14A1, the vehicle control device 10 controls the operation of the steering device 23 in the same manner as when the circumstances shown in FIG. 9A1 described earlier arise.

In the case where circumstances corresponding to those shown in FIG. 14A1 arise while a lane change of the host vehicle 100 to the left adjacent same-direction lane is made, the vehicle control device 10 controls the operation of the steering device 23 in the same manner as when circumstances corresponding to those shown in FIG. 9A1 described earlier arise.

Thus, the vehicle control device 10 is configured such that, in a situation where, during execution of the active steering reaction force control, a lane change of the host vehicle 100 to an adjacent same-direction lane is started and thereafter the vehicle approach condition is met while the host vehicle 100 is traveling across the white line, when the lane-change steering wheel operation is continued and the entire host vehicle 100 enters the adjacent same-direction lane, the vehicle control device 10 gives a steering reaction force to the lane-change steering wheel operation by setting the target steering reaction force RFtgt so as to have a higher increase rate relative to an increase in the steering angle θ when the steering angle θ is equal to or larger than a certain value than when the steering angle θ is smaller than the certain value.

According to this, it is made easier for the driver to perform the steering wheel operation of reducing the steering angle θ (i.e., the operation of returning the steering wheel 35 to the neutral position).

FIG. 14A2

Thereafter, when the lane change of the host vehicle 100 to the right adjacent same-direction lane is completed as shown in FIG. 14A2, the vehicle control device 10 controls the operation of the steering device 23 in the same manner as when the circumstances shown in FIG. 9A2 described earlier arise.

In the case where circumstances corresponding to those shown in FIG. 14A2 arise while a lane change of the host vehicle 100 to the left adjacent same-direction lane is made, the vehicle control device 10 controls the operation of the steering device 23 in the same manner as when circumstances corresponding to those shown in FIG. 9A2 described earlier arise.

FIG. 14B1

On the other hand, when, after the circumstances shown in FIG. 10D arise, the steering wheel operation is switched and the host vehicle 100 is returned to the original lane (own lane) as shown in FIG. 14B1, the vehicle control device 10 controls the operation of the steering device 23 in the same manner as when the circumstances shown in FIG. 9B1 described earlier arise.

In the case where circumstances corresponding to those shown in FIG. 14B1 arise while a lane change of the host vehicle 100 to the left adjacent same-direction lane is made, the vehicle control device 10 controls the operation of the steering device 23 in the same manner as when circumstances corresponding to those shown in FIG. 9B1 described earlier arise.

Thus, the vehicle control device 10 is configured such that, during execution of the active steering reaction force control, when a lane change of the host vehicle 100 to an adjacent same-direction lane is started and thereafter the vehicle approach condition is met while the host vehicle 100 is moving across the white line, and then the steering wheel operation is switched and the host vehicle 100 is returned to the original lane (own lane), the vehicle control device 10 gives a steering reaction force to the steering wheel operation in the opposite direction from the direction of the lane change of the host vehicle 100 (the steering wheel operation in the direction of returning the host vehicle 100 to the original lane) by setting the target steering reaction force RFtgt so as to have a higher increase rate relative to an increase in the steering angle θ when the steering angle θ is equal to or larger than a certain value than when the steering angle θ is smaller than the certain value.

FIG. 14B2

Thereafter, when the host vehicle 100 returns to the own lane as shown in FIG. 14B2 and the vehicle control device 10 determines that the lane change of the host vehicle 100 to the right adjacent same-direction lane has been canceled, the vehicle control device 10 controls the operation of the steering device 23 in the same manner as when the circumstances shown in FIG. 9B2 described earlier arise.

In the case where circumstances corresponding to those shown in FIG. 14B2 arise while a lane change of the host vehicle 100 to the left adjacent same-direction lane is made, the vehicle control device 10 controls the operation of the steering device 23 in the same manner as when circumstances corresponding to those shown in FIG. 9B2 described earlier arise.

The above is the operation of the vehicle control device 10 in a situation where the vehicle approach condition that has not been met at the point in time when the lane-change start condition has been met is met while the host vehicle 100 is moving across the white line.

The vehicle control device 10 may be configured to display, by the display device 61, an image to notify the driver that another vehicle 200 is approaching the host vehicle 100 from behind when the vehicle approach condition is met. Further, the vehicle control device 10 may be configured to output, from the acoustic device 62, a voice to notify the driver that another vehicle 200 is approaching the host vehicle 100 from behind when the vehicle approach condition is met.

Specific Operation of Vehicle Control Device

Next, the specific operation of the vehicle control device 10 will be described. The CPU of the ECU 90 of the vehicle control device 10 executes the routine shown in FIG. 15 on a predetermined arithmetic operation cycle. Therefore, when a predetermined timing comes, the CPU starts from the processing of step 1500 of the routine shown in FIG. 15 and moves to the processing of step 1505, where it determines whether execution of the active steering reaction force control is requested.

Figure 15:
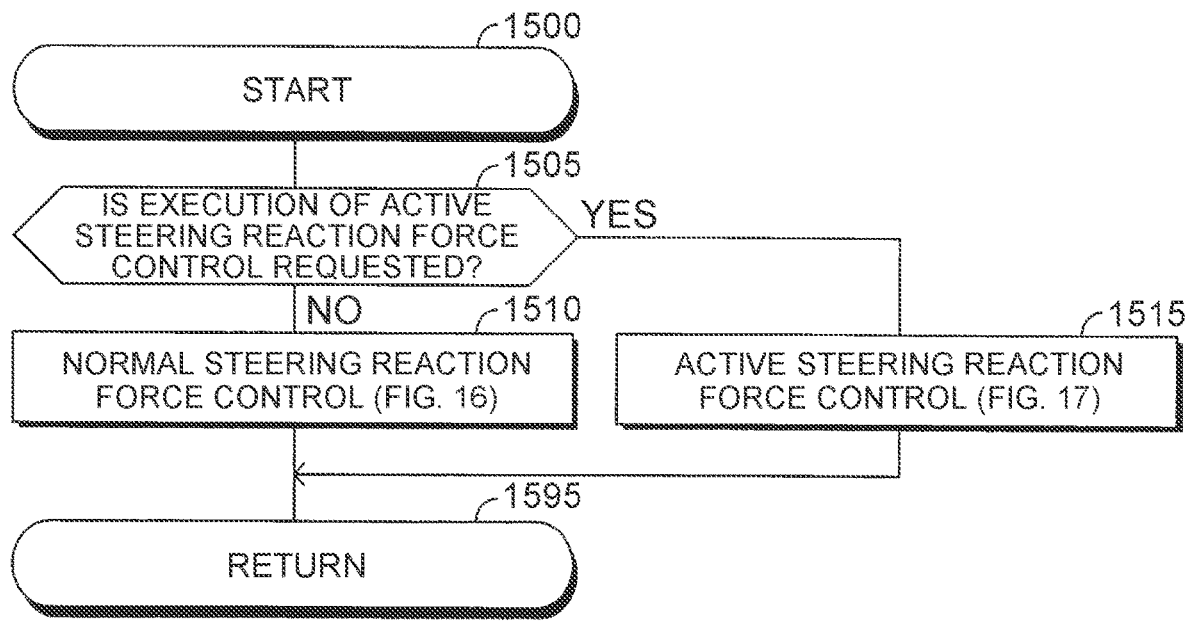
FIG. 15 is a flowchart showing a routine executed by the vehicle control device according to the embodiment of the present disclosure.
Figure 16:
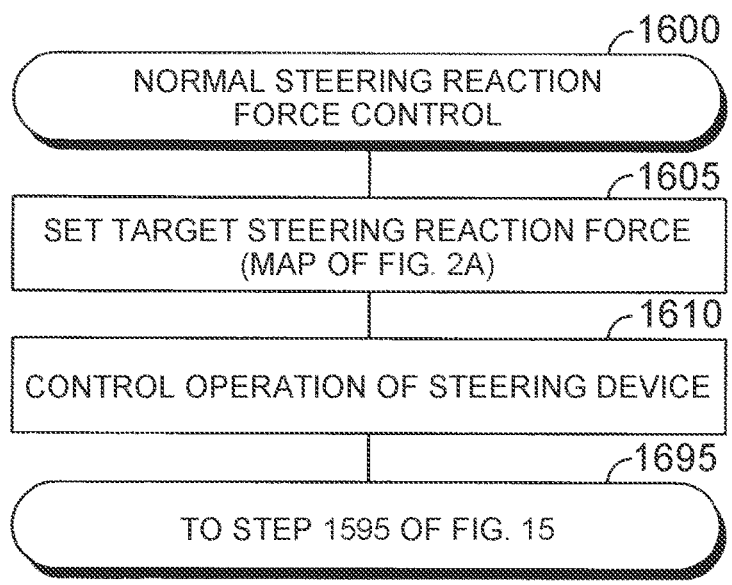
FIG. 16 is a flowchart showing a routine executed by the vehicle control device according to the embodiment of the present disclosure.

When the CPU determines "No" in step 1505, the CPU moves to the processing of step 1510 and executes the routine shown in FIG. 16. Therefore, when the CPU moves to the processing of step 1510, the CPU starts from the processing of step 1600 of the routine shown in FIG. 16 and moves to the processing of step 1605, where it sets the target steering reaction force RFtgt using the map shown in FIG. 2A. Then, the CPU moves to the processing of step 1610 and controls the operation of the steering device 23 such that a steering reaction force corresponding to the target steering reaction force RFtgt set in step 1605 is output. Then, the CPU moves to the processing of step 1595 of the routine shown in FIG. 15 via step 1695 and temporarily ends the processing of this routine.

Figure 17:
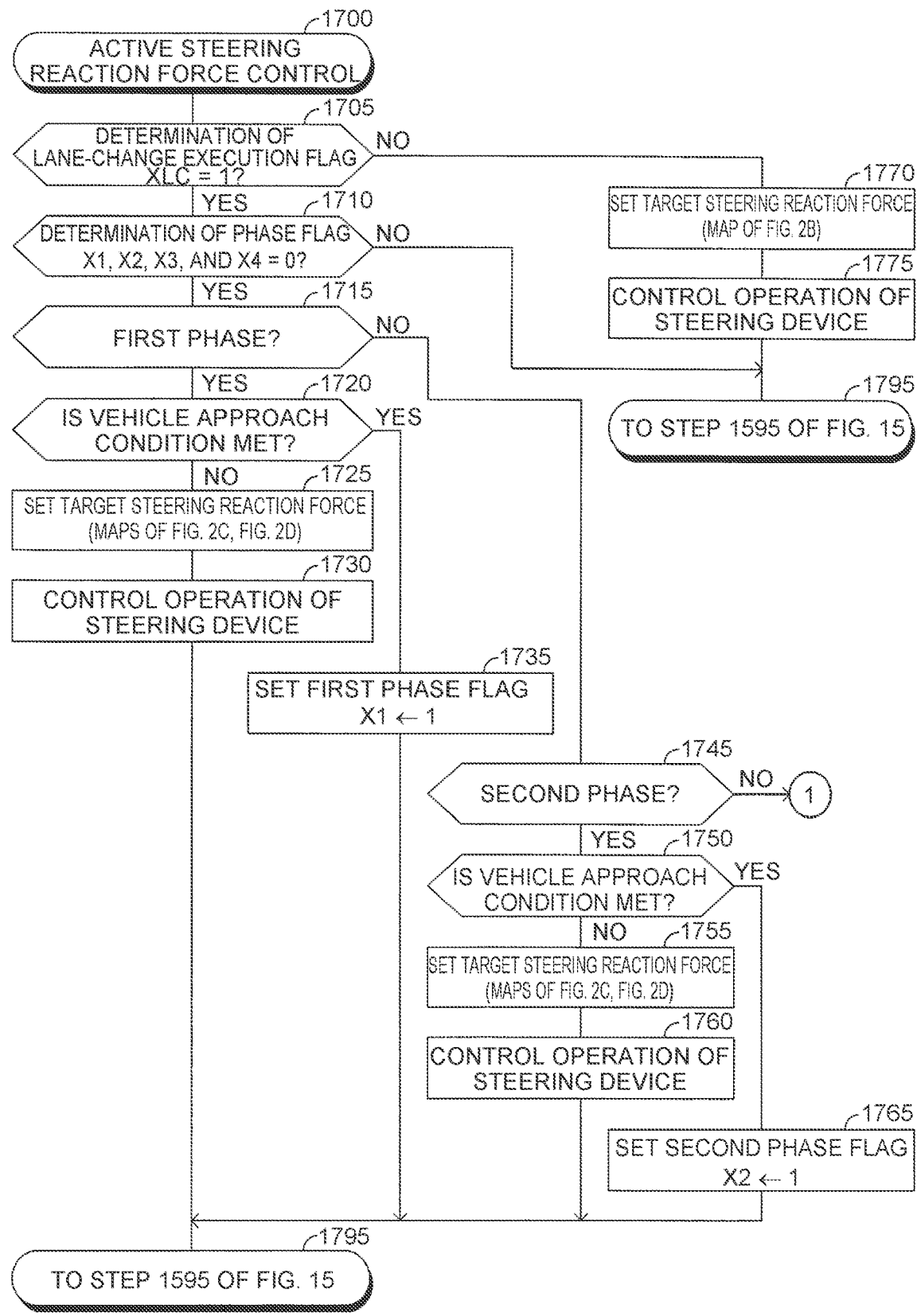
FIG. 17 is a flowchart showing a routine executed by the vehicle control device according to the embodiment of the present disclosure.

On the other hand, when the CPU determines "Yes" in step 1505 of the routine shown in FIG. 15, the CPU moves to the processing of step 1515 and executes the routine shown in FIG. 17. Therefore, when the CPU moves to the processing of step 1515, the CPU starts from the processing of step 1700 of the routine shown in FIG. 17 and moves to the processing of step 1705, where it determines whether the value of a lane-change execution flag XLC is "1." The value of the lane-change execution flag XLC is set to "1" when a lane change of the host vehicle 100 is started, and is set to "0" when the lane change of the host vehicle 100 is completed or when the lane change of the host vehicle 100 is canceled.

When the CPU determines "Yes" in step 1705, the CPU moves to the processing of step 1710, and determines whether the values of a first phase flag X1, a second phase flag X2, a third phase flag X3, and a fourth phase flag X4 are all "0." The value of the first phase flag X1 is set to "1" when the vehicle approach condition is met in a first phase to be described later, and is set to "0" when the vehicle approach condition ceases to be met or when a lane change of the host vehicle 100 is canceled. The value of the second phase flag X2 is set to "1" when the vehicle approach condition is met in a second phase to be described later, and is set to "0" when the vehicle approach condition ceases to be met or when a lane change of the host vehicle 100 is canceled. The value of the third phase flag X3 is set to "1" when the vehicle approach condition is met in a third phase to be described later, and is set to "0" when the vehicle approach condition ceases to be met or when a lane change of the host vehicle 100 is canceled. The value of the fourth phase flag X4 is set to "1" when the vehicle approach condition is met in a fourth phase to be described later, and is set to "0" when the vehicle approach condition ceases to be met or when a lane change of the host vehicle 100 is canceled.

When the CPU determines "Yes" in step 1710, the CPU moves to the processing of step 1715 and determines whether the current point in time is the first phase. The first phase is the point in time when a lane change of the host vehicle 100 is started (i.e., the point in time when the lane-change start condition is met).

When the CPU determines "Yes" in step 1715, the CPU moves to the processing of step 1720 and determines whether the vehicle approach condition is met. When the CPU determines "No" in step 1720, the CPU moves to the processing of step 1725, where the CPU sets the target steering reaction force RFtgt using the map shown in FIG. 2C when a lane change of the host vehicle 100 to the right adjacent same-direction lane is being made, and sets the target steering reaction force RFtgt using the map shown in FIG. 2D when a lane change of the host vehicle 100 to the left adjacent same-direction lane is being made. Then, the CPU moves to the processing of step 1730, and controls the operation of the steering device 23 such that a steering reaction force corresponding to the target steering reaction force RFtgt set in step 1725 is output. Then, the CPU moves to the processing of step 1595 of the routine shown in FIG. 15 via step 1795 and temporarily ends the processing of this routine.

Figure 20:
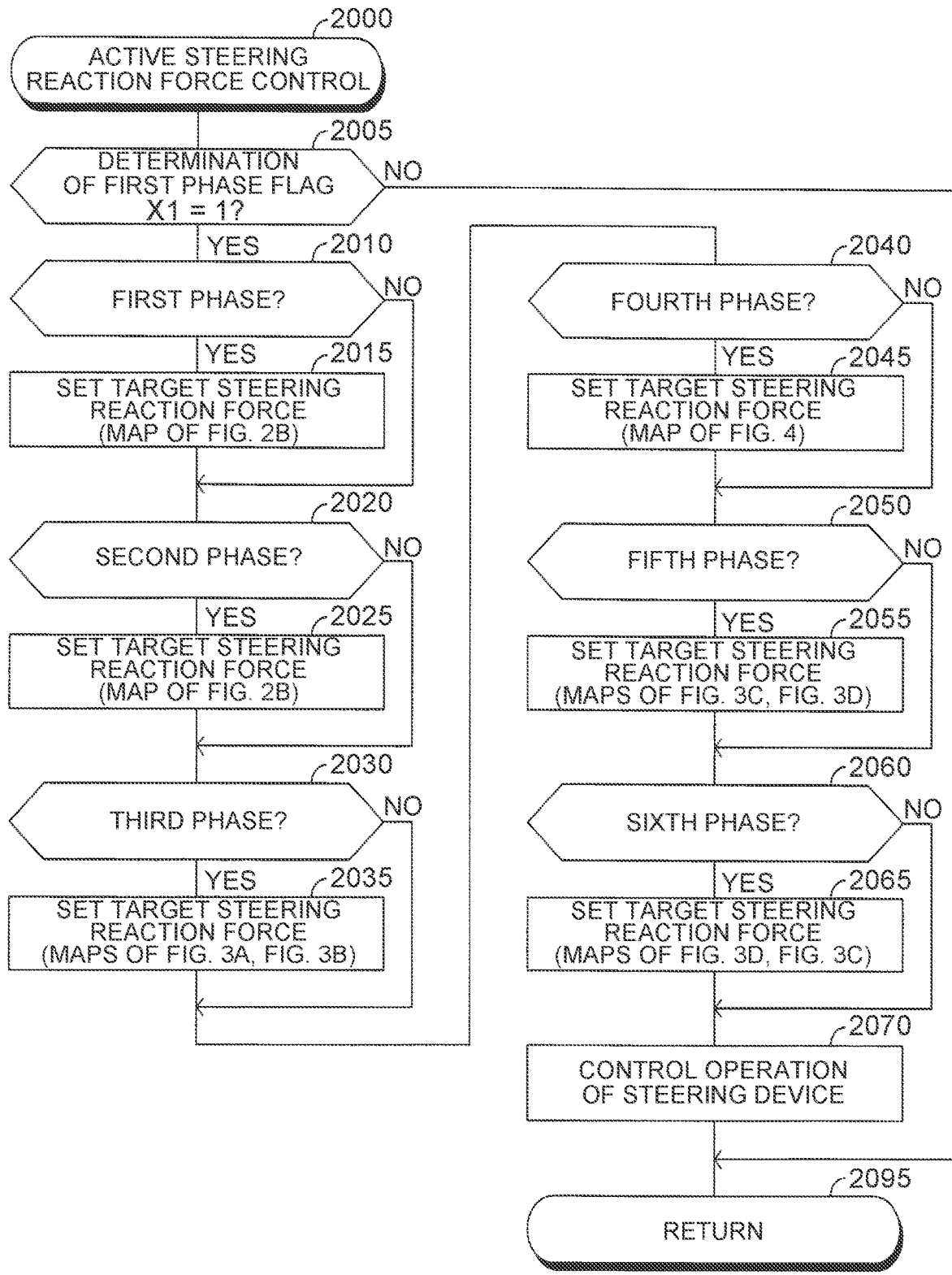
FIG. 20 is a flowchart showing a routine executed by the vehicle control device according to the embodiment of the present disclosure.

On the other hand, when the CPU determines "Yes" in step 1720, the CPU moves to the processing of step 1735 and sets the value of the first phase flag X1 to "1." As a result, the determination result in step 1710 becomes "No" and the determination result in step 2005 of the routine shown in FIG. 20 becomes "Yes." Then, the CPU moves to the processing of step 1595 of the routine shown in FIG. 15 via step 1795 and temporarily ends the processing of this routine.

When the CPU determines "No" in step 1715, the CPU moves to the processing of step 1745 and determines whether the current point in time is the second phase. The second phase is a period after a lane change of the host vehicle 100 is started until the front wheel of the host vehicle 100 reaches the position immediately before the white line (the position at the predetermined distance from the white line toward the host vehicle 100).

When the CPU determines "Yes" in step 1745, the CPU moves to the processing of step 1750 and determines whether the vehicle approach condition is met. When the CPU determines "No" in step 1750, the CPU moves to the processing of step 1755, where the CPU sets the target steering reaction force RFtgt using the map shown in FIG. 2C when a lane change of the host vehicle 100 to the right adjacent same-direction lane is being made, and sets the target steering reaction force RFtgt using the map shown in FIG. 2D when a lane change of the host vehicle 100 to the left adjacent same-direction lane is being made. Then, the CPU moves to the processing of step 1760 and controls the operation of the steering device 23 such that a steering reaction force corresponding to the target steering reaction force RFtgt set in step 1755 is output. Then, the CPU moves to the processing of step 1595 of the routine shown in FIG. 15 via step 1795 and temporarily ends the processing of this routine.

Figure 21:
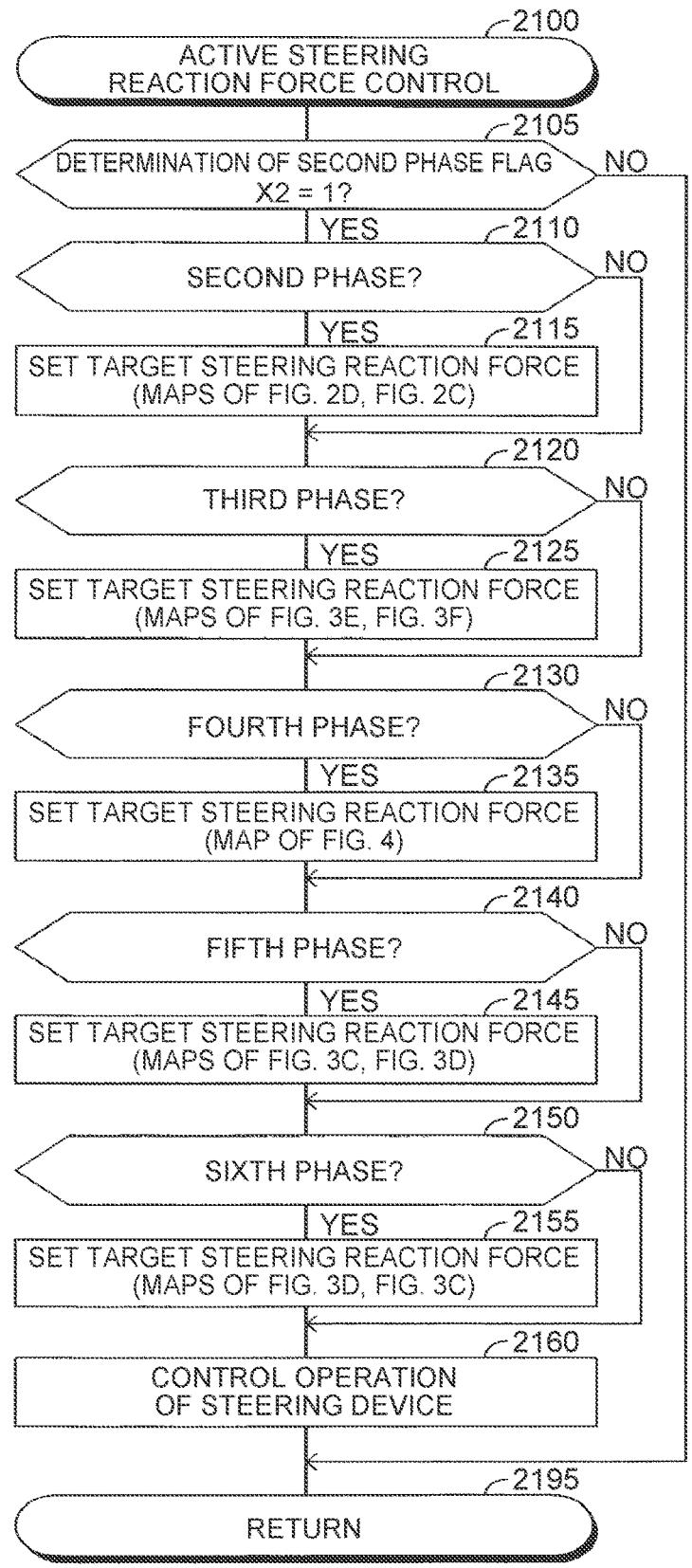
FIG. 21 is a flowchart showing a routine executed by the vehicle control device according to the embodiment of the present disclosure.

On the other hand, when the CPU determines "Yes" in step 1750, the CPU moves to the processing of step 1765 and sets the value of the second phase flag X2 to "1." As a result, the determination result in step 1710 becomes "No" and the determination result in step 2105 of the routine shown in FIG. 21 becomes "Yes." Then, the CPU moves to the processing of step 1595 of the routine shown in FIG. 15 via step 1795 and temporarily ends the processing of this routine.

Figure 18:
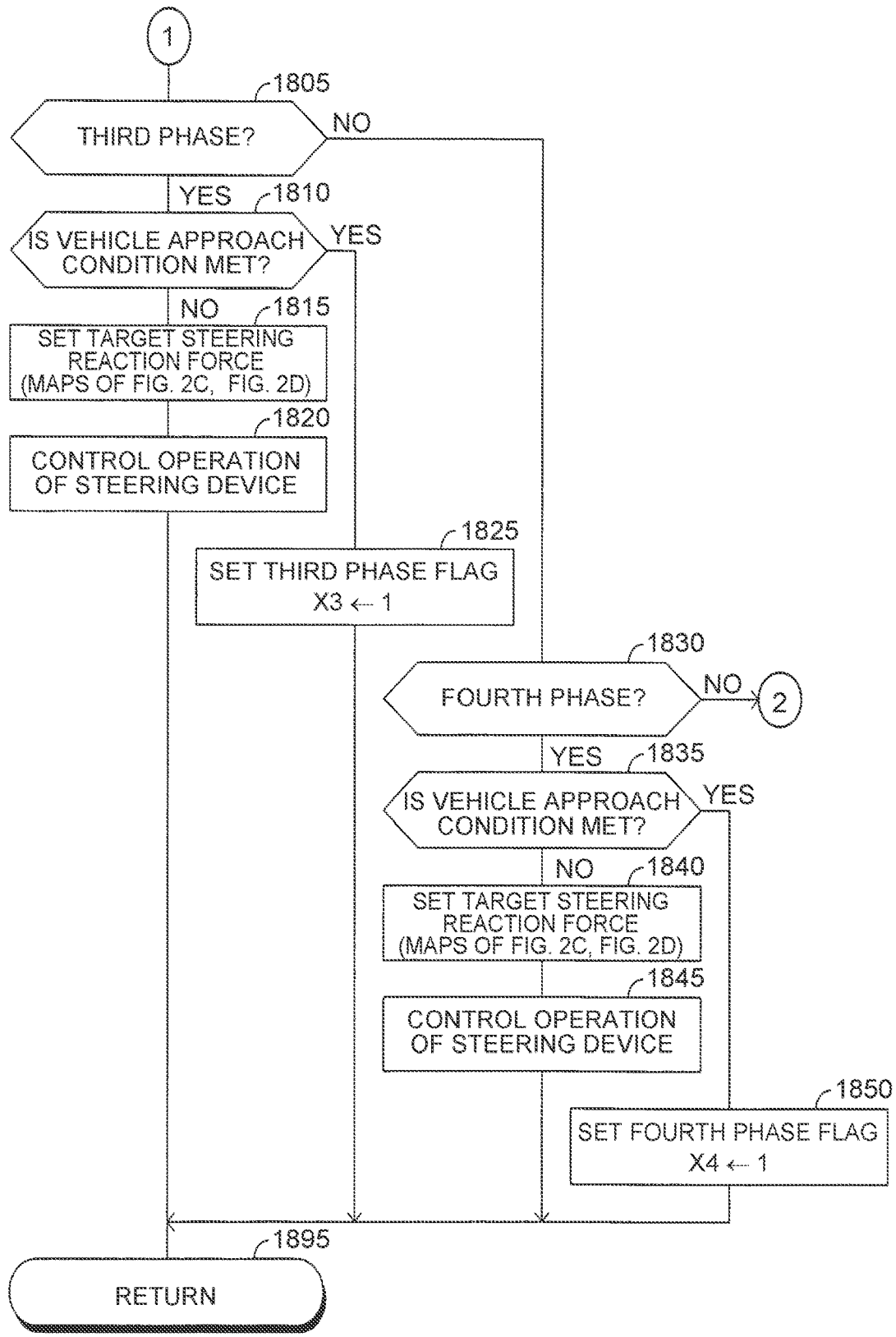
FIG. 18 is a flowchart showing a routine executed by the vehicle control device according to the embodiment of the present disclosure.

When the CPU determines "No" in step 1745, the CPU moves to the processing of step 1805 of FIG. 18 and determines whether the current point in time is the third phase. The third phase is a period after a lane change of the host vehicle 100 is started until the front wheel of the host vehicle 100 reaches the position immediately before the white line (the position at the predetermined distance from the white line toward the host vehicle 100) and then the front wheel of the host vehicle 100 treads the white line (the host vehicle 100 starts to travel across the white line).

When the CPU determines "Yes" in step 1805, the CPU moves to the processing of step 1810 and determines whether the vehicle approach condition is met. When the CPU determines "No" in step 1810, the CPU moves to the processing of step 1815, where the CPU sets the target steering reaction force RFtgt using the map shown in FIG. 2C when a lane change of the host vehicle 100 to the right adjacent same-direction lane is being made, and sets the target steering reaction force RFtgt using the map shown in FIG. 2D when a lane change of the host vehicle 100 to the left adjacent same-direction lane is being made. Then, the CPU moves to the processing of step 1820 and controls the operation of the steering device 23 such that a steering reaction force corresponding to the target steering reaction force RFtgt set in step 1815 is output. Then, the CPU moves to the processing of step 1895 and temporarily ends the processing of this routine.

Figure 22:
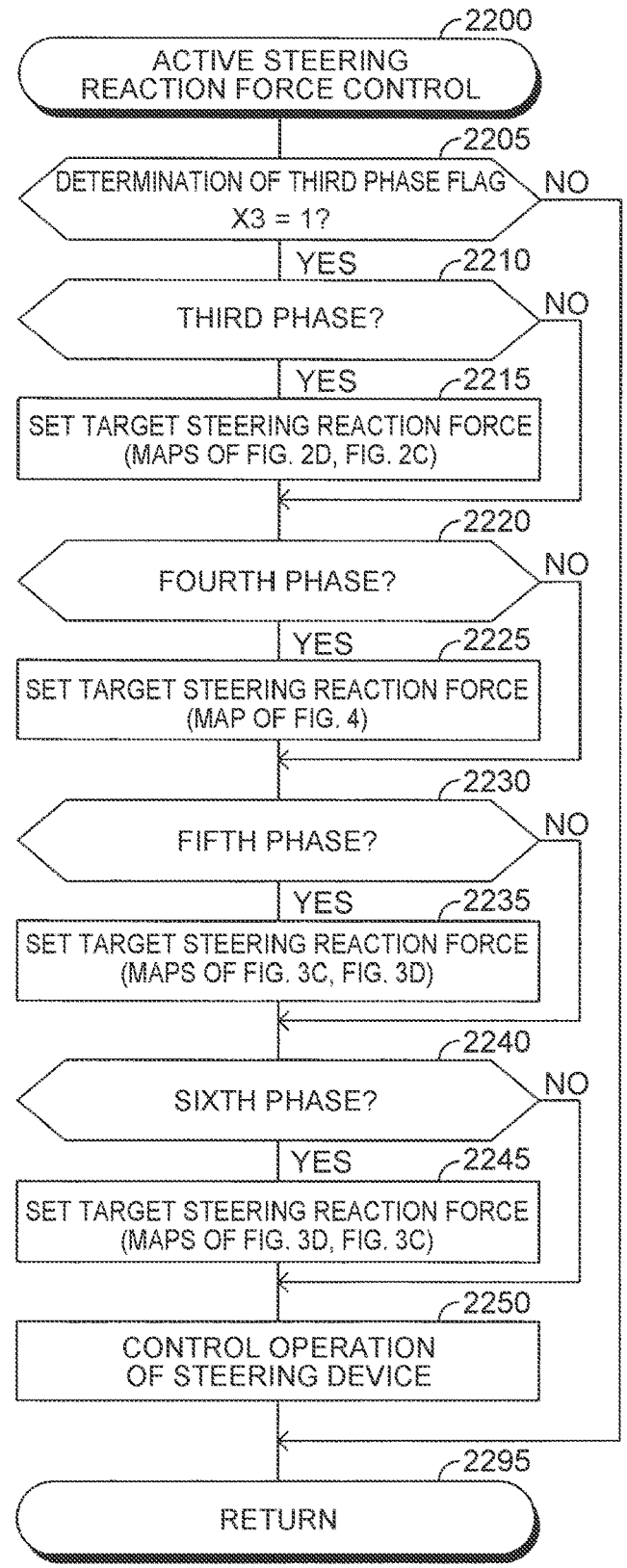
FIG. 22 is a flowchart showing a routine executed by the vehicle control device according to the embodiment of the present disclosure.

On the other hand, when the CPU determines "Yes" in step 1810, the CPU moves to the processing of step 1825 and sets the value of the third phase flag X3 to "1." As a result, the determination result in step 1710 becomes "No" and the determination result in step 2205 of the routine shown in FIG. 22 becomes "Yes." Then, the CPU moves to the processing of step 1895 and temporarily ends the processing of this routine.

When the CPU determines "No" in step 1805, the CPU moves to the processing of step 1830 and determines whether the current point in time is the fourth phase. The fourth phase is a period in which, after a lane change of the host vehicle 100 is started, the front wheel of the host vehicle 100 treads the white line and the host vehicle 100 is traveling across the white line.

When the CPU determines "Yes" in step 1830, the CPU moves to the processing of step 1835 and determines whether the vehicle approach condition is met. When the CPU determines "No" in step 1835, the CPU moves to the processing of step 1840, where the CPU sets the target steering reaction force RFtgt using the map shown in FIG. 2C when a lane change of the host vehicle 100 to the right adjacent same-direction lane is being made, and sets the target steering reaction force RFtgt using the map shown in FIG. 2D when a lane change of the host vehicle 100 to the left adjacent same-direction lane is being made. Then, the CPU moves to the processing of step 1845 and controls the operation of the steering device 23 such that a steering reaction force corresponding to the target steering reaction force RFtgt set in step 1840 is output. Then, the CPU moves to the processing of step 1895 and temporarily ends the processing of this routine.

Figure 23:
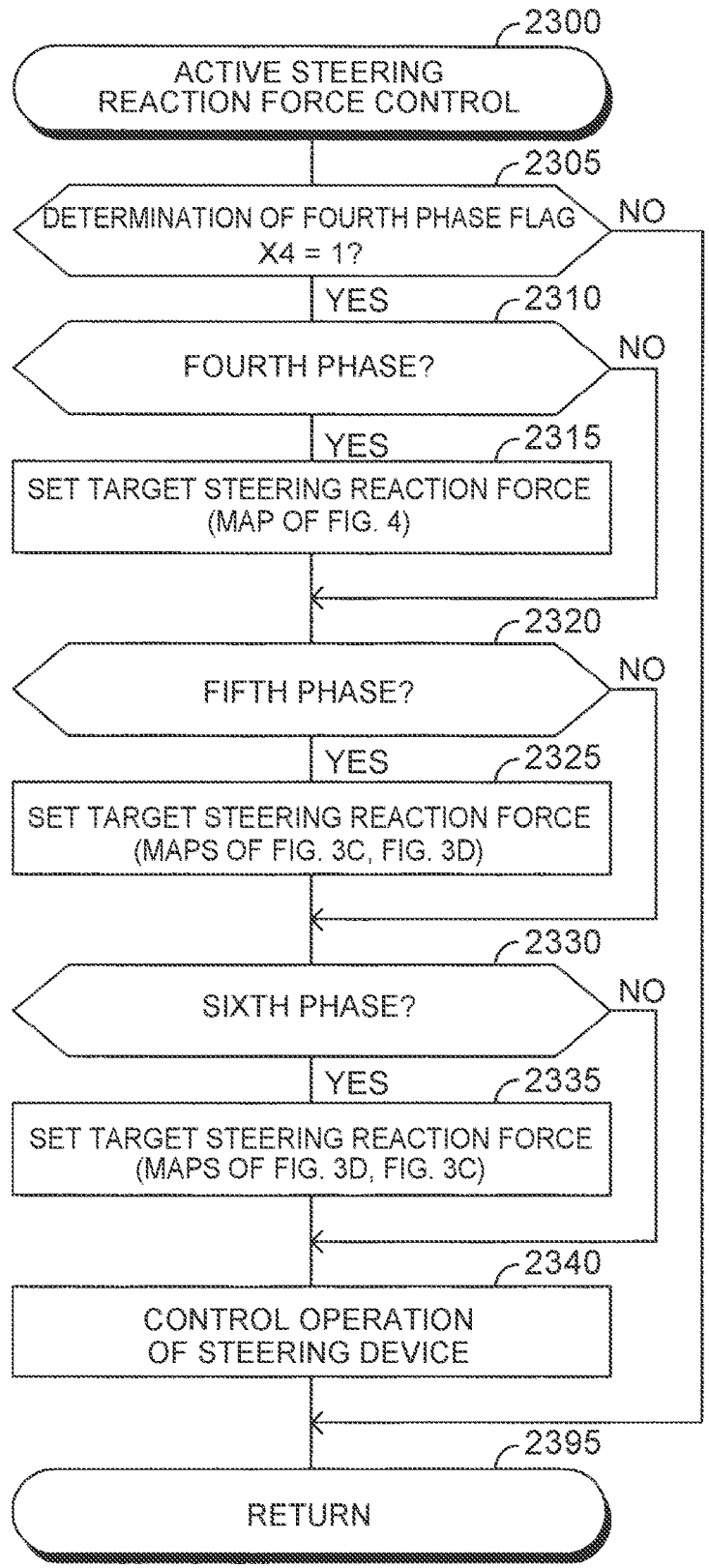
FIG. 23 is a flowchart showing a routine executed by the vehicle control device according to the embodiment of the present disclosure.

On the other hand, when the CPU determines "Yes" in step 1835, the CPU moves to the processing of step 1850, and sets the value of the fourth phase flag X4 to "1." As a result, the determination result in step 1710 becomes "No" and the determination result in step 2305 of the routine shown in FIG. 23 becomes "Yes." Then, the CPU moves to the processing of step 1895 and temporarily ends the processing of this routine.

Figure 19:
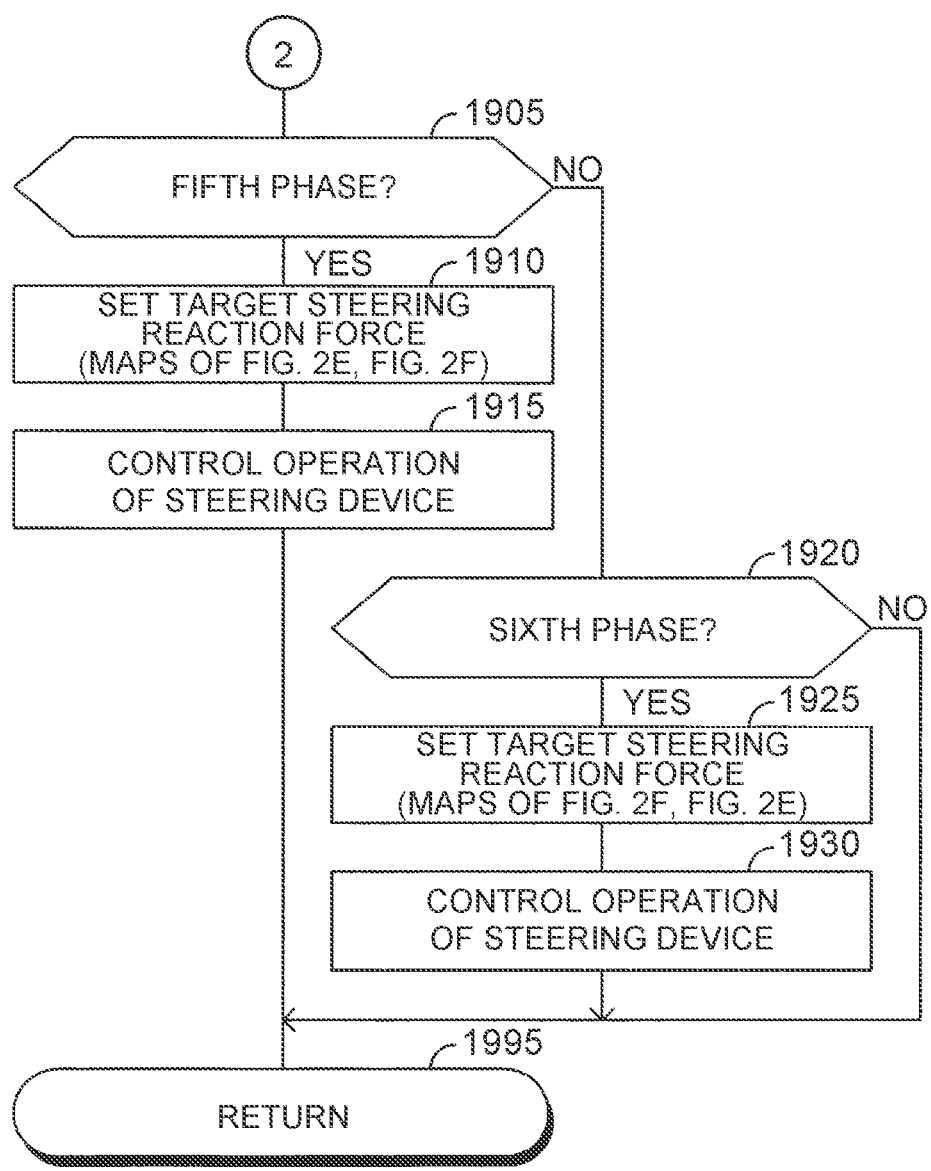
FIG. 19 is a flowchart showing a routine executed by the vehicle control device according to the embodiment of the present disclosure.

When the CPU determines "No" in step 1830, the CPU moves to the processing of step 1905 of FIG. 19 and determines whether the current point in time is a fifth phase. The fifth phase is a period after a lane change of the host vehicle 100 is started until the entire host vehicle 100 enters the adjacent same-direction lane and the lane change of the host vehicle 100 is completed.

When the CPU determines "Yes" in step 1905, the CPU moves to the processing of step 1910, where the CPU sets the target steering reaction force RFtgt using the map shown in FIG. 2E when a lane change of the host vehicle 100 to the right adjacent same-direction lane is being made, and sets the target steering reaction force RFtgt using the map shown in FIG. 2F when a lane change of the host vehicle 100 to the left adjacent same-direction lane is being made. Then, the CPU moves to the processing of step 1915 and controls the operation of the steering device 23 such that a steering reaction force corresponding to the target steering reaction force RFtgt set in step 1910 is output. Then, the CPU moves to the processing of step 1995 and temporarily ends the processing of this routine.

On the other hand, when the CPU determines "No" in step 1905, the CPU moves to the processing of step 1920 and determines whether the current point in time is a sixth phase. The sixth phase is a period after a lane change of the host vehicle 100 is started until the host vehicle 100 is returned to the original lane (own lane) and it is determined that the lane change of the host vehicle 100 has been canceled.

When the CPU determines "Yes" in step 1920, the CPU moves to the processing of step 1925, where the CPU sets the target steering reaction force RFtgt using the map shown in FIG. 2F when a lane change of the host vehicle 100 to the right adjacent same-direction lane has been once started, and sets the target steering reaction force RFtgt using the map shown in FIG. 2E when a lane change of the host vehicle 100 to the left adjacent same-direction lane has been once started. Then, the CPU moves to the processing of step 1930 and controls the operation of the steering device 23 such that a steering reaction force corresponding to the target steering reaction force RFtgt set in step 1925 is output. Then, the CPU moves to the processing of step 1995 and temporarily ends the processing of this routine.

On the other hand, when the CPU determines "No" in step 1920, the CPU moves directly to the processing of step 1995 and temporarily ends the processing of this routine.

When the CPU determines "No" in step 1710 of the routine shown in FIG. 17, the CPU moves to the processing of step 1595 of the routine shown in FIG. 15 via step 1795 and temporarily ends the processing of this routine.

When the CPU determines "No" in step 1705, the CPU moves to the processing of step 1770 and sets the target steering reaction force RFtgt using the map shown in FIG. 2B. Then, the CPU moves to the processing of step 1775 and controls the operation of the steering device 23 such that a steering reaction force corresponding to the target steering reaction force RFtgt set in step 1770 is output. Then, the CPU moves to the processing of step 1795 and temporarily ends the processing of this routine.

Further, the CPU executes the routine shown in FIG. 20 on a predetermined arithmetic operation cycle. Therefore, when a predetermined timing comes, the CPU starts from the processing of step 2000 of the routine shown in FIG. 20 and moves to the processing of step 2005, where it determines whether the value of the first phase flag X1 is "1."

When the CPU determines "Yes" in step 2005, the CPU moves to the processing of step 2010 and determines whether the current point in time is the first phase. When the CPU determines "Yes" in step 2010, the CPU moves to the processing of step 2015, and sets the target steering reaction force RFtgt using the map shown in FIG. 2B both when a lane change of the host vehicle 100 to the right adjacent same-direction lane is being made and when a lane change of the host vehicle 100 to the left adjacent same-direction lane is being made. Thereafter, the CPU moves to the processing of step 2020. On the other hand, when the CPU determines "No" in step 2010, the CPU moves directly to the processing of step 2020.

When the CPU moves to the processing of step 2020, the CPU determines whether the current point in time is the second phase. When the CPU determines "Yes" in step 2020, the CPU moves to the processing of step 2025, and sets the target steering reaction force RFtgt using the map shown in FIG. 2B both when a lane change of the host vehicle 100 to the right adjacent same-direction lane is being made and when a lane change of the host vehicle 100 to the left adjacent same-direction lane is being made. Thereafter, the CPU moves to the processing of step 2030. On the other hand, when the CPU determines "No" in step 2020, the CPU moves directly to the processing of step 2030.

When the CPU moves to the processing of step 2030, the CPU determines whether the current point in time is the third phase. When the CPU determines "Yes" in step 2030, the CPU moves to the processing of step 2035, where the CPU sets the target steering reaction force RFtgt using the map shown in FIG. 3A when a lane change of the host vehicle 100 to the right adjacent same-direction lane is being made, and sets the target steering reaction force RFtgt using the map shown in FIG. 3B when a lane change of the host vehicle 100 to the left adjacent same-direction lane is being made. Thereafter, the CPU moves to the processing of step 2040. On the other hand, when the CPU determines "No" in step 2030, the CPU moves directly to the processing of step 2040.

When the CPU moves to the processing of step 2040, the CPU determines whether the current point in time is the fourth phase. When the CPU determines "Yes" in step 2040, the CPU moves to the processing of step 2045, and sets the target steering reaction force RFtgt using the map shown in FIG. 4 both when a lane change of the host vehicle 100 to the right adjacent same-direction lane is being made and when a lane change of the host vehicle 100 to the left adjacent same-direction lane is being made. Thereafter, the CPU moves to the processing of step 2050. On the other hand, when the CPU determines "No" in step 2040, the CPU moves directly to the processing of step 2050.

When the CPU moves to the processing of step 2050, the CPU determines whether the current point in time is the fifth phase. When the CPU determines "Yes" in step 2050, the CPU moves to the processing of step 2055, where the CPU sets the target steering reaction force RFtgt using the map shown in FIG. 3C when a lane change of the host vehicle 100 to the right adjacent same-direction lane is being made, and sets the target steering reaction force RFtgt using the map shown in FIG. 3D when a lane change of the host vehicle 100 to the left adjacent same-direction lane is being made. Then, the CPU moves to the processing of step 2060. On the other hand, when the CPU determines "No" in step 2050, the CPU moves directly to the processing of step 2060.

When the CPU moves to the processing of step 2060, the CPU determines whether the current point in time is the sixth phase. When the CPU determines "Yes" in step 2060, the CPU moves to the processing of step 2065, where the CPU sets the target steering reaction force RFtgt using the map shown in FIG. 3D when a lane change of the host vehicle 100 to the right adjacent same-direction lane is being made, and sets the target steering reaction force RFtgt using the map shown in FIG. 3C when a lane change of the host vehicle 100 to the left adjacent same-direction lane is being made. Thereafter, the CPU moves to the processing of step 2070. On the other hand, when the CPU determines "No" in step 2060, the CPU moves directly to the processing of step 2070.

When the CPU moves to the processing of step 2070, the CPU controls the operation of the steering device 23 such that a steering reaction force corresponding to the target steering reaction force RFtgt set in step 2015, step 2025, step 2035, step 2045, step 2055, or step 2065 is output. Then, the CPU moves to the processing of step 2095 and temporarily ends the processing of this routine.

When the CPU determines "No" in step 2005, the CPU moves directly to the processing of step 2095 and temporarily ends the processing of this routine.

Further, the CPU executes the routine shown in FIG. 21 on a predetermined arithmetic operation cycle. Therefore, when a predetermined timing comes, the CPU starts from the processing of step 2100 of the routine shown in FIG. 21 and moves to the processing of step 2105, where it determines whether the value of the second phase flag X2 is "1."

When the CPU determines "Yes" in step 2105, the CPU moves to the processing of step 2110 and determines whether the current point in time is the second phase. When the CPU determines "Yes" in step 2110, the CPU moves to the processing of step 2115, where the CPU sets the target steering reaction force RFtgt using the map shown in FIG. 2D when a lane change of the host vehicle 100 to the right adjacent same-direction lane is being made, and sets the target steering reaction force RFtgt using the map shown in FIG. 2C when a lane change of the host vehicle 100 to the left adjacent same-direction lane is being made. Thereafter, the CPU moves to the processing of step 2120. On the other hand, when the CPU determines "No" in step 2110, the CPU moves directly to the processing of step 2120.

When the CPU moves to the processing of step 2120, the CPU determines whether the current point in time is the third phase. When the CPU determines "Yes" in step 2120, the CPU moves to the processing of step 2125, where the CPU sets the target steering reaction force RFtgt using the map shown in FIG. 3E when a lane change of the host vehicle 100 to the right adjacent same-direction lane is being made, and sets the target steering reaction force RFtgt using the map shown in FIG. 3F when a lane change of the host vehicle 100 to the left adjacent same-direction lane is being made. Thereafter, the CPU moves to the processing of step 2130. On the other hand, when the CPU determines "No" in step 2120, the CPU moves directly to the processing of step 2130.

When the CPU moves to the processing of step 2130, the CPU determines whether the current point in time is the fourth phase. When the CPU determines "Yes" in step 2130, the CPU moves to the processing of step 2135, where the CPU sets the target steering reaction force RFtgt using the map shown in FIG. 4 both when a lane change of the host vehicle 100 to the right adjacent same-direction lane is being made and when a lane change of the host vehicle 100 to the left adjacent same-direction lane is being made. Thereafter, the CPU moves to the processing of step 2140. On the other hand, when the CPU determines "No" in step 2130, the CPU moves directly to the processing of step 2140.

When the CPU moves to the processing of step 2140, the CPU determines whether the current point in time is the fifth phase. When the CPU determines "Yes" in step 2140, the CPU moves to the processing of step 2145, where the CPU sets the target steering reaction force RFtgt using the map shown in FIG. 3C when a lane change of the host vehicle 100 to the right adjacent same-direction lane is being made, and sets the target steering reaction force RFtgt using the map shown in FIG. 3D when a lane change of the host vehicle 100 to the left adjacent same-direction lane is being made. Thereafter, the CPU moves to the processing of step 2150. On the other hand, when the CPU determines "No" in step 2140, the CPU moves directly to the processing of step 2150.

When the CPU moves to the processing of step 2150, the CPU determines whether the current point in time is the sixth phase. When the CPU determines "Yes" in step 2150, the CPU moves to the processing of step 2155, where the CPU sets the target steering reaction force RFtgt using the map shown in FIG. 3D when a lane change of the host vehicle 100 to the right adjacent same-direction lane is being made, and sets the target steering reaction force RFtgt using the map shown in FIG. 3C when a lane change of the host vehicle 100 to the left adjacent same-direction lane is being made. Thereafter, the CPU moves to the processing of step 2160. On the other hand, when the CPU determines "No" in step 2150, the CPU moves directly to the processing of step 2160.

When the CPU moves to the processing of step 2160, the CPU controls the operation of the steering device 23 such that a steering reaction force corresponding to the target steering reaction force RFtgt set in step 2115, step 2125, step 2135, step 2145, or step 2155 is output. Then, the CPU moves to the processing of step 2195 and temporarily ends the processing of this routine.

When the CPU determines "No" in step 2105, the CPU moves directly to the processing of step 2195 and temporarily ends the processing of this routine.

Further, the CPU executes the routine shown in FIG. 22 on a predetermined arithmetic operation cycle. Therefore, when a predetermined timing comes, the CPU starts from the processing of step 2200 of the routine shown in FIG. 22 and moves to the processing of step 2205, where it determines whether the value of the third phase flag X3 is "1."

When the CPU determines "Yes" in step 2205, the CPU moves to the processing of step 2210 and determines whether the current point in time is the third phase. When the CPU determines "Yes" in step 2210, the CPU moves to the processing of step 2215, where the CPU sets the target steering reaction force RFtgt using the map shown in FIG.

2D when a lane change of the host vehicle 100 to the right adjacent same-direction lane is being made, and sets the target steering reaction force RFtgt using the map shown in FIG. 2C when a lane change of the host vehicle 100 to the left adjacent same-direction lane is being made. Thereafter, the CPU moves to the processing of step 2220. On the other hand, when the CPU determines "No" in step 2210, the CPU moves directly to the processing of step 2220.

When the CPU moves to the processing of step 2220, the CPU determines whether the current point in time is the fourth phase. When the CPU determines "Yes" in step 2220, the CPU moves to the processing of step 2225, where the CPU sets the target steering reaction force RFtgt using the map shown in FIG. 4 both when a lane change of the host vehicle 100 to the right adjacent same-direction lane is being made and when a lane change of the host vehicle 100 to the left adjacent same-direction lane is being made. Thereafter, the CPU moves to the processing of step 2230. On the other hand, when the CPU determines "No" in step 2220, the CPU moves directly to the processing of step 2230.

When the CPU moves to the processing of step 2230, the CPU determines whether the current point in time is the fifth phase. When the CPU determines "Yes" in step 2230, the CPU moves to the processing of step 2235, where the CPU sets the target steering reaction force RFtgt using the map shown in FIG. 3C when a lane change of the host vehicle 100 to the right adjacent same-direction lane is being made, and sets the target steering reaction force RFtgt using the map shown in FIG. 3D when a lane change of the host vehicle 100 to the left adjacent same-direction lane is being made. Thereafter, the CPU moves to the processing of step 2240. On the other hand, when the CPU determines "No" in step 2230, the CPU moves directly to the processing of step 2240.

When the CPU moves to the processing of step 2240, the CPU determines whether the current point in time is the sixth phase. When the CPU determines "Yes" in step 2240, the CPU moves to the processing of step 2245, where the CPU sets the target steering reaction force RFtgt using the map shown in FIG. 3D when a lane change of the host vehicle 100 to the right adjacent same-direction lane is being made, and sets the target steering reaction force RFtgt using the map shown in FIG. 3C when a lane change of the host vehicle 100 to the left adjacent same-direction lane is being made. Then, the CPU moves to the processing of step 2250. On the other hand, when the CPU determines "No" in step 2240, the CPU moves directly to the processing of step 2250.

When the CPU moves to the processing of step 2250, the CPU controls the operation of the steering device 23 such that a steering reaction force corresponding to the target steering reaction force RFtgt set in step 2215, step 2225, step 2235, or step 2245 is output. Then, the CPU moves to the processing of step 2295 and temporarily ends the processing of this routine.

When the CPU determines "No" in step 2205, the CPU moves directly to the processing of step 2295 and temporarily ends the processing of this routine.

Further, the CPU executes the routine shown in FIG. 23 on a predetermined arithmetic operation cycle. Therefore, when a predetermined timing comes, the CPU starts from the processing of step 2300 of the routine shown in FIG. 23 and moves to the processing to step 2305, where it determines whether the value of the fourth phase flag X4 is "1."

When the CPU determines "Yes" in step 2305, the CPU moves to the processing of step 2310 and determines whether the current point in time is the fourth phase. When the CPU determines "Yes" in step 2310, the CPU moves to the processing of step 2315, where the CPU sets the target steering reaction force RFtgt using the map shown in FIG. 4 both when a lane change of the host vehicle 100 to the right adjacent same-direction lane is being made and when a lane change of the host vehicle 100 to the left adjacent same-direction lane is being made. Thereafter, the CPU moves to the processing of step 2320. On the other hand, when the CPU determines "No" in step 2310, the CPU moves directly to the processing of step 2320.

When the CPU moves to the processing of step 2320, the CPU determines whether the current point in time is the fifth phase. When the CPU determines "Yes" in step 2320, the CPU moves to the processing of step 2325, where the CPU sets the target steering reaction force RFtgt using the map shown in FIG. 3C when a lane change of the host vehicle 100 to the right adjacent same-direction lane is being made, and sets the target steering reaction force RFtgt using the map shown in FIG. 3D when a lane change of the host vehicle 100 to the left adjacent same-direction lane is being made. Thereafter, the CPU moves to the processing of step 2330. On the other hand, when the CPU determines "No" in step 2320, the CPU moves directly to the processing of step 2330.

When the CPU moves to the processing of step 2330, the CPU determines whether the current point in time is the sixth phase. When the CPU determines "Yes" in step 2330, the CPU moves to the processing of step 2335, where the CPU sets the target steering reaction force RFtgt using the map shown in FIG. 3D when a lane change of the host vehicle 100 to the right adjacent same-direction lane is being made, and sets the target steering reaction force RFtgt using the map shown in FIG. 3C when a lane change of the host vehicle 100 to the left adjacent same-direction lane is being made. Thereafter, the CPU moves to the processing of step 2340. On the other hand, when the CPU determines "No" in step 2330, the CPU moves directly to the processing of step 2340.

When the CPU moves to the processing of step 2340, the CPU controls the operation of the steering device 23 such that a steering reaction force corresponding to the target steering reaction force RFtgt set in step 2315, step 2325, or step 2335 is output. Then, the CPU moves to the processing of step 2395 and temporarily ends the processing of this routine.

When the CPU determines "No" in step 2305, the CPU moves directly to the processing of step 2395 and temporarily ends the processing of this routine.

The above is the specific operation of the vehicle control device 10.

The present disclosure is not limited to the above-described embodiment, and various modified examples can be adopted within the scope of the present disclosure.

What is claimed is:

1. A vehicle control device comprising a reaction force generator that gives a steering reaction force to a steering operation performed by a driver on a host vehicle, and a controller that executes steering reaction force control of controlling a value of the steering reaction force, the controller being configured such that, during execution of the steering reaction force control, when a lane change of the host vehicle is not made, the controller gives a reaction force of a standard value to the steering operation as the steering reaction force, and when a lane change of the host vehicle is made, the controller sets the steering reaction force given to the steering operation in a direction of the lane change of the host vehicle to a reaction force of a smaller value than the reaction force of the standard value, wherein the controller is configured such that, during execution of the steering reaction force control, when a vehicle approach condition that another vehicle traveling in a lane on a side to which a lane of the host vehicle is to be changed is approaching the host vehicle from behind is met at a time when a lane change of the host vehicle is made, the controller does not set the steering reaction force given to the steering operation in the direction of the lane change of the host vehicle to a reaction force of a value smaller than the standard value, and the controller is configured such that, during execution of the steering reaction force control, when the vehicle approach condition is met after a lane change of the host vehicle is started and the host vehicle starts to enter an adjacent lane and before entry of the host vehicle into the adjacent lane is completed, the controller sets the steering reaction force given to the steering operation in the direction of the lane change of the host vehicle to a reaction force of a value smaller than the standard value, and also sets the steering reaction force given to a steering operation in the opposite direction from the direction of the lane change of the host vehicle to a reaction force of a value smaller than the standard value.

2. The vehicle control device according to claim 1, wherein the controller is configured such that, during execution of the steering reaction force control, when the vehicle approach condition is met at a point in time when a lane change of the host vehicle is started, or when the vehicle approach condition is met after a lane change of the host vehicle is started and before the host vehicle starts to enter an adjacent lane, the controller sets the steering reaction force given to the steering operation in the direction of the lane change of the host vehicle to a reaction force of a value larger than the standard value, and sets the steering reaction force given to the steering operation in the opposite direction from the direction of the lane change of the host vehicle to a reaction force of a value smaller than the standard value.

3. The vehicle control device according to claim 1, wherein the controller is configured such that, during execution of the steering reaction force control, when a lane change of the host vehicle is started and entry of the host vehicle into an adjacent lane is completed, the controller sets an increase rate of the steering reaction force given to the steering operation in a direction of the lane change of the host vehicle relative to an amount of the steering operation to be higher than the increase rate before entry of the host vehicle into the adjacent lane is completed.

4. The vehicle control device according to claim 1, wherein the controller is configured such that, during execution of the steering reaction force control, when, after a lane change of the host vehicle is started, a steering operation in the opposite direction from a direction of the lane change of the host vehicle is performed at some point during the lane change of the host vehicle and entry of the host vehicle into an original lane is completed, the controller sets an increase rate of the steering reaction force given to the steering operation in the opposite direction from the direction of the lane change of the host vehicle relative to an amount of the steering operation to be higher than the increase rate before entry of the host vehicle into the original lane is completed.

5. The vehicle control device according to claim 1, wherein the controller is configured such that, during execution of the steering reaction force control, when the vehicle approach condition that has been once met ceases to be met at a time when a lane change of the host vehicle is made, the controller sets the steering reaction force given to the steering operation in a direction of the lane change of the host vehicle to a reaction force of a smaller value than the reaction force of the standard value.

6. A vehicle control device comprising a reaction force generator that gives a steering reaction force to a steering operation performed by a driver on a host vehicle, and a controller that executes steering reaction force control of controlling a value of the steering reaction force, the controller being configured such that, during execution of the steering reaction force control, when a lane change of the host vehicle is not made, the controller gives a reaction force of a standard value to the steering operation as the steering reaction force, and when a lane change of the host vehicle is made, the controller sets the steering reaction force given to the steering operation in a direction of the lane change of the host vehicle to a reaction force of a smaller value than the reaction force of the standard value, wherein the controller is configured such that, during execution of the steering reaction force control, when a vehicle approach condition that another vehicle traveling in a lane on a side to which a lane of the host vehicle is to be changed is approaching the host vehicle from behind is met at a time when a lane change of the host vehicle is made, the controller does not set the steering reaction force given to the steering operation in the direction of the lane change of the host vehicle to a reaction force of a value smaller than the standard value, and the controller is configured such that, during execution of the steering reaction force control, when, after a lane change of the host vehicle is started, a steering operation in the opposite direction from a direction of the lane change of the host vehicle is performed at some point during the lane change of the host vehicle and entry of the host vehicle into an original lane is completed, the controller sets an increase rate of the steering reaction force given to the steering operation in the opposite direction from the direction of the lane change of the host vehicle relative to an amount of the steering operation to be higher than the increase rate before entry of the host vehicle into the original lane is completed.

* * * * *